United States Patent [19]
Murphy et al.

[11] Patent Number: 5,659,753
[45] Date of Patent: Aug. 19, 1997

[54] INTERFACE FOR SYMBOL TABLE CONSTRUCTION IN A MULTILANGUAGE OPTIMIZING COMPILER

[75] Inventors: Dennis Joseph Murphy, Westford, Mass.; Robert Neil Faiman, Jr., Wilton, N.H.

[73] Assignee: Digital Equipment Corporation, Maynard, Mass.

[21] Appl. No.: 364,437

[22] Filed: Dec. 27, 1994

Related U.S. Application Data

[63] Continuation of Ser. No. 662,477, Feb. 27, 1991, abandoned, and a continuation of Ser. No. 243,615, May 16, 1994, abandoned.

[51] Int. Cl.[6] .................................................. G06F 9/45
[52] U.S. Cl. ................................ 395/705; 395/708
[58] Field of Search .............................. 395/700, 600, 395/705, 708

[56] References Cited

U.S. PATENT DOCUMENTS

| | | | |
|---|---|---|---|
| 5,175,856 | 12/1992 | Van Dyke et al. | 395/704 |
| 5,187,789 | 2/1993 | O'Hair | 395/604 |
| 5,276,881 | 1/1994 | Chan | 395/707 |
| 5,280,617 | 1/1994 | Brender et al. | 395/705 |

OTHER PUBLICATIONS

"Compilers Unlock RISC Secrets", Larry B. Weber, ESD: The Electronic System Design Magazine, v19, n12, p26(5) Dec. 1989.

*Primary Examiner*—Thomas G. Black
*Assistant Examiner*—Hosain T. Alam
*Attorney, Agent, or Firm*—Anne E. Saturnelli; David A. Dagg; Arthur W. Fisher

[57] ABSTRACT

A compiler framework uses a generic "shell" and a generic back end (where the code generator is target-specific). The generic back end provides the functions of optimization, register and memory allocation, and code generation. The code generation function of the back end may be targeted for any of a number of computer architectures. A front end is tailored for each different source language, such as Cobol, Fortran, Pascal, C, C++, etc. The front end scans and parses the source code modules, and generates from them an intermediate language representation of the source code programs expressed in the source code. The intermediate language represents any of the source code languages in a universal manner, so the interface between the front end and back end is of a standard format, and need not be rewritten for each language-specific front end. A feature is the type definition (TD) mechanism, referred to a the TD module. This module provides mechanisms used by the front end and the compiler of the back end in constructing program "type-information" to be incorporated in an object module for use by a linker or debugger. The creation of "type-information" takes place in the context of symbol table creation and allows a front end to specify to the back end an abstract representation of program type information. The TD module provides service routines that allow a front end to describe basic types and abstract types.

21 Claims, 4 Drawing Sheets

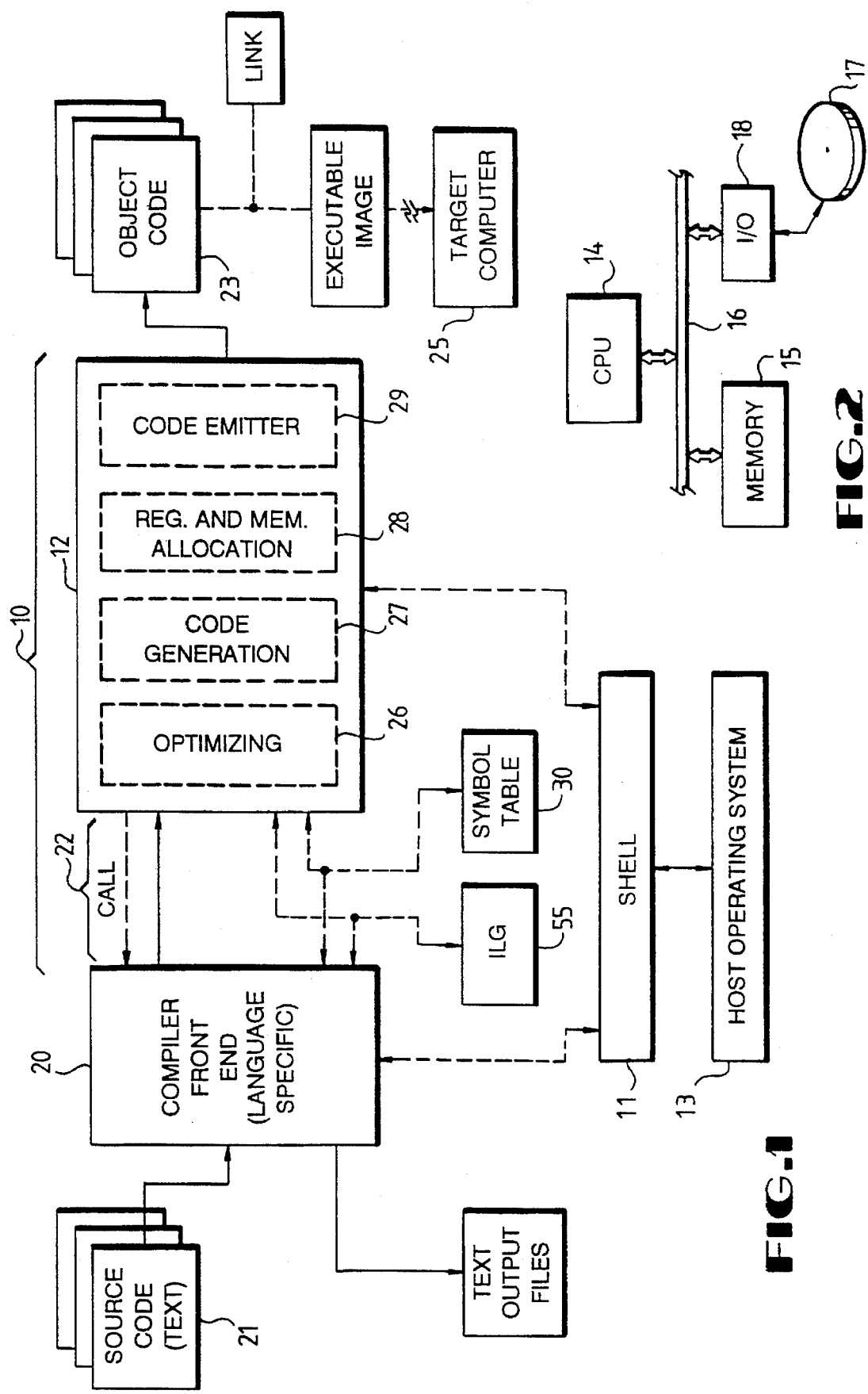

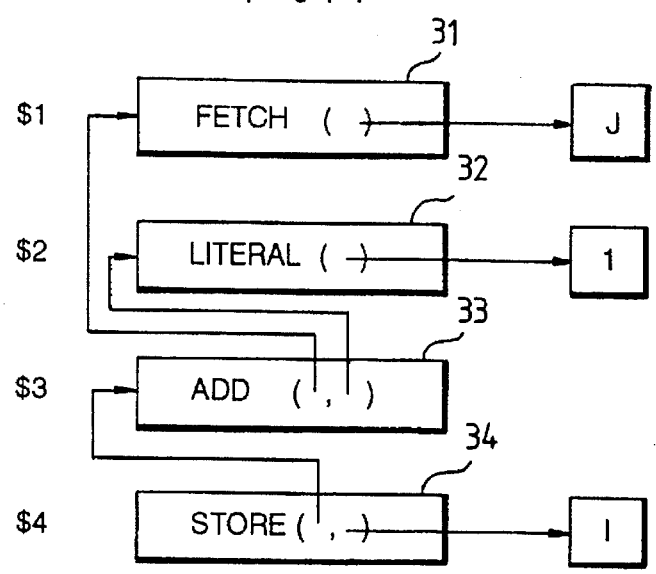
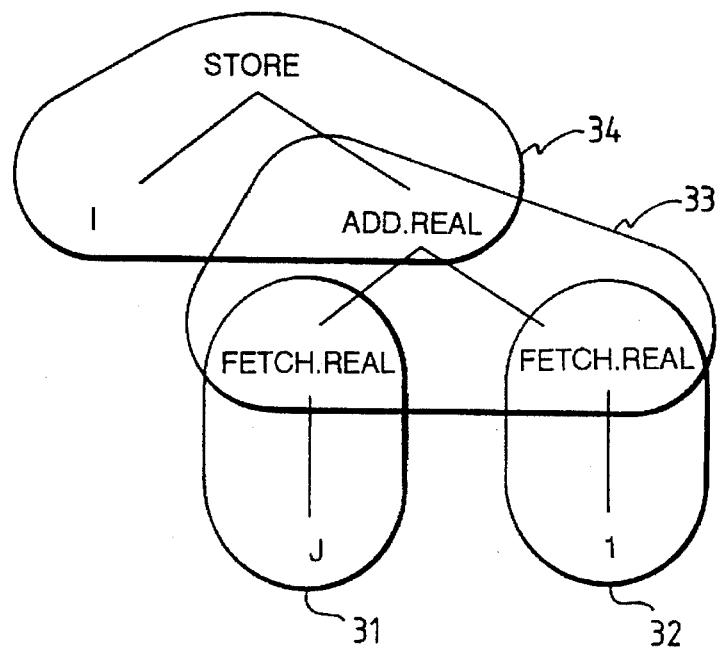
FIG. 3

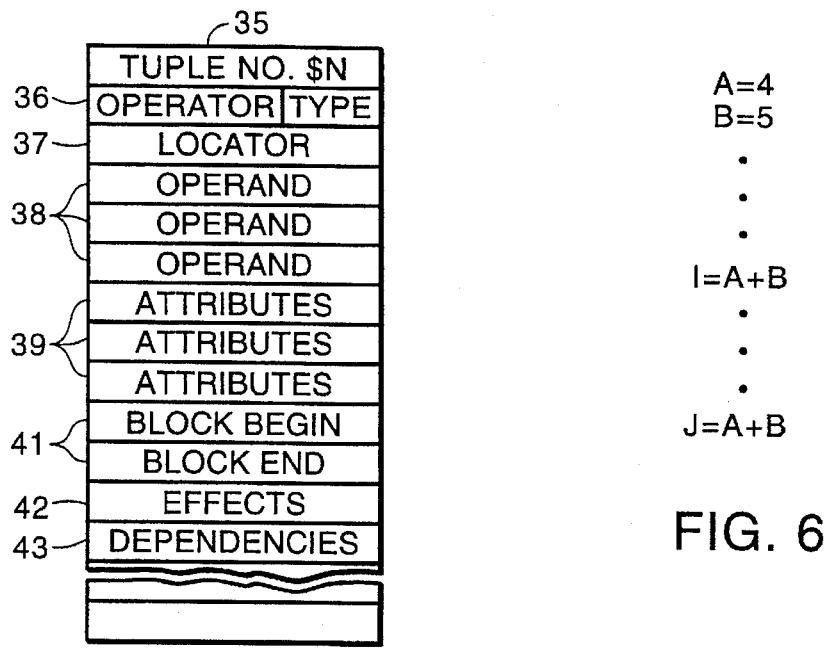
FIG. 4
FIG. 6
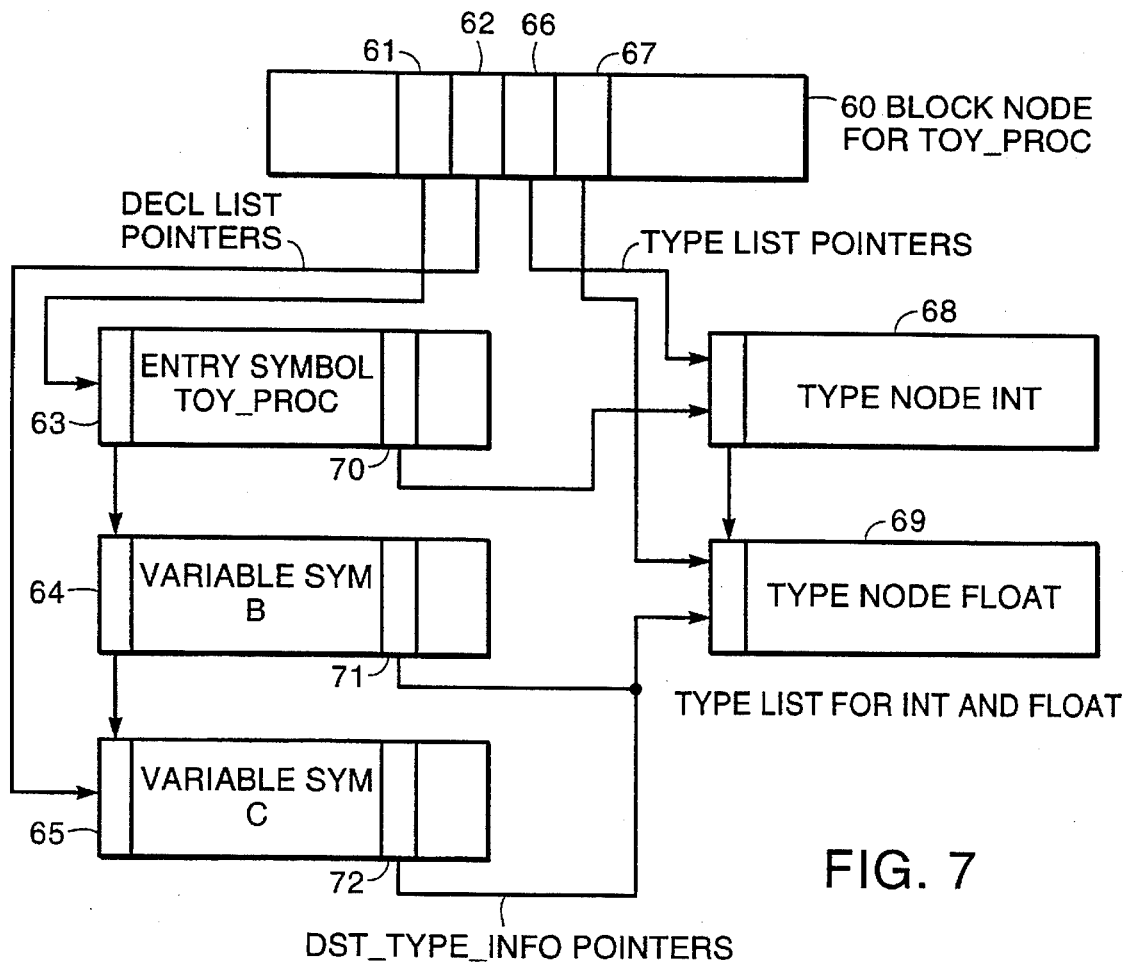
FIG. 7

INTERFACE FOR SYMBOL TABLE CONSTRUCTION IN A MULTILANGUAGE OPTIMIZING COMPILER

This application is a continuation of applications Ser. No. 07/662,477, abandoned, filed Feb. 27, 1991, and Ser. No. 08/243,615, abandoned, filed May 16, 1994.

RELATED CASES

This application discloses subject matter also disclosed in the following copending applications, filed herewith and assigned to Digital Equipment Corporation, the assignee of this application:

Ser. No. 662,461, filed Feb. 27, 1991, now U.S. Pat. No. 5,493,675, by Robert Neil Faiman, Jr., David Scott Blickstein and Steven Hobbs, for "INTERFACE FOR REPRESENTING EFFECTS IN A MULTILANGUAGE OPTIMIZING COMPILER"; (PD90-0364)

Ser. No. 662,725, filed Feb. 27, 1991, by Robert Neil Faiman, Jr., for "METHOD OF CONSTRUCTING A CONSTANT-FOLDING MECHANISM IN A MULTILANGUAGE OPTIMIZING COMPILER"; (PD90-0365)

Ser. No. 662,483, filed Feb. 27, 1991, now U.S. Pat. No. 5,577,253, by David Scott Blickstein, for "ANALYZING INDUCTIVE EXPRESSIONS IN A MULTILANGUAGE OPTIMIZING COMPILER"; (PD90-0368)

Ser. No. 662,464, filed Feb. 27, 1991, by Caroline Sweeney Davidson, Richard Barry Grove and Steven Hobbs, for "MULTILANGUAGE OPTIMIZING COMPILER USING TEMPLATES IN MULTIPLE PASS CODE GENERATION". (PD90-0369)

BACKGROUND OF THE INVENTION

This invention relates to compilers for digital computer programs, and more particularly to a compiler framework that is adapted to be used with a number of different computer languages, to generate code for a number of different target machines.

Compilers are usually constructed for translating a specific source language to object code for execution on a specific target machine which has a specific operating system. For example, a Fortran compiler may be available for generating code for a computer having the VAX architecture using the VMS operating system, or a C compiler for a 80386 computer executing MS/DOS. Intermediate parts of these language- and target-specific compilers share a great deal of common structure and function, however, and so construction of a new compiler can be aided by using some of the component parts of an existing compiler, and modifying others. Nevertheless, it has been the practice to construct new compilers for each combination of source language and target machine, and when new and higher-performance computer architectures are designed the task of rewriting compilers for each of the commonly-used source languages is a major task.

The field of computer-aided software engineering (CASE) is heavily dependent upon compiler technology. CASE tools and programming environments are built upon core compilers. In addition, performance specifications of computer hardware are often integrally involved with compiler technology. The speed of a processor is usually measured in high-level language benchmarks, so therefore optimizing compilers can influence the price-performance factor of new computer equipment.

In order to facilitate construction of compilers for a variety of different high-level languages, and different target computer architectures, it is desirable to enhance the commonality of core components of the compiler framework. The front end of a compiler directly accesses the source code module, and so necessarily is language-specific; a compiler front end constructed to interpret Pascal would not be able to interpret C. Likewise, the code generator in the back end of a compiler has to use the instruction set of the target computer architecture, and so is machine-specific. Thus, it is the intermediate components of a compiler that are susceptible to being made more generic. compiler front end usually functions to first translate the source code into an intermediate language, so that the program that was originally written in the high-level source language appears in a more elemental language for the internal operations of the compiler. The front end usually produces a representation of the program or routine, in intermediate language, in the form of a so-called graph, along with a symbol table. These two data structures, the intermediate language graph and the symbol table, are the representation of the program as used internally by the compiler. Thus, by making the intermediate language and construction of the symbol table of universal or generic character, the components following the front end can be made more generic.

After the compiler front end has generated the intermediate language graph and symbol table, various optimizing techniques are usually implemented. The flow graph is rearranged, meaning the program is rewritten, to optimize speed of execution on the target machine. Some optimizations are target-specific, but most are generic. Commonly-used optimizations are code motion, strength reduction, etc. Next in the internal organization of a compiler is the register and memory allocation. Up to this point, data references were to variables and constants by name or in the abstract, without regard to where stored; now, however, data references are assigned to more concrete locations, such as specific registers and memory displacements (not memory addresses yet). At this point, further optimizations are possible, in the form of register allocation to maintain data in registers are minimize memory references; thus the program may be again rearranged to optimize register usage. Register allocation is also somewhat target machine dependent, and so the generic nature of the compiler must accommodate specifying the number, size and special assignments for the register set of the target CPU. Following register and memory allocation, the compiler implements the code generation phase, in which object code images are produced, and these are of course in the target machine language or instruction set, i.e., machine-specific. Subsequently, the object code images are linked to produce executable packages, adding various run-time modules, etc., all of which is machine-specific.

In a typical compiler implementation, it is thus seen that the structure of the intermediate language graph, and the optimization and register and memory allocation phases, are those most susceptible to being made more generic. However, due to substantive differences in the high-level languages most commonly used today, and differences in target machine architecture, obstacles exist to discourage construction of a generic compiler core.

SUMMARY OF THE INVENTION

In accordance with one embodiment of the invention, a compiler framework is provided which uses a generic "shell" or control and sequencing mechanism, and a generic back end (where the code generator is of course target-specific). The generic back end provides the functions of optimization, register and memory allocation, and code generation. The shell may be executed on various host computers, and the code generation function of the back end may be targeted for any of a number of computer architectures. A front end is tailored for each different source language, such as Cobol, Fortran, Pascal, C, C++, Ada, etc. The front end scans and parses the source code modules, and generates from them an intermediate language representation of the programs expressed in the source code. This intermediate language is constructed to represent any of the source code languages in a universal manner, so the interface between the front end and back end is of a standard format, and need not be rewritten for each language-specific front end.

The intermediate language representation generated by the front end is based upon a tuple as the elemental unit, where each tuple represents a single operation to be performed, such as a load, a store, an add, a label, a branch, etc. A data structure is created by the front end for each tuple, with fields for various necessary information. Along with the ordered series of tuples, the front end generates a symbol table for all references to variables, routines, labels, etc., as is the usual practice. The tuples are in ordered sequences within blocks, where a block is a part of the code that begins with a routine or label and ends in a branch, for example, where no entry or exit is permitted between the start and finish of a block. Each block is also a data structure, or node, and contains pointers to its successors and predecessors (these being to symbols in the symbol table). The interlinked blocks make up a flow graph, called the intermediate language graph, which is the representation of the program used by the back end to do the optimizations, register and memory allocations, etc.

One of the features of the invention is a mechanism for representing effects and dependencies in the interface between front end and back end. A tuple has an effect if it writes to memory, and has a dependency if it reads from a location which some other node may write to. Various higher level languages have differing ways of expressing operations, and the same sequence may in one language allow a result or dependency, while in another language it may not. Thus, a mechanism which is independent of source language is provided for describing the effects of program execution. This mechanism provides a means for the compiler front end to generate a detailed language-specific information to the multi-language optimizer in the compiler back end. This mechanism is used by the global optimizer to determine legal and effective optimizations, including common subexpression recognition and code motions. The intermediate language and structure of the tuples contain information so that the back end (optimizers) can ask questions of the front end (obtain information from the intermediate language graph), from which the back end can determine when the execution of the code produced for the target machine for one tuple will affect the value computed by code for another tuple. The interface between back end and front end is in this respect language independent. The back end does not need to know what language it is compiling. The advantage is that a different back end (and shell) need not be written for each source language, but instead an optimizing compiler can be produced for each source language by merely tailoring a front end for each different language.

Another feature of one embodiment of the invention is the use in the optimization part of the compiler of a method for analyzing induction variables. A variable is said to be an induction variable if it increments or decrements once every time through the loop, and is executed at most once each time through the loop. In addition to finding induction variables, this optimization finds inductive expressions, which are expressions that can be computed as linear functions of induction variables. The object of this optimization is generally to replace multiplications with additions, which are cheaper execute faster on most architectures); this is known as strength reduction. Detection of induction variables requires the use of "sets" of potential induction variables; doing this dynamically for each loop is an expensive and complicated operation, so the improvement here is to use the side effects sets used to construct IDEF sets.

An additional feature of one embodiment of the invention is a mechanism for "folding constants" (referred to as K-folding or a KFOLD routine), included as one of the optimizations. This mechanism is for finding occurrences where expressions can be reduced to a constant and calculated at compile time rather than a more time-consuming calculation during runtime. An important feature is that the KFOLD code is built by the compiler framework itself rather than having to be coded or calculated by the user. The KFOLD builder functions as a front end, like the other language-specific front ends, but there is no source code input; instead, the input is in intermediate language and merely consists of a listing of all of the operators and all of the data types. The advantage is that a much more thorough KFOLD package can be generated, at much lower cost.

A further feature of one embodiment is the type definition mechanism, referred to a the TD module. This module provides mechanisms used by the front end and the compiler of the back end in constructing program type information to be incorporated in an object module for use by a linker or debugger. The creation of "type information" takes place in the context of symbol table creation and allows a front end to specify to the back end an abstract representation of program type information. The TD module provides service routines that allow a front end to describe basic types and abstract types.

In addition, a feature of one embodiment is a method for doing code generation using code templates in a multipass manner. The selection and application of code templates occurs at four different times during the compilation process: (1) The pattern select or PATSELECT phase does a pattern match in the CONTEXT pass to select the best code templates; (2) The TNASSIGN and TNLIFE tasks of the CONTEXT pass use context actions of the selected templates to analyze the evaluation order to expressions and to allocate temporary names (TNs) with lifetimes nonlocal to the code templates; (3) The TNBIND pass uses the binding actions of the selected templates to allocate TNs with lifetimes local to the code templates; (4) Finally, the CODE pass uses code generation actions of the selected templates to guide the generation of object code.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 1 is a schematic representation of a compiler using features of the invention;

FIG. 2 is an electrical diagram in block form of a host computer upon which the methods of various features of the invention may be executed;

FIG. 3 is a diagrammatic representation of code to be compiled by the compiler of FIG. 1, in source code form, intermediate language form, tree from, and assembly language form;

FIG. 4 is a diagrammatic representation of the data structure of a tuble used in the compiler of FIG. 1;

FIG. 6 is an example listing of code containing constants; and

FIG. 7 is a diagram of data fields and relationships (pointers) for illustrating type definition according to one feature of the invention.

DETAILED DESCRIPTION OF SPECIFIC EMBODIMENTS

Figure 5:
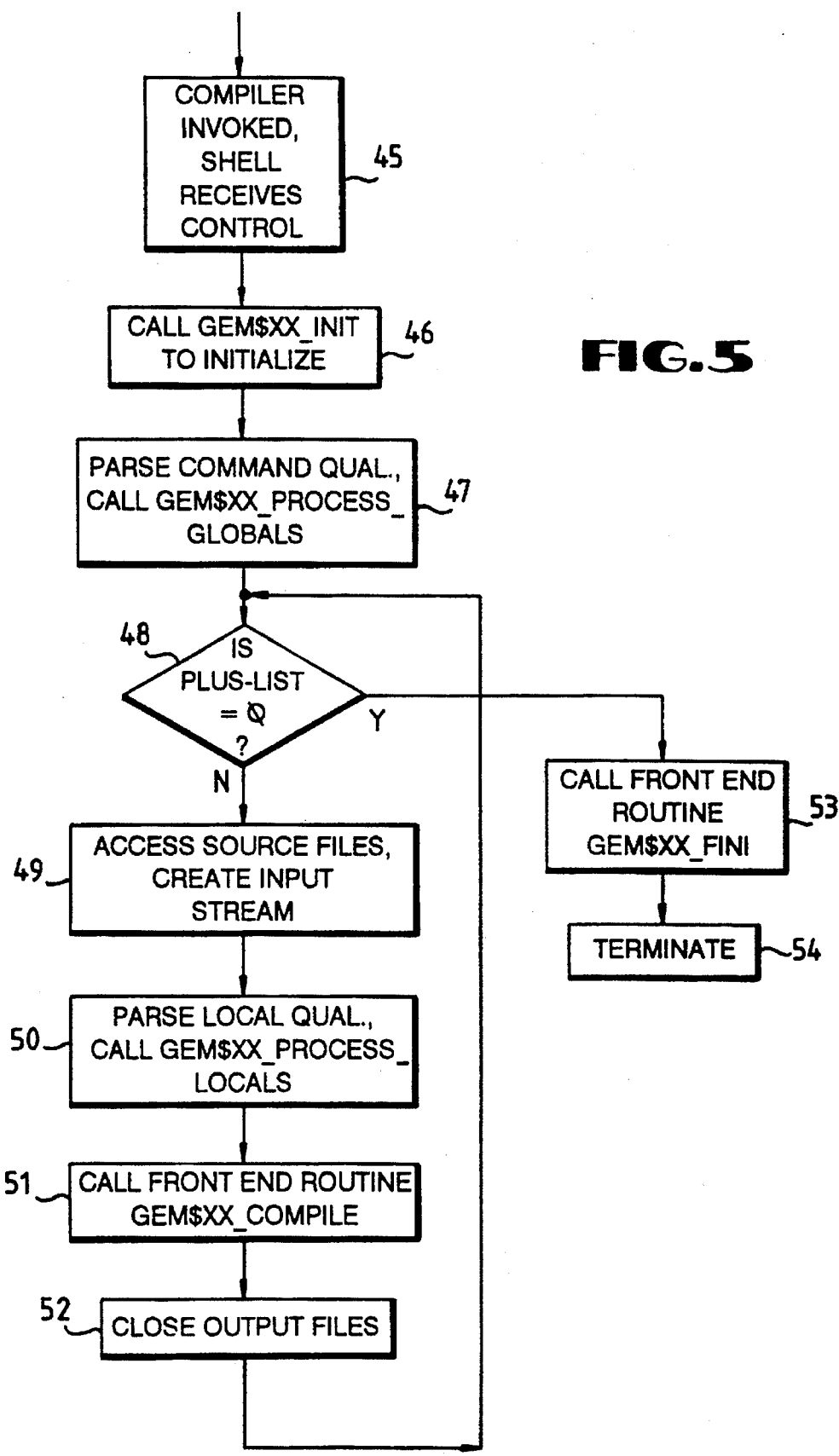
FIG. 5 is a logic flow chart of the operation of the shell of FIG. 1.

Referring to FIG. 1, the compiler framework 10 according to one embodiment of the invention is a language-independent framework for the creation of portable, retargetable compilers. The compiler framework 10 consists of a portable operating system interface referred to as the shell 11 and a retargetable optimizer and code generator 12 (the back end). The shell 11 is portable in that can be adapted to function with any of several operating systems such as VAX/VMS, Unix, etc., executing on the host computer. The shell operates under this host operating system 13 executing on a host computing system as seen in FIG. 2, typically including a CPU 14 coupled to a main memory 15 by a system bus 16, and coupled to disk storage 17 by an I/O controller 18. The shell 11 and compiler 12 may be combined with a front end 20 to create a portable, retargetable compiler for a particular source language. Thus, a compiler based on the framework 10 of the invention consists of three basic parts: a shell 11 which has been tailored for a particular host operating system 14—this determines the host environment of the compiler; a front end 20 for a particular source language (e.g., C, C++, Pascal, Fortran, Ada, Cobol, etc.)—this determines the source language of the compiler; and a back end 12 for a particular target machine (i.e., a particular architecture such as VAX, RISC, etc.)—this determines the target machine of the compiler.

Since the interfaces between the shell 11, the front end 20, and the back end 12 are fixed, the individual components of a compiler produced according to the invention may be replaced freely. That is, the front end 20 may consist of a number of interchangeable front ends, e.g., one for Fortran, one for Cobol, one for Pascal, one for C, etc. Likewise, a shell 11 tailored for running under VMS on a VAX computer may be replaced by a shell 11 running under the Unix operating system on a RISC workstation, while the front end 20 and back end 12 remain the same.

The shell 11 provides a fixed interface between the host operating system 13 and the rest of the compiler. The shell provides several advantages according to the invention. First, the shell 11 provides a portable interface to basic features of the operating system 13. For example, the front end 20 need not know details of the file system, command parsing, or heap storage allocation under the host operating system 13, since all these services are accessed through shell routines, and the shell is tailored to the operating system 13 being used. Second, the shell 11 eliminates duplication of effort by providing a single implementation of some common compiler components, such as command line parsing, include-file processing, and diagnostic file generation. Third, the use of these common components also guarantees consistency among compilers created using the framework 10; all compilers created using this framework 10 will write listing files in the same format, will treat command line qualifters the same, will issue similar-looking error messages, etc. Fourth, having common shell utilities in the shell 11 improves the internal integration of the compiler, since the front and back ends 20 and 12 use the same shell functions. For example, use of the shell locator package means that source file locations can be referred to consistently in the source listing, front-end generated diagnostics, back-end generated diagnostics, the object listing, and the debugger information.

The front end 20 is the only component of a compiler created by the framework 10 which understands the source language being compiled. This source language is that used to generate the text of a source code file or files (module or modules) 21 which define the input of the compiler. The front end 20 performs a number of functions. First, it calls the shell 11 to obtain command line information and text lines from the source files 21. Second, the front end 20 calls the shell 11 to control the listing file, write diagnostic messages, and possibly to write other files for specific languages. Third, the front end 20 does lexical, syntactic, and semantic analysis to translate the source text in file 21 to a language-independent internal representation used for the interface 22 between the front end 20 and the back end 12. Fourth, the front end 20 invokes the back end 12 to generate target system object code 23 from the information in the internal representation. Fifth, the front end 20 provides routines which the back end 12 calls via call path 24 to obtain language-specific information during back end processing. Not included in the compiler framework of FIG. 1 is a linker which links the object code modules or images 23 to form an executable image to run on the target machine 25.

The target machine 25 for which the back end 12 of the compiler creates code is a computer of some specific architecture, i.e., it has a register set of some specific number and data width, the logic executes a specific instruction set, specific addressing modes are available, etc. Examples are (1) the VAX architecture, as described in (2) a RISC type of architecture based upon the 32-bit RISC chip available from MIPS, Inc., as part number R2000 or R3000 and described by Lane in "MIPS R2000 RISC Architecture", Printice-Hall, 1987, and (3) an advanced RISC architecture with 64-bit registers as described in copending application Ser. No. 547,589, filed Jun. 29, 1990. Various other architectures would be likewise accommodated.

In general, the front end 20 need not consider the architecture of the target machine 25 upon which the object code 23 will be executed, when the front end 20 is translating from source code 15 to the internal representation of interface 22, since the internal representation is independent of the target machine 25 architecture. Some aspects of the front end 20 may need to be tailored to the target system, however; for example, aspects of the data representation such as allocation and alignment, might be customized to fit the target machine 25 architecture better, and routine call argument mechanisms may depend on the target system calling standard, and further the runtime library interface will probably be different for each target system.

The back end 12 functions to translate the internal representation 22 constructed by the front end 20 into target system object code 23. The back end 12 performs the basic functions of optimization 26, code generation 27, storage and register allocation 28, and object file emission 29. The optimization function is performed on the code when it is in its internal representation. The back end 12 also includes utility routines which are called by the front end 20 to create a symbol table 30 and intermediate language data structures.

When the user (that is, a user of the compnter system of FIG. 2, where the computer system is executing the operating system 13) invokes the compiler of FIG. 1 (though a callable interface, or some other mechanism), the shell 11 receives control. The shell 11 invokes the front end 20 to compile an input stream from source file 15 into an object file 23. The front end 20 invokes the back end 12 to produce each object module within the object file 23. The front end 20 may invoke the back end 12 to create code for each individual routine within an object module 23, or it may call a back end driver which will generate code for an entire module at once.

The front end 20 parses the source code 21 and generates an intermediate language version of the program expressed in the source code. The elemental structure of the intermediate language is a tuple. A tuple is an expression which in source language performs one operation. For example, referring to FIG. 3, the expression $$I=J+1$$

as represented in source language is broken down into four tuples for representation in the intermediate language, these being numbered $1, $2, $3 and $4. This way of expressing the code in IL includes a first tuple $1 which is a fetch represented by an item 31, with the object of the fetch being a symbol J. The next tuple is a literal, item 32, also making reference to a symbol "1." The next tuple is an Add, item 33, which makes reference to the results of tuples $1 and $2. The last tuple is a store, item 34, referencing the result of tuple $3 and placing the result in symbol I in the symbol table. The expression may also be expressed as a logic tree as seen in FIG. 3, where the tuples are identified by the same reference numerals. This same line of source code could be expressed in assembly for a RISC type target machine, as three instructions LOAD, ADD integer, and STORE, using some register such as REG 4 in the register file, in the general form seen in FIG. 3. Or, for a CISC machine, the code emitted may be merely a single instruction, ADD #1,J,I as also seen in the Figure.

A tuple, then, is the elemental expression of a computer program, and in the form used in this invention is a data structure 35 which contains at least the elements set forth in FIG. 4, including (1) an operator and type field 36, e.g., Fetch, Store, Add, etc., (2) a locator 37 for defining where in the source module 21 the source equivalent to the tuple is located, (3) operand pointers 38 to other tuples, to literal nodes or symbol nodes, such as the pointers to I and #1 tuples $1 and $2 in FIG. 3. A tuple also has attribute fields 39, which may include, for example, Label, Conditional Branch, Argument (for Calls), or SymRef (a symbol in the symbol table). The tuple has a number field 40, representing the order of this tuple in the block.

The front end 20 parses the source code to identify tuples, then to identify basic blocks of code. A block of code is defined to be a sequence of tuples with no entry or exit between the first and last tuple. Usually a block starts with a label or routine entry and ends with a branch to another label. A task of the front end 20 is to parse the source code 21 and identify the tuples and blocks, which of course requires the front end to be language specific. The tuple thus contains fields 41 that say whether or not this tuple is the beginning of a block, and the end of a block.

As discussed in more detail below, one feature of the invention is a method of representing effects. A tuple has effects if it stores or writes to a memory location (represented at the IL level as a symbol), or is dependent upon what another tuple writes to a location. Thus, in the example given in FIG. 3, tuple $4 has an effect (store to I) and tuple $1 has a dependency (content of J). Thus the tuple data structure as represented in FIG. 4 has fields 42 and 43 to store the effects and dependencies of this tuple.

A single execution of a compiler of FIG. 1 is driven by the shell 11 as illustrated in the flow chart of FIG. 5. As indicated by the item 45 of FIG. 5, the shell 11 receives control when the compiler of FIG. 1 is invoked by the user via the operating system 13. The user in a command line specifies a "plus-list" or list of the modules 21 to be operated upon. The next step is calling by the shell 11 of a front-end routine GEM$XX_INIT, which does any necessary initialization for the front end, indicated by the item 46. This front end routine GEM$XX_INIT is described in the Appendix. Next, the shell 11 parses the global command qualifiers and calls the front end routine GEM$XX_PROCESS_GLOBALS, as indicated by the item 47. Then, for each "plus-list" (comma-separated entity) in the command line used at the operating system 13 level to involve the compiler, the shell executes a series of actions; this is implemented by a loop using a decision point 48 to check the plus-list. So long as there is an item left in the plus-list, the actions indicated by the items 49–52 are executed. These actions include accessing the source files 21 specified in the command line and creating an input stream for them, indicated by the item 49, then parsing the local qualifiers (specific to that plus-list), calling GEM$XX_PROCESS_LOCALS to do any front-end determined processing on them, and opening the output files specified by the qualifiers, indicated by the item 50. The actions in the loop further include calling the front-end routine GEM$XX_COMPILE to compile the input stream, indicated by the item 51, then closing the output files, item 52. When the loop falls through, indicating all of the plus-list items have been processed, the next step is calling the front end routine GEM$XX_FINI to do any front-end cleanup, indicated by item 53. Then, the execution is terminated, returning control to the invoker, item 54.

The shell 11 calls GEM$XX_COMPILE to compile a single input stream. An input stream represents the concatenation of the source files or modules 21 specified in a single "plus list" in the compiler command line, as well as any included files or library text. By default, compiling a single input stream produces a single object file 23, although the compiler does allow the from end 20 to specify multiple object files 23 during the compilation of an input stream.

Before calling GEM$XX_COMPILE, the shell 11 creates the input stream, parses the local qualifters, and opens the output files. After calling GEM$XX_COMPILE, it closes all the input and output files.

The front end 20 (GEM$XX_COMPILE and the front-end routines that are called from it) reads source records 21 from the input stream, translates them into the intermediate representation of interface 22 (including tuples, blocks, etc. of the intermediate language graph, and the symbol table) and invokes the back end 12 to translate the intermediate representation into object code in the object file 23.

An object file 23 may contain any number of object modules. Pascal creates a single object module for an entire input stream (a MODULE or PROGRAM). FORTRAN (in one embodiment) creates a separate object module for each END statement in the input stream. BLISS creates an object module for each MODULE.

To create an object module 23, the front end 20 translates the input stream or some subsequence thereof (which we can call a source module 21) into its internal representation for interface 22, which consists of a symbol table 30 for the module and an intermediate language graph 55 for each routine. The front end 20 then calls back end routines to initialize the object module 23, to allocate storage for the symbols in the symbol table 30 via storage allocation 28, to initialize that storage, to generate code for the routines via emitter 29, and to complete the object module 23.

The compiler is organized as a collection of packages, each of which defines a collection of routines or data structures related to some aspect of the compilation process. Each package is identified by a two-letter code, which is generally an abbreviation of the package function. The interface to a package is defined by a specification file. If a package is named ZZ, then its specification file will be GEM$ZZ.SDL.

Any symbol which is declared in a package's specification file is said to be exported from that package. In general, symbols exported from package ZZ have names beginning with GEM$ZZ_. The specific prefixing conventions for global and exported names are set forth in Table 1.

The shell 11 is a collection of routines to support common compiler activities. The shell components are interrelated, so that a program that uses any shell component gets the entire shell. It is possible, however, for a program to use the shell 11 without using the back end 12. This can be a convenient way of writing small utility programs with production-quality features (input file concatenation and inclusion, command line parsing, diagnostic file generation, good listing files, etc.) Note that the shell 11 is actually the "main program" of any program that uses it, and that the body of the application must be called from the shell 11 using the conventions described below. To use a shell package ZZ from a BLISS program, a user does a LIBRARY 'GEM$ZZ'. To use the shell from other languages, a user must first translate the shell specification files into the implementation language.

The shell packages are summarized in the following paragraphs; they are documented in their specification files (the GEM$ZZ.SDL files) in the Appendix. Most shell routine arguments (e.g., integer, string, etc.) fall into one of the categories set forth in Table 2.

The interface from the shell 11 to the front end 20 has certain requirements. Since the shell 11 receives control when a compiler of FIG. 1 is invoked, a front end 20 must declare entry points so the shell 11 can invoke it and declare global variables to pass front end specific information to the shell 11. The front end 20 provides the global routines set forth in Table 3, in one embodiment. These routines have no parameters and return no results.

The Virtual Memory Package (GEM$VM): The virtual memory package provides a standard interface for allocating virtual memory. It supports the zoned memory concept of the VMS LIB$VN facility; in fact, under VMS, GEM$VM is an almost transparent layer over LIB$VM. However, the GEM$VM interface is guaranteed to be supported unchanged on any host system.

The Locator Package (GEM$LO): A locator describes a range of source text 21 (starting and ending file, line, and column number). The text input package returns locators for the source lines that it reads. Locators are also used in the symbol table 30 and intermediate language nodes 43 to facilitate message and debugger table generation, and are used for specifying where in the listing file the listing package should perform actions. A locator is represented as a longword. The locator package maintains a locator database, and provides routines to created and interpret locators. There is also a provision for user-created locators, which allow a front end to create its own locators to describe program elements which come from a non-standard source (for example, BLISS macros or Ada generic instantiation).

The Text Input Package (GEM$TI): The text input package supports concatenated source files 21, nested (included) source files 21, and default and related files specs, while insulating the front end 20 from the I/O architecture of the underlying operating system 13. Text of a source file 21 is read a line at a time. The text input package GEM$TI colludes with the locator package GEM$LO to create a locator describing each source line it reads.

The Text Output Package (GEM$TX): The text output package supports output to any number of output files 44 simultaneously. Like the text input package, it insulates its caller from the operating system 13. It will write strings passed by reference or descriptor. It provides automatic line wrapping and indentation, page wrapping, and callbacks to a user-provided start-of-page routine.

The Listing Package (GEM$LS): The listing package will write a standard format listing file containing a copy of the source files 21 (as read by the text input package GEM$TI), with annotations provided by the front end 11 at locations specified with locators. The listing file is created as a GEM$TX output file 44, which the front end 20 may also write to directly, using the GEM$TX output routines.

The Internal Representation

The internal representation of a module 21 comprises a symbol table 30 for the module and a compact intermediate language graph 55 or CILG, for each routine in source module 21. These are both pointer-linked data structures made up of nodes.

Nodes, according to the framework of FIG. 1, will be defined. Almost all data structures used in the interface between the front and back ends 20 and 12 (and most of the data structures used privately by the back end 12) are nodes. A node as the term is used herein is a self-identifying block of storage, generally allocated from the heap with GEM$VM_GET. All nodes have the aggregate type GEM$NODE, with fields GEM$NOD_KIND and GEM$NOD_SUBKIND. Kind is a value from the enumerated type GEM$NODE_KINDS which identifies the general kind of the node. Subkind is a value from the enumerated type GEM$NODE_SUBKINDS which identifies the particular kind of the node within the general class of nodes specified by kind. Any particular node also has an aggregate type determined by its kind field. For example, if kind is GEM$NODE_K_SYMBOL, then the node has type GEM$SYMBOL_NODE. Note that the types associated with nodes do not obey the naming conventions described above. The interface node types and their associated enumerated type constants are defined in the files set forth in Table 4.

The compiler framework of FIG. 1 supports a simple tree-structured symbol table 30, in which symbol nodes are linked together in chains off of block nodes, which are arranged in a tree. All symbolic information to be used by the compiler must be included in this symbol table 30. There are also literal nodes, representing literal values of the compiled program; frame nodes, representing storage areas (PSECTs and stack frames) where variables may be allocated; and parameter nodes, representing elements in the parameter lists of routine entry points. The symbol table structure and the contents of symbol table nodes are described below.

The intermediate language is the language used for all internal representations of the source code 21. The front end 20 describes the code of a routine to be compiled as a compact intermediate language graph 55, or CILG. This is simply a linked list of CIL tuple nodes 35 of FIG. 4 (also referred to as tuple nodes, or simply as tuples), each of which represents an operation and has pointers 38 to the tuple nodes representing its operands. Tuple nodes may also contain pointers 38 to symbol table nodes. The intermediate language is described in more detail below.

The from end 20 must create the internal representation 22 of the module 21 one node at a time, and link the nodes together into the symbol table 30 and IL data structures 55. The routines and macros of Table 5, also documented in the Appendix, are used to create and manipulate the data structures of the internal representation 22.

The back end 12 makes no assumptions about how the front end 20 represents block and symbol names. Instead, the front end 20 is required to provide a standard call-back interface that the back end 12 can use to obtain these names.

Every symbol node has a flag, GEM$SYM_HAS_ NAME, and every block node has a flag, GEM$BLK_ HAS_NAME. When the front end 20 initializes a symbol or block node, it must set its has name flag to indicate whether a name string is available for it. (Some symbols and blocks, such as global and external symbols and top level module blocks, must have names.)

There is a global variable, GEM$ST_G_GET_NAME, in the ST package. Before invoking the back end, the front end must set this variable to the address of a callback routine which fits the description set forth in Table 5.

To compile a source module using the GEM$CO_ COMPILE_MODULE interface, a front end (that is, the routing GEM$XX_COMPILE) does (in order) each of the activities described in the following paragraphs.

1. Create the Internal Representation

The first task of the front end 20 is to create the internal representation 22 of the source module. To begin with, it must call GEM$ST_INIT to initialize the symbol table 30 and associated virtual memory zones. It must then read the source module 21 from the input stream, using the GEM$TI package; do lexical, syntactic, and semantic analysis of the source module 21; and generate the symbol table 30 and the intermediate language graphs 55 for the module as described above, using the GEM$ST and GEM$IL routines which are documented in the Appendix.

In addition, the module's source listing may be annotated with calls to the GEM$LS shell package, and error's in the module may be reported with calls to the GEM$MS package.

If the source module 21 contains errors severe enough to prevent code generation, then the front end 20 should now call GEM$LS_WRITE_SOURCE to write the listing file and GEM$ST_FINI to release all the space allocated for the internal representation 22. Otherwise, it must proceed with the following steps.

2. Specify the Callback Routines

Before calling the back end 12 to compile the module 21, the front end 20 must initialize the following global variables with the addresses of routines that will be called by the back end 12.

(1) GEM$ST_G_GET_NAME must be initialized to the address of a routine that will yield the names of symbol and block nodes in the symbol table 30, as described above.

(2) The GEM$SE_G global variables must be initialized to the addresses of routines that will do source-language defined side effect analysis, as described below. The compiler provides a predefined collection of side effect routines, suitable for use during the early development of a front end 20, which can be selected by calling GEM$SE_DEFAULT_ IMPLEMENTATION.

(3) GEM$ER_G_REPORT_ROUTINE contains the address of the front end's routine for reporting back end detected errors, as described below.

3. Do the Compilation

When the internal representation is complete, the front end 20 can call GEM$CO_COMPILE_MODULE (described below) to translate it into target machine object representation 23. The front end should then call GEM$LS_ WRITE_SOURCE to list the input stream in the listing file. It may also call GEM$ML_LIST_MACHINE_CODE to produce an assembly code listing of the compiled module 23.

Note that normally, GEM$LS_WRITE_SOURCE has to be called after GEM$CO_COMPILE_MODULE so that the source listing 21 can be annotated with any error messages generated during back end processing. However, it is a good idea for the front end 20 to provide a debugging switch which will cause GEM$LS_WRITE_SOURCE to be called first. This will make it possible to get a source listing even if a bug causes the compiler to abort during back end processing.

4. Clean Up

When compilation is complete, the front end 20 must call GEM$CO_COMPLETE_MODULE to release the space used for back end processing, and then GEM$ST_FINI to release the space used for the internal representation.

The back end 12 is able to detect conditions during compilation which are likely to represent conditions in the source program 21 which ought to be reported to the user, such as uninitialized variables, unreachable code, or conflicts of static storage initialization. However, a particular front end 20 may need to customize which of these conditions will be reported, or the precise messages that will be issued.

To allow this, the back end 12 reports all anomalous conditions that it detects by calling the routine whose address is in the global variable GEM$34_G_REPORT_ ROUTINE, with the argument list described below. This routine is responsible for actually issuing the error message.

There is a default error reporting routine set forth in the Appendix named GEM$ER_REPORT_ROUTINE, whose address will be in GEM$ER_G_REPORT_ROUTINE unless the front end has stored the address of its own report routine there. This default routine has three uses:

(1) The default routine provides reasonable messages, so the front end developers are not obliged to provide their own routine unless and until they need to customize it.

(2) When the front end developers do choose to write a report routine, they can use the default routine as a model.

(3) The front end's routine can be written as a filter, which processes (or ignores) certain errors itself, and calls the default routine with all others.

INTERFACE FOR REPRESENTING EFFECTS

As an essential step in detecting common subexpressions (CSEs), invariant expressions, and opportunities for code motion, the optimizer 26 in the back end 12 must be able to determine when two expression tuples are guaranteed to compute the same value. The basic criterion is that an expression B computes the same value as an expression A if:

1.

A and B are literal references to literals with the same value, CSE references to the same CSE, or symbol references to the same symbol; or

2.

a. A is evaluated on every control flow path from the start of the routine to B, and b. A and B have the same operator and data type, and c. the operands of B compute the same values as the corresponding operands of A (obviously a recursive definition), and d. no tuple which occurs on any path from an evaluation of A to an evaluation of B can affect the value computed by B.

The optimizer 26 of FIG. 1 can validate criteria 1, 2a, 2b, and 2c by itself; but criterion 2d depends on the semantics of the language being compiled, i.e., the language of source code module 21. But since the compiler 12 in the back end must be language-independent, a generic interface is provided to the front end 20 to convey the necessary information. When can the execution of one tuple affect the value computed by another tuple? The interface 22 must allow the optimizer 26 to ask this question, and the compiler front end 20 to answer it.

The model underlying this interface 22 is that some tuples have effects, and that other tuples have dependencies. A tuple has an effect if it might change the contents of one or more memory locations. A tuple has a dependency on a memory location if the value computed by the tuple depends on the contents of the memory location. Thus, the execution of one tuple can affect the value computed by another tuple if it has the effect of modifying a memory location which the other tuple depends on.

Given the ramifications of address arithmetic and indirect addressing, it is impossible in general to determine the particular memory location accessed by a tuple. Thus we must deal with heuristic approximations to the sets of memory locations which might possibly be accessed.

The actual interface 22 provides two mechanism for the front end 20 to communicate dependency information to the optimizer 26. These are the straight-line dependency interface and the effects-class interface.

In the straight-line dependency interface, to determine dependencies in straight-line code, the optimizer 26 will ask the front end 20 to (1) push tuples on an effects stack and pop them off again, and (2) find the top-most tuple on the effects stack whose execution might possibly affect the value computed by a specified tuple.

The straight-line mechanism is not appropriate when the optimizer 26 needs to compute what effects might occur as a result of program flow through arbitrary sets of flow paths. For this situation, the front end 20 is allowed to define a specified number (initially 128) of effects classes, each representing some (possibly indeterminate) set of memory locations. A set of effects classes is represented by a bit vector. For example, an effects class might represent the memory location named by a particular variable, the set of all memory locations which can be modified by procedure calls, or the set of memory locations which can be accessed by indirect references (pointer dereferences).

For the effects-class interface, the optimizer will ask the front end to (1) compute the set of effects classes containing memory locations which might be changed by a particular tuple, and (2) compute the set of effects classes containing memory locations which a particular tuple might depend on.

Using this effects-class interface, the optimizer can compute, for each basic block, a bit-vector (referred to as the LDEF set) which represents the set of effects classes containing memory locations which can be modified by some tuple in that basic block.

The optimizer will also ask the front end to (3) compute the set of effects classes which might include the memory location associated with a particular variable symbol.

This information is used by the split lifetime optimization phase (see below) to compute the lifetime of a split candidate.

The optimizer 26 uses these interfaces as follows. Remember that the reason for these interfaces is to allow the optimizer 26 in back end 12 to determine when "no tuple which occurs on any path from an evaluation of A to an evaluation of B can affect the value computed by B." If A and B occur in the same basic block, this just means "no tuple between A and B can change the value computed by B." This can be easily determined using the straight-line dependency interface.

If the basic block containing A dominates the basic block containing B (i.e., every flow path from the routine entry node to the basic block containing B passes through the basic block containing A), then the optimizer finds the series of basic blocks X1, X2, . . . Xn, where X1 is the basic block containing A, Xn is the basic block containing B, and each Xi immediately dominates X(i+1). Then the test has two parts:

1. There must be no tuple between A and the end of basic block X1, or between the beginning of basic block Xn and B, or in any of the basic blocks X2, X3, . . . X(n−1), which can change the value computed by B. This can be easily determined using the straight-line dependency interface.

2. There must be no flow path between two of the basic blocks Xi and X(i+1) which contains a tuple which can change the value computed by B. The optimizer tests this with the effects-class mechanism, by computing the union of the LDEF sets of all the basic blacks which occur on any flow path from Xi to X(i+1), computing the intersection of this set with the set of effects classes containing memory locations that B might depend on, and testing whether this intersection is empty.

The structure of the interface will now be described. The interface routines are called by the back end 12. The front end 20 must make its implementation of the interface available before it invokes the back end 12. It does this by placing the addresses of its interface routine entry points in standard global variables. The optimizer 26 can then load the routine address from the appropriate global variable when it invokes one of these routines. The interface routines are documented below with names of the form GEM_SE_xxx. The front end must store the entry address of each corresponding implementation routine in the global variable named GEM_SE_G_xxx.

Tuples that have effects and dependencies are of interest to this interface. Only a few of the IL tuples can have effects and dependencies. (Roughly speaking, tuples that do a store can have effects; tuples that do a fetch can have a dependency; tuples that do a routine call can have both.)

More specifically, each tuple falls into one of the following categories:

1. The tuple does not have any effects, nor is it dependent on any effects. (Example: ADD). Tuples that fall into this class are NOT pushed on the effects stack. Nor are such tuples ever passed to GEM_SE_EFFECTS.

2. The tuple may have effects, but has no dependencies. (Example: STORE).

3. The tuple may have dependencies, but does not cause any affects. (Example: FETCH).

4. The tuple both may have effects (out-effects) and a separate set of dependencies (in-effects). (Example: procedure calls)

5. The tuple may have both effects and dependencies. The effects it depends on are identical to the effects it produces. (Example: PREINCR).

A particular tuple called the DEFINES tuple is provided to allow a front end 20 to specify effects which are not associated with any tuple. One possible use of the DEFINES tuple would be to implement the BLISS CODECOMMENT feature, which acts as a fence across which optimizations are disallowed. The translation of CODECOMMENT would be a DEFINES tuple that has all effects, and therefore invalidate all tuples.

Argument passing tuples (such as ARGVAL and ARGADR) have effects and dependencies. However, the effects and dependencies of a parameter tuple are actually considered to be associated with the routine call that the parameter tuple belongs to. For example, in the BLISS routine call F(X,.X+Y), the parameter X would have the effect of changing X. However, this would not invalidate a previously computed value of .X+.Y, since the effect does not actually occur until F is called.

The data structure of FIG. 4 representing a tuple is accessed by both front end 20 and back end 12, and some fields of this structure are limited to only from end or only back end access. Every tuple 35 which can have effects or dependencies will contain one or more longword fields 42 or 43, typically named GEM_TPL_xxx_EFFECTS or GEM_TPL_xxx_DEPENDENCIES. The field names used for particular tuples are described in the section on The Intermediate Language. No code in the back end will ever examine or modify these fields—they are reserved for use by the front end. They are intended as a convenient place to record information which can be used to simplify the coding of the interface routines. There is a similar longword field named GEM_SYM_EFFECTS in each symbol node of symbol table 30, which is also reserved for use by the front end 20.

For the straight-line dependency interface, a description of the routines will now be given. The front end provides an implementation of the following routines:

GEM_SE_PUSH_EFFECT(EIL_TUPLE: in GEM_TUPLE_NODE) Pushes the EIL tuple whose address is in the EIL_TUPLE parameter onto the effects stack.

GEM_SE_PUSH_EFFECT(EIL_TUPLE: in GEM_TUPLE_NODE)—Pops the topmost EIL tuple from the effects stack. This is guaranteed to be the tuple whose address is in the EIL_TUPLE parameter. Of course, this means that the parameter is redundant. However, it may simplify the coding of the POP procedure for a front end that doesn't use a single-stack implementation for the effects stack (see the implementation discussion below).

```
GEM_TUPLE_NODE =
    GEM_SE_FIND_EFFECT(
        EIL_TUPLE    : in GEM_TUPLE_NODE,
        MIN_EXPR_COUNT : value)
```

Returns the most recently pushed tuple whose GEM_TPL_EXPR_COUNT field is greater than MIN_EXPR_COUNT (see below), and whose execution may change the results produced by EIL_TUPLE. Returns null (zero) if no tuple on the stack affects EIL_TUPLE. May also return the same tuple specified in the parameter.

```
GEM_TUPLE_NODE =
    GEM_SE_FIND_EFFECTS(
        VAR_SYM    : in GEM_SYMBOL_NODE,
        MIN_EXPR_COUNT : value)
```

Returns the most recently pushed tuple whose GEM_TPL_EXPR_COUNT field is greater than MIN_EXPR_COUNT (see below), and whose execution may modify the value of variable VVAR_SYM. Returns null (zero) if no tuple on the stack affects EIL_TUPLE. May also return the same tuple specified in the parameter.

GEM_SE_PUSH_EFFECT and GEM_SE_POP_EFFECT will be called only with tuples which can have effects. GEM_SE_FIND_EFFECT will be called only with tuples which can have dependencies.

There is an order of invocation. Every EIL tuple has a field called GEM_TPL_EXPR_COUNT. This field contains the index of the tuple in a walk of the EILG in which basic blocks are visited in dominator tree depth-first preorder. If the back end 12 calls GEM_SE_PUSH_EFFECT with a tuple A, and subsequently calls GEM_SE_PUSH_EFFECT or GEM_SE_FIND_EFFECT with a tuple B, without having called GEM_SE_POP_EFFECT with tuple A in the interim, then it is guaranteed that either tuple A precedes tuple B in the same basic block, or the basic block containing tuple A properly dominates the basic block containing tuple B. Therefore, the EXPR_COUNT values of tuples on the effects stack decreases with increasing stack depth (i.e., more recently pushed tuples have higher EXPR_COUNTs than less recently pushed tuples). This means that the FIND_EFFECT routine can cut short its search of the effects stack as soon as it encounters a tuple T whose EXPR_COUNT is less than or equal to the MIN_EXPR_COUNT argument. This is because all tuples stacked deeper than T are guaranteed to have EXPR_COUNTs that are less than MIN_EXPR_COUNT.

The mechanism actually used for the implementation of the effects stack is entirely up to the front end 20, as is the rule that it uses to determine when the execution of one tuple might affect the value computed by another tuple. A naive stack implementation is certainly possible, though it would probably be inefficient. A more sophisticated implementation might be built around a hash table, so that multiple small stacks (possibly each concerned with only one or a few variables) would be used instead of a single large stack.

The effects-class interface will now be described. Recall that an effects set is a bit vector representing a set of effects classes, and that an effects class represents some arbitrary set of memory locations. Typically, an effects class will represent one of the following:

1. A single named variable. For effective optimization, each simple (i.e., non-aggregate) local variable which is used frequently in a routine should have an effects class dedicated to it.

2. A set of named variables with some common property; for example, in FORTRAN, all the variables in a particular named common block.

3. A set of memory locations which may not be determined until runtime, but which have some common property; for example, all the memory locations which are visible outside this routine (and which might therefore be modified by a routine call); or, in Pascal, all the memory locations which will be dynamically allocated with NEW calls and which have a particular type.

The literal GEM_SE_K_MAX_EFFECTS is exported by the GEM_SE package. It is the maximum number of distinct effects classes that the front end 20 may define. It will be 128 in the initial implementation. The GEM_SE_EFFECTS_SET type is exported by the GEM_SE package. It is a macro which expands to BITVECTOR[GEM_SE_K_MAX_EFFECTS]. Thus, given the declaration X:

GEM_SE_EFFECTS_SET, the following constructs are all natural (where $0 \leq N \leq$ GEM_SE_K_MAX_EFFECTS$-1$):

| | |
|---|---|
| X[N] = true; | ! Add effects class N to set X. |
| X[N] = false; | ! Remove effects class N from set X. |
| if X[N]then ... | ! If effects class N is in set X ... |

The interface routines for the effects-class interface will now be described. The front end 20 must provide an implementation of the following routines:

```
GEM_SE_EFFECTS(
    EIL_TUPLE      : in GEM_TUPLE_NODE,
    EFFECTS_BV     : inout GEM_SE_EFFECTS_SET)
```

The union of the effects of tuple EIL_TUPLE and EFFECTS_BV is written into EFFETS_BV.

```
GEM_SE_DEPENDENCIES(
    EIL_TUPLE      : in GEM_TUPLE_NODE,
    EFFECTS_BV     : inout GEM_SE_EFFECTS_SET)
```

Writes the set of effects classes that EIL_TUPLE depends on into EFFECTS_BV.

```
GEM_SE_VARIABLE_DEPENDENCIES(
    SYMBOL         : in GEM_SYMBOL_NODE,
    EFFECTS_BV     : out GEM_SE_EFFECTS_SET)
```

Writes into EFFECTS_BV the set of effects classes that might include the memory associated with variable SYMBOL.

GEM_SE_EFFECTS will be called only with tuples which can have effects. GEM_SE_DEPENDENCIES will be called only with tuples which can have dependencies.

The compiler may provide implementations for the interface routines mentioned above, but these routines are not intended for use in a production compiler. They are inefficient, and their rules for when one tuple invalidates another probably will not coincide exactly with the semantics of any particular language. However, they allow useful default optimizations to occur while other components of a front end 20 being implemented.

The EFFECTS field of each symbol node is treated as an effects class number, between 32 and GEM_SE_K_MAX_EFFECTS. When the address expression of a fetch or store tuple has a base symbol, the EFFECTS field of the symbol is checked. If it zero, then it is set to a new value between 32 and GEM_SE_K_MAX_EFFECTS.

For computing effects sets, using the effects class implementation as described above, the front end must call GEM_SE_INIT_EFFECTS_CLASSES before invoking the GEM_IL_BUILD phase.

This implementation provides information about effects by defining a simple model for effects:

1. No variables are overlaid:
2. Data access operations not in canonical form (as defined in CT.006) have (for stores) or depend on (for fetches) effect 0.
3. Calls have effects 32 through GEM_SE_K_MAX_EFFECTS. ARGADR parameters are treated as if the call writes into their address operands.

Effects classes 0 and 32 through GEM_SE_K_MAX_EFFECTS are reserved. Effect 0 represents references to memory such that the variables referenced can't be identified (pointer dereferences, parameters, etc.)

When a variable is first referenced using a data access operator in canonical form it is assigned an effects class number n in the range 32 to GEM_SE_K_MAX_EFFECTS. The number is recorded in the EFFECTS field of the symbol node. The reference and all subsequent references to that variable will have effect or dependency n.

The implementation includes some hooks for experimentation, testing, etc:

1. Tuples that may have effects or dependencies have one or more "effects fields" (EFFECTS, DEPENDENCIES, EFFECTS_2, etc.) reserved to the front end to record the effects and dependencies of the tuple. The compiler-supplied effects class callbacks interprets an effects field as a bitvector of length 32 representing the first word of a GEM_SE_EFFECTS_SET. That is, if bit n of the field is true, the routines add effects class n to the computed effects of the tuple.

2. The front end can choose the effects class for a variable by writing the effects class number between 1 and GEM_SE_K_MAX_EFFECTS into the effects field of the variable's symbol node. The effects class routines do not assign an effects class if the EFFECTS field is not zero.

3. Effects classes 1 through 32 are reserved for use by the front end. It may assign any interpretation to those effects classes.

To use the straight-line dependency implementation discussed above, the front end must call GEM_SE_INIT_EFFECTS_STACK before invoking the GEM_DF_DATAFLOW phase. This implementation uses the information provided by the GEM_SE_EFFECTS and GEM_SE_DEPENDENCIES callbacks to determine invalidations. That is, GEM_SE_FIND_EFFECT(X) returns the most recently pushed tuple Y such that the intersection of GEM_SE_EFFECTS(Y) and GEM_SE_DEPENDENCIES(X) is non-null.

INDUCTION VARIABLES

According to one feature of the invention, an improved method of treating induction variables in a compiler is provided. First, the definition and detection of induction variables and inductive expressions will be discussed.

An integer variable V is said to be an induction variable of loop L if each store to V that occurs in L:

1. increments (or decrements) V by the same amount each time it is executed.
2. is executed at most once in every "complete trip" through the loop. A trip is "complete" if it flows back to the loop top.

For example, the following code illustrates an induction variable V:

```
Label L   V = 1
          IF V > 10
              GOTO LABEL M
          ELSE
              PRINT X
              V = V + 1
          END IF
```

In the compile function, in addition to finding induction variables, we are also interested in inductive expressions. Inductive expressions are expressions that can computed as linear functions of induction variables.

Consider the following program:

```
DO I = 1, 100
    X = I * 8
    T = I - 4
    A[I] = T * 4
END DO
```

The expressions "I*8," "I-4," "T" and "T*4" are all inductive expressions in that they can be recomputed as linear functions of I.

As a brief illustration of some of the optimizations based on induction variables, consider the following program example:

```
     I = 1;
L:   X = X + (4 * I)
     I = I + 1
     if I <= 100 GOTO L
```

This is a straightforward DO loop, I being the loop control variable. Notice that the inductive expression I*4 increases by 4 on each trip through the loop. By introducing a new variable, I2, we can replace the multiplication with an addition, which is a less expensive operation. This is optimization known as strength reduction, used in optimizing compilers for a long time:

```
     I = 1;
     I2 = 4;
L:   X = X + I2
     I = I + 1
     I2 = I2 + 4
     if I <= 100 GOTO L
```

Note that we now have two variables (I and I2) where we used to have one. We can eliminate the original loop control variable completely by recasting the uses of I to be in terms of I2:

```
     I2 = 4;
L:   X = X + I2
     I2 = I2 + 4
     if I2 <= 400 GOTO L
```

This optimization is known as induction variable elimination.

These optimizations (strength reduction and induction variable elimination) operate directly on induction variables. In addition to these optimizations, induction variable detection provides information to other optimizations such as auto-inc/dec, vectorization, loop unrolling, etc.

In the model used in the compiler of FIG. 1, induction variables may be incremented more than once during the loop. Furthermore, the number of changes can even differ with each iteration. In fact, the number of changes can be zero for a particular iteration. The loop invariant increment value may differ between individual stores, but each individual store must increment the variable by the same amount whenever it is executed.

There are several different categories of inductive variables, with different properties, including basic induction variables, inductive expressions, and pseudo induction variables.

Basic induction variables are the simplest form of induction variable. They have known properties that apply throughout the loop. All other induction variables and expressions are always built up as linear functions of a basic induction variables. Basic induction variables are generally modified in the form I=I+q or I=I-q where "q" is loop invariant. More generally, however, the requirement is that the assignment be of the form I=f(I) where f(I) is a linear function of I with a coefficient of 1.

In the algorithms given in the Appendix, the basic induction variables of a particular loop are represented by a set in the loop top. In addition to this set, we also maintain the set of basic induction variables in the loop that have conditional stores that may not be executed on every trip through the loop. This inhibits vectorization and can make strength reduction more "desirable."

An inductive expression is either a reference to an induction variable or a linear function of another inductive expression. Inductive expressions must be in one of the following forms:

$$-f(I)$$
$$f(I) + g(I) \quad f(I) - g(I)$$
$$f(I) + E \quad E + f(I)$$
$$f(I) - E \quad E - f(I)$$
$$f(I) * E \quad E * f(I)$$

where f(I) and g(I) are inductive expressions derived from basic induction variable I with respect to loop L and E is invariant in loop L. If there are no stores to I between f(I) and the arithmetic operator of which it is an operand, then the arithmetic operator is an inductive expression derived from basic induction variable I with respect to loop L.

The other category is pseudo induction variables. Under certain conditions, a variable may behave like an induction variable on all but the first trip through the loop. These can be turned into induction variables (and thus vectorized) by peeling the first iteration of the loop. Such variables are referred to as "pseudo induction variables." This occurs when a fetch within the loop is reached only by two stores, one within the loop that defines a derived induction variable, and another store whose value flows in through the loop top. Additionally, it must be guaranteed that all stores within the loop are executed once per trip.

For example:

```
D = 50
DO I = 1, n
    A[I] = D + ...
    D = I + 4
```

On the first trip through the loop, D has the value 50 at the assignment to I. On subsequent trips, D has the value 5,6,7, etc. By unrolling the loop once, the subsequent trips can be vectorized. Note that the algorithm given herein do not find induction variables that are pseudo induction variables.

In order to identify a basic induction variable the compiler must be able to recognize all stores to it. The absence of the "has aliased stores" attribute guarantees this and thus we only recognize basic induction variables that do not have "has aliased stores."

Detection of basic induction variables requires the use of "sets" of potential induction variables. Doing this dynamically for each loop is an expensive and complicated operation. Instead, we will use the side effect sets used to construct IDEF sets.

A variable "X" is said to be "in" IDEF set S if the all the effects that fetch's of X depend on are in S. That is, X is in IDEF set S only if GET_VARIABLE_DEPENDENCIES (x) is a subset of S.

Note that the presence of X in a basic induction set implies only that:

(a) X is a basic induction variable or (b) X is loop invariant and shares IDEF bits with at least one variable that is a basic induction variable.

The algorithm descriptions in the Appendix take the following liberties (perhaps more) in the interest of keeping the algorithm description simple: (1) The collection of the constant parts of the linear function cannot cause an overflow. (2) All stores completely redefine the variable.

The algorithm as set forth in the Appendix starts out by assuming that all variables modified in the loop are basic induction variables. Each loop top has a basic induction variable set. As we find stores that don't satisfy the requirements for basic induction variables, we eliminate variables from the basic IV set of the loop top.

Since inductive expressions and derived induction variables are always functions of basic IVs, we might say that fetches of basic IVs are the atomic forms of inductive expressions. That is, for an expression to have the inductive property it either has inductive operands, or it is a fetch of a basic induction variable.

Using the rules given earlier, we build up inductive expressions from simpler inductive expressions based on assumptions about basic IVs. The basic IV of an inductive expression is always retained with the expression. Thus, after the algorithm has run, we can tell whether the expression is truly inductive by checking to see that the basic IV from which it is derived is still in the basic IV set of the loop.

The FIND_IV algorithm given in the Appendix will become part of the DATAFLOW phase which does a depth first dominator tree walk.

The following is a summary overview of the tuple processing that is done:

```
select TUPLE[OPCODE]
[FETCH]
    If base symbol is still a basis IV candidate
    then
        mark this tuple as being inductive.
[STORE]
    Let V be the base symbol of the store.
    If the value being stored is not inductive or_else
        the basic IV of the inductive value being stored is not V or_else
        the coefficient of the stored value is not 1
        remove V from the basic IV set of the loop top
    then
        remove V from the basic IV set of the loop top
    then
        mark the store as being inductive
[ADD, SUB, MUL, etc.]
    If one operand is inductive and other operand is loop invariant
    then
        mark this tuple as being inductive
```

The fields added to the tuple data structure, and fields added to the flow nodes, to accommodate induction variable detection, are set forth in Table 6a.

AUTOMATIC CREATION OF KFOLD ROUTINE

As previously discussed, the programming language compiler of FIG. 1 translates programs written in a source language into the machine language of a target machine 25. The compiler includes a front end 20, which incorporates knowledge of the source language in module 21 being compiled, and a back end 12, which incorporates knowledge of the machine language of the target machine 25. The front end translates programs from the source language into the intermediate language of the ILG 55, and the back end translates programs from the intermediate language into the target machine language.

The intermediate language generally specifies a collection of operators (for example, add, shift, compare, fetch, store, or tangent), a collection of data types (for example, "signed 32-bit integer," "IEEE S-format floating point," or "character string"), and a representation for values of those data types.

One of the optimizations included in the optimizer 26 is a constant expression evaluation routine. An example of a source code listing that may be related to a constant expression is shown in FIG. 6, where A and B are found to be constants, so A+B is a constant, then I and J are both equal to the same constant. The compiler can do the calculation (A+B), and save the fetch of A and B separately at run time, as well as saving the ADD operation. The I=A+B and J=A+B expressions of the code of FIG. 6 are thus both represented as merely STORE #9,I or STORE #9,J. This is known as "constant folding" because the constants are detected, calculated at compile time, and "folded" into the object code image. The mechanism for doing this is part of the optimizer 26, referred to as a Kfold routine.

The compiler of FIG. 1 incorporates a Kfold routine for evaluating expressions of the intermediate language to find these constant expressions. In general, given an operator of the intermediate language and the values of its operands, this routine will yield the same value which is computed by that operator when applied to those values. Such a constant expression evaluation routine has many applications in a compiler. For example, (a) The execution speed of the machine code which is generated for a program may be improved if some expressions of the program can be evaluated by the compiler itself rather than when the program is executed.

(b) Some source languages may allow the use of expressions with constant operands to represent constant values. Compilation of a program in such a language requires the evaluation of such expressions by the compiler.

(c) If the repertoire of operations provided in the intermediate language is richer than the set of operations provided by the programming language or environment in which the compiler is implemented, the most convenient way to perform some computation in the compiler may be to represent it as an expression in the intermediate language and submit it to the constant expression evaluation routine.

The implementation of a constant expression evaluation routine may be a matter of considerable difficulty. The IL may have dozens of operations (e.g., ADD, SUBT, COSINE, etc.), and when distinct data types are considered (e.g., INT32, NINT64, FLOATA, etc.), an intermediate language may have hundreds or thousands of distinct operators. The evaluator must be able to apply each of the operations to each of the data types correctly, lest the compiler fail to perform its function fully or correctly. Particularly when floating-point types are involved, it is likely that not all of the operations which can be represented in the intermediate language will be directly available in the programming language in which the compiler is implemented. Consequently, a constant expression evaluation routine is liable to be extremely long, containing hundreds of distinct cases, and be highly error-prone.

According to an important feature of one embodiment of the invention, the crucial point is that the one language in which the precise meaning of an operator of the intermediate language can always be specified both tersely and precisely is the intermediate language itself. That is, the compiler back end itself must be capable of generating code which correctly implements any operator of the intermediate language. Another way to say this is that compiler back end already embodies the knowledge of the sequences of machine code instructions necessary to realize the effect of each intermediate language operator, and it would be redundant to have to encode this same knowledge again in a different form in the constant expression evaluation routine.

Based upon this concept, according to the invention, the mechanical generation of a constant expression evaluation routine becomes straightforward: The first step is to create a new compiler of FIG. 1, which uses the same back end 12 as the regular compiler, but replaces its front end 20 with the special front end described below. (Equivalently, provide a special mode for the compiler in which it operates as described below.)

Second, the special front end 20 or special mode of operation does not read and translate a source program 21. Instead, it generates the intermediate language for the constant expression evaluation routine, as follows:

(a) The routine does a conditional branch to select a case based on the intermediate language operator specified in the argument list.

(b) Each case contains the code for a single operator. It fetches the operand values from the routine's argument list, applies the operator to them, and returns the result.

(c) Since the routine is being generated directly in the intermediate language, the code for each case simply consists of intermediate language operators to fetch the operands from the argument list, then the intermediate language operator for the particular case, and then the intermediate language operators to return the result.

Third, when this intermediate language graph is submitted to the compiler's back end, it will generate machine code for the constant expression evaluation routine.

In the special front end just described, the front end can contain a list of all the operators for which cases must be generated, and can mechanically generate the intermediate language for each case.

However, the process can be further simplified if, as may often occur, the compile back end already contains a table of operator information. (For example, such a table may be used to check the correctness of the intermediate language graph generated by the front end.) It is then possible for the special front end to use this table, already provided by the back end, to determined which cases to be generated.

TYPE DEFINITION

The compiler of FIG. 1 uses a type definition module referred to as the GEM_TD module. GEM_TD provides the mechanisms used by a front end 20 and back end 12 in constructing program type information to be incorporated in an object module for use by a linker or debugger. It is intended that this type specification service will allow a front end 20 to describe program symbols and their associated type information to the object module builder 29 in a manner independent of target object file requirements. This type specification service acts as a procedural "grammar of types" so that the compiler may associate abstract type specifications and program symbols. The type specification interfaces are defined below, and a number of examples of the use of the GEM_TD services are referenced.

The creation of type information takes place in the context of symbol table 30 creation and allows a front end 20 to specify an abstract representation of program type information. The object module builder 29 will later use this information in constructing Debug symbol table information.

The GEM_TD module provides service routines that allows a front end 20 to describe basic types and derived types. These routines typically construct internal data structures describing the specified type information. A new compiler node type, GEM_TDI, will be defined to manage this type information. The definition of the type node data structure is private to the compiler 12 and may not be altered or examined by the front end 20. When defining a type, the front end 20 is returned a "handle" to the type node by the GEM_TD routine defining the type. The handle allows a front end to associate a type with a program symbol but prohibits it from altering or examining the fields of the data structure.

Type nodes will be created and managed by scope, that is, when transmitting type information, a front end 20 will specify the block node that a type is to be declared within, and the shell will be responsible for the management of the type nodes within that scope. The shell will manage type nodes in a list rooted in the block node in which the type is defined. The block node data structure will be expanded to define the fields TYPE_LIST_HEAD and TYPE_LIST_TAIL.

A front end 20 may choose to make on-the-fly calls to the type specification service routines or may choose to make a pass over the entire symbol table to generate the type information.

After defining a type the front end must associate this type information with the symbols of that type. Symbol nodes will have a new field DST_TYPE_INFO used to associate a symbol with its type. A symbol's DST_TYPE_INFO field will contain the address of the type node handle returned by a GEM_TD service. A symbol node with a DST_TYPE_INFO value of null will have the target specified behavior for symbols not having type information.

Referring to FIG. 7, the data fields and relationships are illustrated for the function:

```
int toy_proc()
{
    float b,c;
        :
}
```

A block node 60 for toy-proc contains fields 61 and 62 (decl list pointers) pointing to the entries 63, 64 and 65 in the symbol table 30. Also, it contains fields 66 and 67 functioning as type list pointers, pointing to the entries 68 and 69 in the type list int and float. The entries 63, 64 and 65 also have pointers 70, 71 and 72 pointing to the entries 68 and 69, for int and float, as the case may be.

The GEM_TD type specification service consists of routines to allow a front end 20 to define standard and derived types and to associate those types with program symbols. The compiler back end 12 will use the resulting type definitions and their symbol node associations to generate target specified Debug Symbol tables. Note that boolean is not considered a basic type. Compilers for languages such as Pascal should define boolean as an enumeration containing the elements true and false.

ACTION LANGUAGE FOR MULTIPASS CODE GENERATOR

A method for doing code generation in the back end 12 by code generator 29 using code templates will now be described. The selection and application of code templates occurs at four different times during the compilation process.

1. The PATSELECT phase does a pattern match in the CONTEXT pass to select the best code templates. (During this pattern match the UCOMP and DELAY optimization tasks are done in parallel as part of the pattern matching process.)
2. The TNASSIGN and TNLIFE tasks of the CONTEXT pass use context actions of the selected templates to analyze the evaluation order to expressions and to allocate TNs with lifetimes nonlocal to the code templates.
3. The TNBIND pass uses the binding actions of the selected templates to allocate TNs with lifetimes local to the code templates.
4. Finally, the CODE pass uses code generation actions of the selected templates to guide the generation of object code.

A template is used at different times during a compilation. It consists of three major components:

1. ILG Pattern—which guides the template selection process that matches templates to applicable ILG structures.
2. Undelayed Actions—which determine the processing of matched ILG structures during the CONTEXT, TNBIND and CODE passes. The undelayed actions are performed when the template is first processed in each pass. As a result, the template actions for each ILG node are processed three different times—once for each pass. Some of the actions will have meaning for only one pass and will be ignored in the other passes. Other actions will have meanings in more than one pass but the required processing will be different in each pass.
3. Delayed Actions—which also determine the processing of matched ILG structures during the CONTEXT, TNBIND and CODE passes. The delayed actions are performed each pass when the result computed by the template is first processed as the leaf of another template. Delayed actions are useful on target machines like a VAX that have address modes. Simple register machines like a RISC would probably not make heavy use of delayed actions.

An ILG pattern of a code generation template consists of four pieces of information:

1. A result value mode (see the examples given in the Appendix) which encodes the representation of a value computed by the template's generated code.
2. A pattern tree which describes the arrangement of ILG nodes that can be coded by this template. The interior nodes of the pattern tree are IL operators; the leaves of the pattern tree are either value mode sets or IL operators with no operands.
3. A sequence of Boolean tests. All of these must evaluate to true in order for the pattern to be applicable.
4. An integer that represents the "cost" of the code generated by this template.

The pattern matches or PATSELECT phase matches an ILG subtree with the pattern of a template. If more than one template pattern can be applied at an ILG node then the pattern matcher delays choosing between the alternative templates until it knows which one leads to the lowest estimated code cost.

There are three different action interpreters—the CONTEXT interpreter, the TNBIND interpreter and the CODE interpreter. The actions of each template are performed in three different passes of the compiler by the appropriate interpreter. Although the identical template is used in all three passes, the semantics of the actions are phase dependent so that different things are done each pass. Many actions have meanings in only one of the three passes and they do nothing in the other two passes. Other actions have meanings in more than one pass but the semantics of an action in one pass are often very different from the semantics of the same action in a different pass. However, having only one action sequence in a template makes it very easy to understand and to maintain the dependencies between the various passes.

The action sequence for each template consists of two parts—the undelayed actions and the delayed actions. When a pattern of selected ILG nodes is first processed the undelayed actions are interpreted. When the ILG pattern is later used as the leaf of another ILG pattern then the delayed actions are interpreted.

At the start of interpreting the undelayed actions a table of operand variables is created. An operand variable can contain a temporary name (TN), a literal or a target specific address mode.

Temporary names are each partitioned into one of three classes: (1) permanent TNs, (2) delayed TNs and (3) local TNs. The class of a TN is determined by its lifetime and usage.

Each TN must have an allocation lifetime. The allocation lifetime is begun by the appropriate template action and extends along all flow paths leading to the last use of the TN. The TNs in the permanent class can have a lifetime that ends some arbitrarily large amount of code into the future after creation of the TN. The life of a delayed class TN must begin n a delayed action of a template and terminate shortly afterwards when the TN is used as a leaf. The life of a local TN never extends beyond the interpretation of a single pattern.

The class of a TN determines how it is processed. Permanent class TNs are created once in the CONTEXT pass and the same TN data structure is kept through all three passes and is used to store the complicated lifetime description of the TN. Delayed class and local class TNs have lifetimes of very restricted duration so they do not need a permanent data structure to track this information. As a result, the TN data structure for delayed class and local class TNs are built each pass when interpreting the actions and deleted immediately after their last use in each pass. Interpreting the same action sequence in each pass guarantees identical TN data structures are built in each pass for TNs of these classes.

There will be a large list of different template actions. Some of the actions will be target machine dependent. The Appendix contains a list of proposed or example template actions, so that a user can by these code template examples determine for a particular embodiment what will be needed.

THE INTERMEDIATE LANGUAGE REPRESENTATION

The internal representation used in the compiler framework 10 of FIG. 1 comprises the symbol table 30 and intermediate language graph 55, which are the data structures created by the front end 20 to represent the structure, data, and code of a source module 21. The following describes the nodes which are the primitive components of these data structures, including a specification of the symbol table 30 and intermediate language used in the IL graph 55. In a compiler as described with reference to FIG. 1, the front end 20 generates a symbol table 30 to describe the blocks, routines, variables, literal values, etc. of a program contained in source module 21, and one or more intermediate language graphs 55, to describe the executable code. The following describes these internal data structures.

The design of the compiler of FIG. 1 in general, and of the intermediate language and symbol table in particular, is intended to address a variety of architectures ranging from "Complex Instruction Set Computers" (CISC) such as VAX to "Reduced Instruction Set Computers" (RISC) such as PRISM, MIPS (a 32-bit RISC machine), or an advanced 64-bit RISC architecture. This design does assume that the architecture of target machine 25 has certain basic features. First byte organization and addressability are assumed and Twos-complement binary arithmetic, with "Little-endian" bit ordering. "Reasonable" address representation is also assumed, i.e., that an address fits in a register.

In general, the front end 20 can be oblivious to the details of the target architecture 25 when creating the intermediate representation of a program. Most constructs of the intermediate representation have a well-defined meaning which is independent of the target architecture 25. There are some issues that must be resolved in implementing the front end 20, however. First, not all data types will be available on all architectures, as explained below. Second, arithmetic overflow behavior and the representation of "small integer" arithmetic may vary on different architectures, again, as discussed below. Third, the behaviors of some operators (such as the arithmetic shift operators) are defined only for subranges of the operand values for which the underlying machine instructions are defined on particular architectures. For operand values outside this specified range, such operators may be well behaved for any particular machine, but may have different behaviors on different machines. Lastly, calling conventions will be different on different target systems 25, requiring the from end 20 to generate different intermediate representations for the same source language constructs in some cases.

The phrase "Intermediate Language" refers to an abstract language for specifying executable code. An "Intermediate Language Graph" (ILG) 55 is a particular program expressed in this language.

The intermediate language in graph 55 is really a language of data structures in memory, with pointers providing the syntactic structure. However, there is also an approximate textual representation for ILGs, used for IL dumps written by the compiler as a debugging aid.

The primitive concept of the IL is the tuple as described above with reference to FIG. 4—an ILG 55 is made up of tuples 35 representing the operations to be executed. These tuples 35 are tied together by pointers (e.g., operand pointers 38) which represent various relations. The most important relations are the operator-operand relation (a pointer 38 from an operator to each of its operands) and the linear ordering on all the tuples in each basic block of the ILG, which provides a nominal execution order. This linear order is represented by the tuple number 40 within a block, and by the pointers linking all the blocks of a routine or module.

The computation defined by an ILG 55 is as follows:

(1) Start at the BEGIN tuple of the ILG.

(2) Evaluate each tuple in linear order: fetch the saved results of its operands, compute and save its result, and perform any secondary action that may be defined for it. (There are exceptions to this simple evaluation rule for "flow boolean" and "conditional selection" operators.)

(3) After evaluating a branch tuple, continue evaluation at the label tuple selected by that branch tuple.

It should be understood that these rules define the "meaning" of an IL graph 55. The code generator 29 is allowed to rearrange the actions indicated by the ILG, so long as it preserves their dependencies, as specified by the following rules:

(1) If the ILG 55 contains an expression, and a statement whose execution might affect the value computed by evaluating the expression, then the generated code for the expression and the generated code for the statement must be executed in the same order that the statement and the expression occurred in the ILG.

(2) If the ILG 55 contains two statements whose execution might affect the value computed by evaluating some common expression, then the generated code for the two statements must be executed in the same order that the statements occurred in the ILG.

The question of when the execution of a statement might affect the value computed by the evaluation of an expression is resolved by reference to the side effects mechanism described below.

The ILG 55 constructed by the front end 20 is not the same as the ILG processed by the back end 12. The front end 20 generates a Compact IL Graph, while the back end 12 processes an Expanded IL Graph. When the back end 12 generates code for a routine, the first thing it does is to expand that routine's CILG into an EILG. The differences between the two forms are several. First, the CIL provides "shorthand" tuples, which are expanded into sequences of lower-level tuples in the EIL. Second, the nodes which represent EIL tuples have many more fields than the nodes which represent CIL tuples. The additional fields contain information which is used by the back end 12, but which can be computed by the IL expander (or by other back end phases) from the fields in the CIL nodes. Third, there are different structural restrictions on the CILG and the EILG. This description is directed to the compact IL, although this information generally pertains to both the CIL and the EIL The structure of a symbol table 30 represents the structure of the module 21 being compiled. At the heart of the table 30 is a tree of block nodes representing the blocks, routines, and lexical scopes of the module 21; the tree structure represents their nesting relationship. Associated with each block node is a list of the symbol nodes which are declared in that block. Associated with each routine block is an ILG representing the code for that routine. A symbol node represents a symbolic entity in the module, such as a variable, label, or entry point. Constant values in the module 21 being compiled are represented by literal nodes. Literal nodes may be referred both from the symbol table 30 and from ILGs 55. The term literal table is also used to refer to the collection of all literal nodes that have been created in a compilation. Frame nodes represent areas of storage in which code and data can be allocated. Generally, these are either the stack frames of routines or PSECTs. Parameter nodes are used to build parameter lists, which are associated with entry point symbols. Each parameter node relates a parameter symbol in a routine with a location in the argument list of an entry point.

Data Types:

The intermediate representation used in graph 55 describes a program for an abstract machine 25, which has only a small set of types, the data types which are described in the following list. These data types are distinct from the data types of the source language of module 21, which are relevant only to the front end 20. It is the responsibility of the front end 20 to determine, for each target machine 25, the data types to be used to represent each source language data type.

Data Types
  Null
  Representational
  Scalar
  Address
  Signed Integer
  Unsigned Integer
  Floating Point
  Complex
  Boolean The null data type is a special data type, which is the type of tuples that do not compute a value. A representational data type is a type whose values have a specific representation in the target machine architecture. The representational data types are divided into scalar data types and aggregate data types. A scalar data type is one whose values can be represented in a small fixed number of memory locations or registers. The scalar data types are subdivided into the address data type and the arithmetic data types. Note that the arithmetic types may be used to represent any other kind of data than can fit in the appropriate number of bits. In particular, source language character and logical data types must be represented with integer data types. There is a single address data type, ADDR. A value of type ADDR is represented as a binary integer with 32 or 64 bits.

There are signed integer data types INT8, INT16, INT32, and INT64, where a value of type $INT^{x-1}$ is represented as a signed binary integer with $^{x-1}$ bits, and is therefore in the range—$(2^{x-1})$ ... $(2^{x-1}-1)$. The type INT8 may also be referred to as IBYTE. The type INT16 may also be referred to as IWORD. The type INT32 may also be referred to as ILONG. The type INT64 may also be referred to as IQUAD. The integer type with the same number of bits as an address may also be referred to as IADDR. The largest signed integer type supported for the target architecture (INT32 or INT64) may also be referred to as IMAX. Any binary scaling (as in PL/I) must be provided by the front end—there are no IL provisions for a scaled binary data type.

There are unsigned integer data types UINT8, UINT16, UINT32, and UINT64, where a value of type $UINT^{x-1}$ is represented as a signed binary integer with $^{x-1}$ bits, and is therefore in the range 0 ... $(2^x-1)$. The type UINT8 may also be referred to as UBYTE or as CHAR8. The type UINT16 may also be referred to as UWORD or as CHAR16. The type UINT32 may also be referred to as ULONG. The type UINT64 may also be referred to as UQUAD. The unsigned integer type with the same number of bits as an address may also be referred to as UADDR. The largest unsigned integer type supported for the target architecture (UINT32 or UINT64) may also be referred to as UMAX.

The floating point data types are the VAX floating point types, REALF, REALD, REALG, and REALH, and the IEEE floating point types, REALS, REALT, REALQ, and REALE. Not all of these will necessarily be supported on any particular target architecture.

The complex data types are CMPLXF, CMPLXD, CMPLXG, CMPLXS, and CMPLXT. A complex value is represented as a pair of values of the corresponding real type, which represent the real and imaginary parts of the complex value. Only complex types which correspond to supported floating point types will be supported on a particular target architecture.

A value of an aggregate data type consists of a sequence of contiguous elements. An aggregate value is characterized by its body, the actual sequence of elements, and length, the number of elements in the sequence. The aggregate types are:

(a) Character strings, type STR8, which have elements of type CHAR8.

(b) Extended character strings, type STR16, which have elements of type CHAR16.

(c) Bit strings, type BITS, whose elements are single bits, packed as tightly as possible.

(d) PL/I and COBOL decimal strings, type DECIMAL, whose elements are decimal digits (represented as four-bit BCD digits, packed two per byte, with a leading sign digit). (The DECIMAL value is characterized by its precision, the number of digits it contains (not counting the leading sign digit), and its scale, the number of those digits which are regarded as coming after the decimal point.

The elements of an aggregate value are numbered starting at zero. (Note that this will require many front ends to subtract one when translating a source program string index to an IL string index.)

There is no limit on the number of elements which may be processed in a string operation. A flag might be introduced in the future to allow the front end to indicate character string expressions whose lengths were guaranteed not to exceed 65535 characters, and which could therefore be computed efficiently with the VAX character string instructions.) The length word of a varying-length string in memory will still be only 16 bits. Decimal strings are limited to 31-digits (plus the sign digit) on all target architectures.

An example of the details of the representational type system for the various target architectures is indicated in Table 6.

There is a single Boolean data type, BOOL. This is the type of logical values computed during the execution of a program. It does not have a specified physical representation. For example, a Boolean value might be represented by the value of a binary integer, the value of a processor condition code, or the value of the processor program counter. In particular, type BOOL does not correspond to any logical or Boolean data types that may be present in a source language. These must be represented as INT or UINT values, and converted to and from type BOOL as necessary.

The general features that are common to all tuples in the intermediate language, and the structural characteristics of ILGs 55 (routines in the intermediate language) will now be described.

An ILG 55 is made up of IL tuple nodes (usually just called tuples). All tuples contain the fields listed in Table 7. Other fields, known as attributes, occur only in particular kinds of tuples.

Unlike symbol table nodes, which may be allocated with an arbitrary amount of space reserved for use by the front end 20, CIL tuple nodes will contain only the fields specified here. EIL tuple nodes will contain additional fields, located at a negative offset from the tuple node address, which are private to the back end 12.

Structure of the ILG

One tuple in an ILG can refer to another tuple in two different ways: as an operand or as an attribute. When only the operator-operand relation is considered, a CILG is directed acyclic graph (DAG), while an EILG is a forest (i.e., a collection of trees).

Attribute pointers 39 create additional structure on the ILG, and also allow references from the ILG to the symbol table 30. The most important structural relation is the linear order of the ILG, defined by the next tuple and prev tuple attribute pointers. All of the tuples in a CILG occur in a single list defined by the linear order. The tuples of an EILG occur in a collection of circular lists, one for each basic block.

The following rules apply to the structure of an ILG. If a front end 20 creates a CILG which violates these rules, the results are unpredictable, although the back end will attempt, where convenient, to detect violations and terminate compilation:

(a) A tuple whose result type is NULL is referred to as a statement tuple, and a tuple whose result type is not NULL is referred to as an expression tuple.

(b) In the CIL:

(i) A scalar or Boolean expression tuple may be an operand of one or more other tuples. An aggregate expression tuple must be used as an operand of exactly one other tuple, which must be in the same basic block (see below).

(ii) An operand may be an expression tuple, a symbol node, or a literal node.

(iii) A symbol node used as an operand always has type ADDR. A literal node used as an operand has the data type of the literal.

(iv) A symbol representing a variable which is allocated to a register does not have an address, in the normal sense. However, such a symbol may be used as the address operand of a tuple which reads from or writes to memory (a FETCH or STORE), in which case the tuple will access the indicated register.

(v) If a symbol represents a variable in a stack frame, then that stack frame must be associated with the current routine or one of its ancestors in the symbol table block tree; otherwise, there would be no way of finding the stack frame at execution time.

(c) In the EIL operands must be expression tuples, and every expression tuple must be an operand of exactly one other tuple.

(d) No statement tuple may be an operand of any other tuple.

(e) A tuple which is an operand of another tuple must precede that tuple in the linear ordering of the ILG. (In an EILG, this means that the operand and the operator must occur in the same basic block.)

(f) An expression tuple must dominate every tuple which it is an operand of. That is, it must be impossible to get from an entry point of a routine to a tuple without encountering every operand of that tuple on the way.

Subsequent paragraph in this section describe the sorts of operations that are available in the intermediate language and the operators that are used to represent them. The individual operators are all collected in a data structure called <REFERENCE>(part_tuple_dictionary), the tuple dictionary. Each operator in the dictionary is documented using a structured format. Table 8 discusses the main categories in this format, the information presented under each, and the format used to present the information.

The format section of a tuple specifies the number of operands and the allowed operator, operand, and result types in a single line of the form:

op.type(type-1, . . . ,type-n): result where op is the name of the tuple operator, and type specifies the allowable operator types. If ".type" is omitted, then the operator type must be NULL. Otherwise, type must be on eof the following:

(a) A specific type name (ADDR, BOOL, BITS, IADDR, etc.) indicates that only the specified type is allowed.

(b) INT, UINT, REAL, CMPLX, or STR indicates that any type belonging to the specified family is legal. For example, CMPLX means that CMPLXF, CMPLXD, CMPLXG, CMPLXS, and CMPLXT are all allowed; STR means that STR8 and STR16 are allowed.

(c) ALL indicates that any type other than NULL is legal.

(d) A string of the letters I, U, R, C, A, S, and B indicates that any type belonging to a family represented by one of the letters is allowed, as follows:

I INT
C CMPLX
A ADDR
U UINT
S STR
R REAL
B BITS

The expressions Type-1, . . . ,Type-n" specify the allowable types of the tuple's operands. If the parenthesized list is omitted, then the operator takes no operands. Otherwise, the tuple must have one operand for each type in the list. Each type-i must be one of the following:

(a) T means that the operand type must be the same as the operator type.

(b) A specific type name (ADDR, BOOL, BITS, IADDR, etc.) means that the operand must have the specified type.

(c) A string of the type code letters I, U, R, C, A, S, and B has the same meaning that it does for the type specifier. Note that operands with the type specifier IU, which means "any integer," are generally converted to type IMAX in the generated code. Program behavior is therefore undefined if the actual value of such an operand cannot be converted to type IMAX.

(d) If the operator and operand type specifiers are REAL and CMPLX or STR and CHAR, then the actual operator and operand types must be consistent. For example, the type specification "CADD.CMPLX(T,REAL): T" indicates that the second operand must have type REALF if the operator type is CMPLXF,REALS if the operator type is CMPLXT, etc. If the operator type is SB, i.e., character string or bit string, and an operand type specifier is CHAR, then the operand type must be CHAR8 if the operator type is STR8, CHAR16 if the operator type is STR16, and IMAX if the operator type is BITS. That is, IMAX is treated as the character type corresponding to the string type BITS.

The actual operands of the tuple must be tuple nodes whose result types are consistent with the types specified by the operand type list. In the CIL, they may also be symbol nodes, which are always treated as having type ADDR, or literal nodes, which are treated as having the types specified by their data type fields.

The expression "Result" specifies the allowable result types. If it is omitted, then the operator is a statement operator and the tuple's result type must be NULL. Otherwise, it is interpreted exactly the same way as the operand type specifiers.

Addresses and Memory References

An address expression is one of the references in the intermediate language. The simplest form of address expression is a symbol. That is, an operand field of a tuple node may contain the address of a symbol node, to represent the memory address (or the register) associated with that symbol. An address value can also be obtained by fetching it from memory (a "pointer variable"), by casting an arithmetic value, or by evaluating a preincrement tuple, a postincrement tuple, or one of the tuples of the following list:

| Address Computation Operators | |
| --- | --- |
| Operator | Meaning |
| AMINUS | Subtracts an integer from an address to yield a new address. |
| APLUS | Adds an integer to an address to yield a new address. |
| BASEDREF | Evaluates the address to yield a new address. |
| LITADDR | Yields the address of a read-only memory location containing a specified literal value. |
| UPLINK | Yields the address of the stack frame for the current routine or a routine that contains the current routine. |

A data access tuple is a tuple which causes a value to be loaded from or stored into memory. (The word "memory" here includes registers in a register set of the target CPU 25. The only difference between a register and a normal memory location of the CPU 25 is that the "address" of a register can only be used in a data access tuple.) The data access operators are listed in Table 9.

In every data access tuple, the first operand is an address expression. Every data access tuple also has an offset attribute which contains a longword integer. The address of the memory location to be accessed is the sum of the run-time address operand and the compile-time constant offset attribute.

All data access tuples will have some or all of the attributes listed in Table 10. The uses of the effects, effects2, and base symbol attributes are discussed in more detail below in the section Interface for Representing Effects.

Another type of reference is the Array Reference. The APLUS and AMINUS tuples are sufficient for all address computations. However, they do not provide any information about the meaning of an address computation. In particular, they don't provide any information about array references and subscript expressions that might have been present in the source code. This information is needed for vetorization. Therefore, the IL has tuples which specifically describe array references.

For example, given a BLISS vector declared as local X:vector[20,long], a reference to .X[.I] could be represented as $1: FETCH.INT32(I);
$2: SUBSCR.IADDR($1, [4], [0]; POSITION=1);
$3: FETCH.INT32(X, $2);

Given a Pascal array declared as var Y:packed array [1..10, 1..10] of 0..255, an assignment Y[I, J]:=Z could be represented as $1: FETCH.INT32(J);
$2: SUBSCR.IADDR($1, [1], [0]; POSITION=1);
$3: FETCH.INT32(I);
$4 SUBSCR.IADDR($3, [10], $2; POSITION=2);
$5 FETCH.UINT8(Z);
$6 STORE.UINTS($4–11, $5);

The basic array reference operators are AREF and SUBSCR. AREF yields the address of a specified element in an array. SUBSCR computes the offset of an array element.

The first operand or an AREF tuple is an address expression representing the base address of the array, and its second operand is a SUBSCR tuple which computes the byte offset from the base address to an element of the array. The AREF tuple adds the value of the SUBSCR tuple to the base address to compute the address of the indexed element. In fact, the code for AREF(origin, subscript) is identical to the code for APLUS(origin, subscript).

A SUBSCR tuple computes the offset of an element along one dimension in an array. Its operands are:

(a) The element index. Individual indices in a subscript expression are not normalized for a zero origin. Instead, an origin offset to account for non-zero lower bounds in the array declaration should be added into the address operand of the AREF tuple or the offset field of the tuple that uses the element address.

(b) The stride. This is the difference between the addresses of consecutive elements along the dimension. For a simple vector of longwords, the stride would be a literal 4, but for multidimensional arrays, the "elements" of the higher dimensions rows (or larger cross-sections) of the array.

(c) An expression for the remainder of the subscript expression (that is, for the remaining indices in the subscript expression). This must be either another SUBSCR expression or a literal node representing the integer constant zero.

The code for SUBSCR(index, stride, remainder) is identical to the code for ADD(MUL(index, stride), remainder).

A SUBSCR tuple also has a position attribute, which indicates the position of the index in the subscript list of the array reference. It is required that a position number identify the same subscript position in all references to a given array. For the most effective vectorization, it is recommended that position 1 ought to be the most rapidly varying subscript, position 2 the next most rapidly varying, etc.

There are several tuple operators that don't really fit in any other section; These miscellaneous operators are the following:

| Operator | Meaning |
| --- | --- |
| ADIFF | Computes the integer difference between two addresses. |
| DEFINES | Encodes side effects or dependencies in the ILG without causing any code to be generated. |
| VOID | Causes an expression to be evaluated but discards it value. |

Arithmetic Tuples:

The arithmetic tuples are used to manipulate "arithmetic" values—integers, real numbers, and complex numbers. This includes fetching, storing, and conversions, as well as traditional arithmetic operations such as addition and multiplication.

The shift instructions in the VAX and RISC architectures are so different from one another that a fully abstract IL shift operator would be certain to generate inefficient code on one or both architectures. On the other hand, the IL has to support shifting, since many source languages have some sort of shift operators. As a compromise, the IL provides the following operators (None of the shift operators will ever cause an arithmetic overflow exception.):

(a) SHL, SHR, and SHRA do a left shift, a logical right shift, and an arithmetic right shift, respectively, and require a positive shift count. (That is, their behavior is undefined if the shift count is negative.) These support the C shift operators, and map directly into the RISC architecture shift instructions.

(b) SH does a left shift if its operand is positive, or an arithmetic right shift if its operand is negative. This supports the BLISS shift operator, and maps directly into the VAX shift instruction.

(c) ROT is the rotate operator. Although it is described differently in the VAX and RISC architectures, the actual behavior in all cases can be characterized as a left rotation whose count is specified by the least significant n bits of the count operand, where n is the base-two logarithm of the register size. (For example, on VAX and MIPS the rotate count is the least significant five bits of the count operand.)

Integer overflow is another feature to consider. There is a problem in attempting to specify the sizes for integer arithmetic in the IL so that, for all target machines, code will be generated that will satisfy the semantics of the source language and will be as efficient as possible subject to the constraints imposed by those semantics. In particular, some machines (such as VAX) will happily do byte and word arithmetic, while RISC machines typically do only long-word arithmetic. Doing all the size conversions would be wasteful on a VAX, but emulating true byte or word arithmetic would be inefficient on a RISC machine.

The following rules are intended to allow the code generator sufficient flexibility to generate reasonable code for all target machines (Everything that is said about INT types below applies equally to UINT types.):

(a) If the result type of an expression is $INT^{x-1}$, the compiler may actually perform the indicated computation with y-bit arithmetic, where $y \geq x$. This might produce a y-bit result with more than x significant bits, if the original x-bit computation would have overflowed. For example, an ADD.INT16 might be implemented with a 32-bit add. 20000+30000 results in an overflow when done as a 16-bit add, but produces the legal 32-bit number 50000 when done as a 32-bit add.

(b) Every arithmetic operator has a suppress overflow flag (which is only meaningful when the tuple result type is INT or UINT). If this flag is set, then the code generated for a tuple must not report any sort of overflow condition, regardless of the results of the computation, and may ignore the possible presence of extraneous high-order bits in the result (except when the result is used as the operand of an XCVT tuple). Note that the suppress overflow flag is defined in tuples (such as IAND) for which overflow could never occur anyway. Suppressing overflow for these tuples will be particularly easy. The suppress overflow flag is intended for situations where it would be semantically incorrect for an operation to overflow. It may result in more costly code on some architectures. On VAX, for example, extra code is required to suppress overflow detection. Therefore, if it is immaterial whether an operation overflows, or if the front end knows that a particular operation can never overflow, then this flag should be cleared to allow the compiler to generate the most efficient code.

(c) The routine block node has a detect overflow flag. If this flag is clear, then the back end is not required to generate code to detect overflows in integer arithmetic operations. It is free, however, to generate code that will detect overflows if this is more efficient—mandatory suppression of overflow detection can be accomplished only by setting the suppress overflow flag in a particular tuple.

(d) If the detect overflow flag is set in the routine block node, then the generated code must guarantee, for each expression tree, that either the result computed for that expression is valid, or an integer overflow exception is signalled. This is not a requirement that overflow be detected in every possible subexpression of an expression. For example, suppose that A, B, C, and X are 16-bit variables, and that A is 32767 and B and C are 1. In the assignment X:=A+B−C, the generated code might compute A+B−C using 32-bit arithmetic and then check whether the result is a 16-bit result before storing it. This would store the correct answer 32767, even though the same expression, if computed with 16-bit arithmetic, would result in an integer overflow error. The assignment X:=A+B, on the other hand, would compute the value 32768 correctly, but would then generate an overflow exception when it attempted to store it into X. The collection of places where overflows must be detected is not dear, but certainly includes right-hand sides of stores and arguments in routine calls.

(e) Notice also the XCVT conversion operator, which returns the value of its operand, forcing any extraneous high-order bits of the representation to be consistent with the sign of the actual operand. For example, if E is a UINT8 expression which is evaluated using 32-bit arithmetic, then XCVT.UINT8(E:INT16) will be a 16-bit integer whose high-order 8 bits are guaranteed to be zero. In general, if E is an expression of type T, then XCVT.T(E:T) can be used to force the representation of a value to be consistent with its nominal size.

(f) If the representation of an integer operand in some expression contains high-order significant bits beyond the nominal size of the operand, then the generated code is free to use either the full represented value or the value at the nominal size. When this is not acceptable, the front end must generate an XCVT tuple to discard unwanted high-order bits from the representation.

There is not any mechanism in the IL to disable the detection of floating-point overflow exceptions. A floating-point overflow will always result in the signalling of an exception. The signalling of floating-point underflow is controlled only at the routine level. Routine block nodes have a detect underflow flag. If it is set, the compiler is required to generate code which will detect and report any floating-point underflows which occur in that routine; otherwise, the generated code must ignore floating-point underflows.

The conversion operators will compute a value of one arithmetic type that is related to a value of another arithmetic type. The ROUND and TRUNC operators for real-to-integer conversions, the CMPLX operator for real-to-complex conversions, and the REAL and IMAG operators for complex-to-real conversions are all familiar. (ROUND and TRUNC are also defined with a real result type.)

CVT is the general purpose conversion operator. It will do conversions between any two arithmetic types. It is important to be aware, though, that the only conversions that are done directly are UNIT-INT, INT-REAL, and REAL-CMPLX (and of course conversions within a type, such as INT16–INT32). This means, for example, that a CMPLXG-to-UINT16 conversion will actually be done as the series of conversions CMPLXG-to-REALG, REALG-to-INT32, INT3B2-to-UINT16. This is not the behavior of VAX Pascal, which has direct real-to-unsigned conversions.

XCVT is a special operator which deals only with integer types. Like CVT, it yields the value of its result type which is arithmetically equal to its operand. However, it has the special feature that it will first change the high-order bits of the representation of the operand so that the operand's representation is arithmetically equal to its value.

For example, consider the expression

XCVT(ADD.UINT8([UINT8=255],[UINTS=2]):INT16).

If the expression is computed with 32-bit arithmetic, then the result of the ADD might be a register containing %X00000101 (257). The XCVT would then discard the high-order bits, leaving %X00000001 (1), which would already be a valid 16-bit signed integer.

CAST is not really a conversion operator, since it deals with bit patterns, not values. A CAST tuple yields the value of its result type which has the same bit pattern as its operand (truncating or concatenating zero bits if necessary).

Another type is Variable Modification Operators. The operators with names of the form OPMOD, where OP is ADD, IAND, etc., all have an address operand and a value operand. They fetch an arithmetic value from the specified address, perform the indicated operation between it and the value operand, and store the result back at the same address. They also yield the computed value. They are intended to implement C;s op=operators. For example, the code sequence $1: ADDMOD.REALF(X, [%F0.1]);
$2: STORE.REALF(Y, $1);

will have the same effect as $1: FETCH.REALF(X);
$2: ADD.REALF($1, [%F0.1]);
$3: STORE.REALF(X, $2);
$4: STORE.REALF(Y, $2);

These operators also have OPMODA and OPMODX forms, which fetch, update, and replace a value in a packed array element or a bit field.

The PREINCR, PREINCRA, and PREINCRX operators are essentially the same as ADDMOD, ADDMODA, and ADDMODX, except that instead of a value operand, they have an attribute field containing a compile-time constant increment value. They can be applied to addresses (pointer variables) as well as arithmetic variables. They are intended to implement C's preincrement and predecrement operators.

The POSTINCR, POSTINCRA, and POSTINCRX operators are the same as the PREINCR, and PREINCRX tuples, except that the value of the tuple is the value that the memory location held before it was updated, rather than the value that was stored back into it. They are intended to implement C's postincrement and postdecrement operators.

Strings:

The string (or aggregate) types of the compiler are types whose values are sequences of values from a base type. These types are:

STR8, a sequence of eight-bit characters (type CHAR8).

STR16, a sequence of sixteen-bit characters (type CHAR16).

BITS, a sequence of single bits.

DECIMAL, a sequence of decimal digits and an associated precision.

The elements in a character or bit string sequence are numbered from 0 to n−1, where n is the string length. If an eight-bit character string is represented in memory at address A, then the byte at address A contains the first character of the string, the byte at address A+1 contains the second character of the string, and so on through the byte at address A+n−1, which contains the last character of the string. If a sixteen-bit character string is represented in memory at address A, then the word at address A contains the first character of the string, the word at address A+2 contains the second character of the string, and so on through the word at address A+2(n−1), which contains the last character of the string. If a bit string is represented in memory at address A, then the first eight bits of the string are the least significant through the most significant bits of the byte at address A+1, etc.

Aggregate values in general must be represented somewhere in memory, unlike scalar values which can occur in registers, or even as literal operands in machine instructions. However, the semantic model of the intermediate language is that strings can be fetched, manipulated, and stored just like scalars. The compiler is responsible for allocating temporaries to hold intermediate string values.

Note that the code generated for string operations must be consistent with this model, even when there is overlap between the operands. For example, the IL statement STOREF.STR8(A+1,[20], FETCHF.STR8(A,[20]) moves a twenty character string up one position in memory. It must not simply make twenty copies of the character at A.

A string is said to be empty if its length is zero. Let head be a function that returns the first element of a non-empty string, tail be a function that returns the string containing all elements except the first of a non-empty string, and empty be a function that is true if a string is empty and false otherwise. Then the relation between two strings X and Y, as tested by the standard comparison operators (EQL, NEQ, LSS, LEQ, GTR, GEQ), is defined as follows:

If empty(X)∧empty(Y) then X=Y.

If empty(X)∨¬empty(Y) then X<Y.

If ¬empty(X)∧empty(Y) then X>Y.

If ¬empty(X)∧¬empty(Y)∧head(X)<head(Y) then X<Y.

If ¬empty(X)∧¬empty(Y)∧head(X)>head(Y) then X>Y.

If ¬empty(X)∧¬empty(Y)∧head(X)=head(Y) then rel(X,Y)=rel(tail(X),tail(Y)).

The string comparison operators in some languages (such as Pascal) operate only on equal-length strings, padding the shorter string in a comparison to the length of the longer string. Therefore, the IL also has padded string comparison operators, EQLP, NEQP, LSSP, LEQP, GTRP, and GEQP.

All of the string operators are listed in Table 12.

Booleans:

Unlike the representational data types, the Boolean data type does not have a unique representation. During program execution, Boolean values may be represented explicitly by the value of some bit in a binary integer, or implicitly by the particular code path that is taken. Since there is no unique representation, it is not possible to have Boolean variables in the IL. However, most source languages provide for the logical interpretation of representational values, and many allow the declaration of logical or Boolean variables. Therefore, operators are needed to convert between Boolean values and their source language binary representations.

The LBSET operator interprets an integer as a Boolean by testing its least significant bit, and the NONZERO operator interprets an integer as a Boolean by testing whether the whole integer is zero or not. The LSBIT operator represents a Boolean value as an integer with the bit pattern <00 ... 00> or <00 ... 01>, and the ALBITS operator represents a Boolean value as an integer with the bit pattern <00 ... 00> or <11 ... 11>. These operators support the binary representation of Boolean values in the various source languages as follows:

| Source Language | Binary to Boolean | Boolean to Binary |
|---|---|---|
| Ada | LBSET | LSBIT |
| BLISS | LBSET | LSBIT |
| C | NONZERO | LSBIT |

-continued

| Source Language | Binary to Boolean | Boolean to Binary |
|---|---|---|
| FORTRAN | LBSET | ALLBITS |
| Pascal | LBSET | LSBIT |

Even though Boolean values do not have a representation, and therefore cannot be represented with normal literal nodes, it is very desirable to be able to apply all the regular IL transformations to Boolean expressions. Therefore, the back end 12 provides two special literal nodes, whose addresses are contained in the global variables GEM$ST_G_TRUE and GEM$ST_G_FALSE. These literal nodes cannot be used for static storage initialization, but they can be used as operands in an ILG.

Boolean expressions involving AND and OR operators can be evaluated in two different ways, full evaluation and flow or short-circuit evaluation. In full evaluation, both operands are fully evaluated, yielding real mode values, which are then used as operands to an AND or OR instruction to yield a real mode result. In flow or short-circuit evaluation, the first operand is evaluated. If the value of the expression is determined by the value of the first operand, then the second operand is skipped; otherwise, the second operand is evaluated and the value of the expression is the value of the second operand.

Some source languages require full evaluation of AND and OR expressions; others require (or have special operators for) short-circuit evaluation; and still others do not specify the kind of evaluation, leaving the choice to the compiler. Three sets of operators are provided for these three cases:

(a) LANDC and LORC ("Logical AND Conditional" and "Logical OR Conditional") are the flow Boolean operators. They evaluate their first operands and then may bypass the evaluation of their second operands.

(b) LANDU and LORU ("Logical AND Unconditional" and "Logical OR Unconditional") are the full evaluation Boolean operators. They behave like normal binary operators, computing a result value from two fully evaluated operand expressions.

(c) LAND and LOR ("Logical AND" and "Logical OR") are CIL operators which do not specify either the kind of evaluation or the order of the operands. During IL expansion, they may be replaced either by LANDC and LORC or by LANDU and LORU tuples. Furthermore, when they are replaced by LANDC and LORC tuples, their operands may be interchanged if the cost of evaluating their first operands appears to be greater than the cost of evaluating their second operands.

The back end 12 must be able to identify the tuples belonging to each operand of a LAND, LOR, LANDC, or LORC tuple. In the CIL, the FLOWMARK tuple is used for this purpose. All of the tuples associated with the first operand of one of these tuples must immediately precede all of the tuples associated with the second operand, which must immediately precede the Boolean operator tuple itself. The first tuple associated with any operand of one of these tuples must be immediately preceded by a FLOWMARK tuple.

For example,

| $1: | FLOWMARK; | ! Start of first operand |
|---|---|---|
| $2: | FETCH(X); | |
| $3: | GTR($2, [0]); | |
| $4: | FLOWMARK; | ! Start of second operand |
| $5: | FETCH(X); | |
| $6: | LSS($5, [10]); | |
| $7: | LAND($3, $6); | ! Operator tuple |

The selection operators will select one of two values of any type, depending on the value of a Boolean operand. Like the logical OR and AND tuples, there are three selection tuples:

(a) SELC will evaluate only its second or its third operand, depending on whether its first operand is true or false.

(b) SELU will always evaluate all three of its operands, and then will select the value of either its second or third operand.

(c) SEL is a CIL operator which does not specify the kind of evaluation. It is replaced by either a SELC or a SELU operator during IL expansion.

Also like the logical AND and OR tuples, SEL and SELC require that the tuples associated with their operands be contiguous, in operand order, and preceded with FLOWMARK tuples.

For example

| $1: | FLOWMARK; | ! Start of first operand |
|---|---|---|
| $2: | FETCH(X); | |
| $3: | GEQ(2, [0]); | |
| $4: | FLOWMARK; | ! Start of second operand |
| $5: | FETCH(X); | |
| $6: | FLOWMARK; | ! Start of third operand |
| $7: | FETCH(X); | |
| $8: | NEG($7); | |
| $9: | SEL($3, $5, $8); | ! Operator tuple | or

| $1: | FLOWMARK; | ! Start of first operand |
|---|---|---|
| $2: | FETCH(X); | |
| $3: | GEQ($2, [0]); | |
| $4: | FLOWMARK; | ! There is no code for the second operand |
| $5: | FLOWMARK; | ! Start of third operand |
| $6: | FETCH(X); | |
| $7: | SEL($3, [0], $6); | ! Operator tuple -- note the second operand |

All of the Boolean operators are listed in Table 13.

Runtime Checking:

Checking operators verify that some condition is true during the execution of the program, and cause an exception if the condition is not true. Except for the ASSERT operator, all of the checking operators return the value of their first operand. Every checking tuple has a condition field, which specifies the exception to be signalled if the condition is not true, and a can be continued field, which indicates whether control might be returned after the exception is signalled. If control returns to a checking tuple after an exception, then the checking tuple will return the same value that it would have returned if the exception had not occurred. The checking operators are listed in Table 14.

Flow Control:

An ILG 55 is made up of basic blocks. A basic block is a sequence of tuples beginning with a branch target tuple and ending with a branch tuple or a flow termination tuple. A basic block is entered only at its beginning, and in principle all code in it is then executed before control passes out of it at its end (but see the discussion of conditional evaluation above).

In a CILG, the basic blocks are concatenated end to end. The branch tuple at the end of a basic block may be omitted if control flows from it into following basic block, which must begin with a LABEL tuple. Similarly, the LABEL tuple at the beginning of a basic block may be omitted if there are no branches to it. (That is, if the back end sees a LABEL tuple which is not preceded by a branch tuple, then it inserts a BRANCH to it; if it sees a branch tuple which is not followed by a branch target tuple, then it inserts a LABEL tuple with a synthesized label symbol.) The IL expansion phase produces a circular list of tuples for each basic block, with a separate flow graph data structure to represent the relations between them.

Within a basic block, flow implicitly follows the linear tuple ordering. Because all flow between basic blocks is represented with explicitly flow control tuples, the basic blocks of an ILG may be arranged in any order without affecting the meaning of a routine.

The branch target tuple at the beginning of each basic block contains a pointer to a label symbol or entry symbol node in the symbol table. Control flow between basic blocks is represented by a destination list which is an attribute of a branch tuple. Each node in a destination list points to a label symbol or entry symbol node which is also pointed to by some branch target tuple in the same routine, to indicate that control might be transferred to the basic block that begins with that basic block.

A branch target tuple marks the start of a basic block. All branch target tuples have the following attributes:

| Attribute | Meaning |
| --- | --- |
| Block entry | A flag indicating whether this is the entry basic block of its scope. |
| Label symbol | A pointer to the label or entry symbol node which is associated with this tuple. |
| Scope block | A pointer to a block node in the symbol table. |
| Volatile | A flag indicating that control can reach this basic block by some control transfer (such as a non-local goto) which is not represented in the ILG for this routine. |

A branch tuple marks the end of a basic block and specifies its successors. All branch tuples have the following attributes:

| Attribute | Meaning |
| --- | --- |
| Destination list | A pointer to the destination list for the branch. |
| Target symbol | A pointer to a symbol node. This field is used in only a few branch operators, and has a different meaning in each one, but it will always either be null or contain a pointer to a label symbol node. |

A destination list is a list of destination nodes, linked together by their next fields. The destination list field of a branch tuple contains a pointer to the first destination node in such a list. (Note that a destination node can occur in only one destination list, and a destination list can be pointed to by only one branch tuple. Even if two branches have the same destinations, they still must have distinct, albeit identical, destination lists.) Every destination node has a target field, which contains a pointer to a label or entry symbol node. A destination node represents a potential transfer of control to the basic block whose branch target tuple's label symbol field contains a pointer to the same symbol node. There are two kinds of destination nodes. Most kinds of branch tuples use simple destination nodes, and choose a destination based on its position in the destination list. BRSEL tuples, however, use selector destination nodes, and choose the destination whose selector matches the tuple's operand value. A selector destination node has additional fields low test and high test, both longword integers. It matches an operand value if the operand value falls between the destination's low test and high test values.

Unlike the regular branch operators, which specify a set of destinations with a destination list and then select one of them based on a tuple operand, the indirect branch operators (JUMP and JUMPLOCAL) cause control to be transferred to the address specified by an address expression (usually a label variable). These would be the operators used for a FORTRAN assigned goto or a PL/I got through a label variable.

The back end still needs to know the possible destinations of an indirect branch tuple so that it can build the routine flow graph correctly. Therefore, indirect branch tuples have a destination list, just like regular branch operators. However, their destination list contains only a single destination (which is optional for JUMP tuples). The target label of this destination node identifies a VLABEL tuple which is immediately followed by a VBRANCH tuple. The destination list of the VBRANCH tuple then lists all of the actual possible destinations in this routine of the indirect branch.

This combination of a VLABEL tuple and a VBRANCH tuple is referred to as a virtual basic block. No code is ever generated for it (which is why there must not be any other tuples between the VLABEL and the VBRANCH). It represents the fact that control can pass from the indirect branch to any of the successors of the virtual block. This has the advantage that if many indirect branches have the same set of possible destinations, a single virtual basic block can represent the possible destinations of all of them.

There is one other virtual basic block in every routine. This is the block which consists of the BEGIN and ENTRYPTR tuples. No code is generated for it, since execution always begins at an ENTRY tuple, but it identifies all the entry points of the routine for the back end.

A basic block may end with a branch tuple or with a flow termination tuple. When control reaches a flow termination tuple, it leaves the current routine completely. Since flow termination tuples do not transfer control to a destination in the current routine, they do not have destination list and target symbol attributes.

Note that the JUMP operator is effectively a flow termination operator if it does not have a destination list, since that means that it does not have any possible destinations in the current routine. JUMPSYMBOL is a flow termination operator which is used to represent a non-local goto to a known label in the CIL; in the EIL it is replaced by such a non-local JUMP.

All of the flow control operators are listed in Table 15.

Routine Calls and Parameter Passing:

There are three types of linkage conventions: control, parameter, return value. The phrase "linkage conventions" refers to all the rules about the generated code which allow a calling routine and a called routine to "talk to each other" properly. Some of these rules are built in to the code generator 29. In other cases there are choices, which must be made consistently for a calling and called routine. Some of these choices will be made by the shell (when it has access to both routines); others must be made by the front end 20, and encoded in the symbol table 30 and ILG 55.

A control linkage convention defines the instructions which must be executed to pass control from a calling to a called routine, to establish the execution context of the called routine, and to return control to the calling routine. Control linkage conventions are determined by the INIT-CALL and CALL tuples in the calling routine and the entry symbol node for the called routine.

A CALL tuple whose operand is a reference to an entry symbol node which isn't an external reference is an identified call, and there is complete freedom to select the linkage for it, even to the extent of compiling the called routine in line or generating a customized copy of the called routine. For unidentified calls, the calling convention field of the INITCALL tuple must specify the control linkage convention to use for the call. The value of this field must come from the enumerated type GEM$CALLING_CONVENTION, those constants are defined in the following list:

| Constant | Meaning |
| --- | --- |
| Standard | Use the standard external call conventions for the target system. (This is the only calling convention defined for the MIPS implementation.) |
| Call | Use a CALL linkage (VAX only). |
| Jsb | Use a JSB linkage (VAX only). |

A routine block node has a standard entry field which specifies what control linkage convention to use for the copy of this routine that will be called by unidentified calls to this routine. The value of this field must come from the enumerated type GEM$ENTRY_CONVENTION, whose constants are defined in the following list:

| Constant | Meaning |
| --- | --- |
| None | All calls to the routine are identified calls in the current compilation, so it is unnecessary to generate an instance of the routine to be called from unidentified calls. |
| Standard | Generate a routine that can be called using the standard entry convention. (This is the only calling convention defined for the MIPS implementation.) |
| Call | Use a CALL linkage (VAX only). |
| Jsb | Use a JSB linkage (VAX only). |

Parameter Linkage Conventions are another type. A routine call makes an argument list available to the called routine. The argument list is a collection of scalar values (often addresses) in locations which are known to both the calling and the called routine by agreement (registers, or location sin a block of memory whose address is contained in some standard register).

A formal parameter of a called routine is represented by a variable symbol node whose is a parameter flag set. The address associated with a parameter symbol is either a storage location specified by the calling routine or a local storage location which contains a copy of the data passed by the calling routine. (Remember that an "address" may actually specify a register.) It is derived from the argument list and from the mechanism and the semantic flags of the parameter symbol, as described below.

A parameter has bind semantics if the address associated with the parameter variable is the address of the storage location which was passed by the calling routine (the actual storage location). It has copy semantics if the compiler allocates storage for it in the called routine (the local storage location) and generates copies between the actual and local storage locations as needed. (The local storage location of a parameter with bind semantics is the same as its actual storage location.)

The compiler will choose whether to use bind or copy semantics for a parameter based on the usage pattern of the parameter within the routine and on the flags listed in Table 10-3. ("Alias effects" are discussed in CT0.70, Data Access Model. Briefly, they are ways that the actual storage location might be accessed, other than through the parameter symbol. This includes direct reference to a non-local variable which might be the actual storage location, dereference effects, and calls to other routines which might access the actual storage location.)

Table 17 illustrates the use of the parameter semantic flags as they would be set for various source languages.

A parameter mechanism specifies the relationship between what the calling routine wishes to pass to the called routine and what is actually stored in the argument list. A parameter symbol has a mechanism field which specifies the mechanism which is used to pass a value to this parameter, and an argument tuple has a mechanism field which specifies the mechanism by which this argument is to be passed. The values of these fields must come from the enumerated type GEM$MECHANISM, whose constants are listed in Table 18.

If a parameter variable's unknown size flag is false, then the size of the parameter is known at compile time, and is specified by its size field. If unknown size is true, then the size of the parameter is not known at compile time. The size of an unknown size parameter can be determined at run time if it has the array, string, or address and length (reference with associated length parameter) mechanism. When a separate length word is passed with the address and length mechanism, and the parameter has an aggregate data type, the length argument is interpreted as the parameter size in elements (bits or characters), not in bytes. Furthermore, if the parameter is a character string whose string representation is varying or asciz, then the size is a maximum size, not the string's current size, and applies only to the test part of the string, and not to the space that is required for the string length word or null terminator. Note that a parameter cannot have copy semantics unless the compiler know how much to copy. If the actual parameter size is neither known at compile time nor computable by the compiler at run time, then the front end must set the parameter's must bind flag to force the use of bind semantics.

Another type is Return Value Linkage Conventions. A called routine can return information to its caller in two ways. The first is by using an output parameter. This is a variable which is passed with a mechanism other than value, so that the called routine can store a value into it. The second way is with a return value. A return value is a value which is computed by the called routine and "returned" to the caller, where it becomes available as an expression value through a special result tuple.

Scalar values can be returned in registers. For example, almost all of our languages return arithmetic function values in a standard register; and the BLISS "output parameter" feature allows a routine to return values in arbitrary registers.

For a routine to return a string, there must be tuples in the argument list to allocate a temporary buffer for the return value and to pass its address to the called routine, tuples in the called routine to store the return value into the buffer, and tuples in the caller to make the retrieve the value from the buffer.

When the size of a returned string is determined by the called routine, the caller cannot just allocate space for the result, since it does not know in advance how big the result will be. The mechanisms listed in Table 19 provide for this possibility. These mechanisms are provided through special tuples. However, their availability depends on the calling standard of the target environment.

The caller may: (a) require that the called routine return a value by fixed buffer; (b) require that the called routine return a value on the stack; (c) request that the called routine return a value by dynamic string, but accept a string returned on the stack if the called routine so chooses. The called routine must always be prepared to return a dynamic-size result by fixed buffer or on the stack if the caller requires it. It must also be prepared to return a result either by dynamic string or on the stack when the caller requests a result by dynamic string.

Representation of murine calls in the CIL will now be considered. There are many distinct operations involved in calling a procedure or function. Any of the following steps may be necessary.:

(a) Allocate space for the argument list.

(b) Allocate space for pass-by-value operand expression.

(c) Allocate space for descriptors.

(d) Create argument descriptors.

(e) Create argument descriptors.

(f) Allocate space for result values. (A result value, or output argument, is an argument which does not exist until after the call. In the IL, a function will be treated as a procedure with a result value.)

(g) Create the argument list.

(h) Call the routine.

(i) Release space that was allocated for arguments, descriptors, and the argument list.

(j) Get the result values from the call.

(k) Free the space that was allocated for the result values.

The general strategy taken in the IL is to provide separate operators for the different operations involved in doing a call, but to require that these be tied together in a specified fashion. A routine call in the IL consists of:

1. An INITCALL statement, which flags the beginning of the series of actions which will make up the call.

2. A series of argument and temporary allocation statements which will construct the argument list.

3. A call statement (CALL or BPCALL) which actually effects the transfer of control to the called routine.

4. A series of result tuples which make the call's return values accessible.

The INITCALL and call statements are mandatory; the argument list and result tuples are optional. All of the tuples involved in a call must occur in the same basic block, and any result tuples must follow the call tuple immediately, with no intervening tuples. There are no other restrictions, though, on what tuples may occur between the INITCALL and the call. The IL for a routine call may even be contained within the argument list IL for another call.

Constructing the argument list involves allocating space for the argument list itself, for addresses and descriptors of arguments, for temporaries to hold values being passed, and for output arguments. It may also involve initializing the allocated space. These activities are specified in the IL with argument tuples. All argument tuples have names beginning with ARG, and have the attributes listed in Table 20.

When the calling routine has a value to pass, it uses one of the argument tuples whose names begin with ARGVAL. With these tuples, the actual argument value is specified as an operand of the argument tuple. Note that this does not necessarily mean that the argument is passed using the value mechanism. If the mechanism is value, the operand value is stored directly into the argument list; otherwise, a temporary is allocated, the operand value is stored into the temporary, and the temporary is passed by reference or descriptor. (This is like % REF in BLISS.) The value mechanism will only be supported with the ARGVAL tuple with scalar types, and with the ARGVALA tuple with a compile-time constant size.

When the calling routine has the address of an existing store location to pass, it uses on eof the argument tuples whose names begin with ARGADR. With these tuples, the address of the actual storage location is specified as an operand of the argument tuple. Thus, the value mechanism cannot be used with these tuples. Since the occurrence of one of these tuples in an argument list can cause the called routine to read from or write to a storage location known to the current routine, these tuples can have dependencies and side effects, and therefore have the offset, effects, effects2, and base symbol fields that are used in all memory reference tuples, as well as the special flags parm is read and parm is written, which indicate whether the compiler should assume that the called routine might read from and/or write to the storage location.

When an argument tuple specifies the general mechanism, a code is generated to allocate space for the descriptor and to fill in its base address field. The front end must explicitly specify any other fields that are to be initialized in the descriptor. It does this using DSCFIELD tuples, which refer back to a preceding argument tuple with the general mechanism and specify a value to be stored into a field in the descriptor that was allocated for that argument.

Constructing an Argument Block:

Some RTL linkages may require that a collection of arguments be passed in an argument block, whose address is passed to the RTL routine like an ordinary reference parameter. This is accomplished using three special tuples.

(a) ARGBLOCK is an argument tuple which allocates a block of a specified size on the stack and passes its address to the called routine. The block can be initialized using BLKFIELD tuples.

(b) A BLKFIELD tuple is like a DSCFIELD tuple, except that it refers back to a preceding ARGBLOCK tuple instead of to an arbitrary tuple with the general descriptor mechanism. It stores a value into a field of the argument block.

(c) ARGDEFINES is like an argument tuple, except that it doesn't generate any code. It allows the front end to specify argument-like side effects which are not associated with a regular argument tuple. In particular, it can be used to indicate the effects associated with arguments which have been passed through an argument block.

For a routine to return an aggregate value, it must store that value into a location that has been allocated by its caller. The tuples whose names begin with ARGTMP will allocate a block of storage of a specified size and pass its address to a called routine. They are the same as the ARGADR tuples, except that the ARGADR tuples pass the address of an existing block of storage, and the ARGTMP tuples pass the address of a temporary that has been allocated especially for the call.

The ARGBUF, ARGSTK, and ARGDYN tuples will allocate the temporaries and pass the special descriptors necessary to obtain a dynamic string return value. These tuples have all the usual argument tuple attributes, but their mechanism attribute is ignored, since the mechanism is implied by the use of the dynamic return value mechanism.

The tuples whose names begin with RESULT will make the return values from a routine call accessible in the calling routine. Their effect is to move the output parameters from the temporary locations or registers where they have been returned by the called routine into more lasting temporaries. The value of a result tuple is simply the value of the return value that it has retrieved. All the result tuples for a call must immediately follow the call tuple.

Bound Procedure Calls:

A bound procedure value, or BPV, represents the information needed to call an unknown routine. Since routines may contain uplevel references to stack allocated variables in other routines, a bound procedure value must incorporate not only the code address of the routine to be called, but also sufficient information to construct a static link for it.

Unfortunately, BPVs are handled very differently in different software architectures—how they are created, how they are represented, how they are called, and even how big they are. Therefore, the compiler will not attempt to provide a consistent representation. Instead, the front end will be expected to generate differing code, depending on the target software architecture.

(a) In the VAX and MIPS software architectures, a BPV is simply a code address and a context value, and a bound procedure call is done by loading the context value into a specific register and then doing a call to the code address. Therefore, the front end will be responsible for representing a BPV as a pair of independent address values. The code address is obtained with a BPLINK tuple. A call to a BPV should be represented as a CALL whose address operand is the code address value, with the context value passed by value as a special register argument in the architecture's static link register.

(b) On RISC machines as referred to, all procedures are represented by descriptors which contain a code address along with some additional information, and a BPV is simply the address of a special descriptor, constructed at run time, which contains a context pointer and the address of an RTL routine to load the context pointer and call the real routine. The front end will have to allocate space for such a descriptor itself, and use the BPVAL tuple to fill it in. Then the BPV is represented by the address of the descriptor, and a call to the BPV should be represented by a call to that address.

It is necessary for the back end 12 to know what the parameters are for each entry point in a routine. The front end 20 accomplishes this by setting the param list and param list tail fields of each entry symbol node to point to the first and last nodes in a list of parameter nodes (linked by their next fields) that represents the parameter list of that entry point.

Each parameter node has a symbol field which points to a parameter symbol node of the routine that contains the entry point, and arg location, pass by register, and special register fields which have the same meaning that they do in argument tuples (see Table 20). Thus, the list of parameter nodes identifies all the parameters of an entry point and where they occur in that entry point's argument list.

Note that a parameter symbol may occur in more than one parameter list, possibly with a different arg location in each. Parameter nodes do not have a mechanism field, however, since the mechanism is regarded as an attribute of a parameter symbol rather than of its occurrence in a particular argument list.

The RETURNREG tuple returns a scalar value in a specified register, and the RETURNSTK and RETURNDYN tuples return a string value using one of the dynamic string return mechanism provided in the PRISM calling standard. Note that no special tuples are needed for a called routine to return a value through an argument temporary, since there is no difference between returning a value through an argument temporary and storing a value into an ordinary output parameter.

The address associated with a parameter symbol is the address of the parameter's local storage location. The called routine can obtain the address of the descriptor for a parameter with the general descriptor mechanism by using the DESCADDR tuple. It can obtain the actual size of an unknown size parameter using the SIZE tuple, provided that the size is available in the argument list (either in a descriptor or in a separate size parameter).

All of the operators involved in routine calls are listed in Table 21.

Storage Allocation and Scoping:

A lexical block is a range of a source program over which a set of declarations is valid—for example, a routine, subroutine, function, or begin-end block. In the symbol table, the lexical structure of a routine is represented by a tree of scope block nodes whose root is the routine block node. Each basic block in the ILG contains code belonging to a single lexical block. The branch target tuple at the start of a basic block has a scope block field which points to the corresponding block node in the symbol table. Every lexical block in a routine must have a unique scope entry basic block, which is the only basic block in the lexical block to which control can pass from any basic block outside that lexical block. This scope entry basic block is identified by the block entry flag in the branch target tuple.

A reference to a variable symbol in the CIL always yields the address of a storage location (or the name of a register):

1. A static variable is one whose storage class is static, global ref, or preserved. Static variables are located in some PSECT at compile time, so that every reference to such a variable will refer to the same location.

2. A local variable is one whose storage class is automatic, stacklocal, register, or register preferred, and whose unknown size flag is false. Local variables exist only during a single execution of their lexical scope, and may have multiple instances if multiple instances of their lexical scope may be executing simultaneously. They are allocated at compile time to registers or to known locations in their routine's stack frame.

3. A dynamic variable is one with the same storage class as a local variable, but whose unknown size flag is true. Like local variables, dynamic variables exist only during a single execution of their lexical scope, and may have multiple instances if multiple instances of their lexical scope may be executing simultaneously. They are allocated on the stack at run time by a CREATE tuple, and are accessed through an associated pointer variable which is created by the back end.

4. Parameters with copy semantics behave like local or dynamic variables, depending on the setting of their unknown size flag.

5. Parameters with bind semantics are not allocated in the called routine at all. They are accessed through an associated pointer variable which is created by the back end to hold the actual storage location address.

A tuple in a lexical block may refer to any variable which is declared in that lexical block, or in any of its ancestors in the symbol table block tree. There are no problems referring to variables in the current routine, of course. Static variables of another routine can be referred to directly. Local and dynamic variables of other routines require a "static chain" to locate the stack frame in which the variable is declared. However, the back end 12 is completely responsible for generating the code for creating and using static chains, provided that the front end correctly annotates the routine blocks and variables.

There are several kinds of dynamic stack allocation:
1. The stack storage for a dynamic variable is allocated by a CREATE tuple. it exists from the execution of the CREATE tuple until control passes into a basic block which is not in the same lexical block as the CREATE tuple. (This means that the CREATE tuple for a dynamic variable must be allocated in a basic block whose scope block is the block in which the variable is declared; otherwise, its dynamic storage will be released while the variable is lexically still in scope.)
2. Code to allocate the stack storage for an unknown size copy parameter is generated immediately following the ENTRY tuple. Since ENTRY tuples must be in the main routine block, this storage exists until the routine returns.
3. A dynamic temporary may be created by the back end to hold the value of an aggregate expression. It exists from the execution of the tuple which creates the value at least until the execution of the tuple which uses that vale.
4. Stack space is allocated to hold the argument value for an aggregate ARGVALx tuple. it exists from the execution of the ARGVALx tuple until the execution of the CALL tuple.
5. Stack space is allocated to hold a return value for an ARGTMPx tuple. It exists from the execution of the ARGTMPx tuple until the evaluation of the RESULTx tuple which fetches the return value.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

TABLE 1

PREFIXING CONVENTIONS FOR GLOBAL AND EXPORTED NAMES

Names exported from packages

- Routine names have the form GEM$ZZ_name.
- Exported macro names have the form GEM$ZZ_name.
- Global variable names have the form GEM$ZZ_name.
- Literal names (whether global or exported) have the form GEM$ZZ_K_name.

TABLE 1-continued

PREFIXING CONVENTIONS FOR GLOBAL AND EXPORTED NAMES

Enumerated data types

- Every enumerated data type has a unique "type name."
- Each literal in the type XYZ has a name of the form GEM$XYZ_K_name.
- The names GEM$XYZ_K_FIRST and GEM$XYZ_K_LAST refer to the first and last values in the range of the type.

Aggregate data types

- Every aggregate data type has a unique "type name."
- Each field in the aggregate type XYZ has a name of the form GEM$XYZ_name.
- Sizes of particular variants of an aggregate type are literals with names of the forms GEM$XYZ_name__SIZE.
- The size of an aggregate type as a whole (i.e., the size of its largest variant) is GEM$XYZ__SIZE.
- The name GEM$XYZ refers to the type declaration macro, whose expansion is BLOCK[GEM$XYZ__SIZE, BYTE]FIELDS(GEM$XYZ__FIELDS).

TABLE 2

DATA TYPES OF SHELL ROUTINE ARGUMENTS

| | |
|---|---|
| Integer | 32-bit (longword) signed integer. Passed by value. |
| String | A varying string (16-bit unsigned length word + test). Passed by reference. |
| Handle | A 32-bit (longword) value which is interpreted by the shell routines (often as the address of a shell internal data structure), but which has no meaning to the front end. Passed by value. |
| Block | Some data block whose structure is defined in the shell package specifications, and whose contents are used to communicate between the front end and the shell. Passed by reference. |
| Counted vector | A 32-bit unsigned count word, followed by the specified number of 32-bit components. The components of a vector may be integers, addresses of varying strings, handles, or addresses of blocks. Passed by reference. |

TABLE 3

GEM$XX_INIT is called by the shell 11 almost as its first action. (The only things the shell does before calling GEM$XX_INIT are to start the timing interval GEM$TM_G_ICB_CMPTIL(see <REFERENCE>(sect_shell_tm)), initialize the debugging package (see <REFERENCE>(sect_shell_db)), and initialize the global variable GEM$CP_G_ERROR_FCB to the output file handle of the "standard error" file.
On return from GEM$XX_INIT, all the GEM$XX global variables listed below must be properly initialized. Other front end initialization may also be done in GEM$XX_INIT, or it may be postponed until GEM$XX_PROCESS_GLOBALS (see below).
Since the shell 11 does not do any command line processing until after calling GEM$XX_INIT, it is possible under VAX/VMS to implement a GEM compiler with a foreign command instead of a DCL command by having GEM$XX_INIT call LIB$GET_FOREIGN to read the command line and CLI$DCL_PARSE to set the command string that the shell will process.

GEM$XX_PROCESS_GLOBALS is called by the shell after it has processed the global qualifiers from the command line, but before it has processed any command-line parameters or local qualifiers. This routine can examine the global qualifier blocks and take whatever action is appropriate.

GEM$XX_PROCESS_LOCALS is called by the shell 11 after it has processed the local qualifiers from the command line, but before it has opened any files 21 specified by them. This routine can examine the local qualifier blocks and change their contents as desired. This allows for dependencies between qualifiers that cannot be represented in the individual qualifier blocks.

TABLE 3-continued

GEM$XX_COMPILE is called by the shell 11 after it has parsed a parameter plus-list and its qualifiers, filled in the local qualifier blocks, and initialized GEM$TI with the input stream specified by the plus list. This routine is responsible for compiling that input stream.
GEM$XX_FINI is called by the shell as its very last action before it exits. This routine may do any front-end-specific clean-up.
The front end must also declare the following global variables. They must be defined by the time that GEM$XX_INIT returns control to the shell 11. (They may be defined at link time, but this will require address fixups at image activation time.)
GEM$XX_G_GLOBAL_QUALS contains the address of a counted vector of pointers to the qualifier blocks for the compiler's global qualifiers (see <REFERENCE>(sect_shell_cp)). These global qualifier blocks will be filled in by the shell before it calls GEM$XX_PROCESS_GLOBALS.
GEM$XX_G_LOCAL_QUALS contains the address of a counted vector of pointers to the qualifier blocks for the compiler's local qualifiers (see <REFERENCE>(sect_shell_cp)). These local qualifier blocks will be filled in by the shell before each call to
GEM$XX_COMPILE.
GEM$XX_G_FAC_PREFIX contains the address of a varying string containing the facility string to be used in constructing compiler messages.
GEM$XX_G_FAC_NUMBER contains the integer facility code to be used in constructing compiler message codes.
GEM$XX_G_IN_DEFAULTS contains the address of a counted vector of pointers to varying strings containing the default file specifications to be used when opening source files specified in the command line parameters.
GEM$XX_G_LIB_DEFAULTS contains the address of a counted vector of pointers to varying strings containing the default file specifications to be used when opening text libraries specified as command line parameters with the /LIBRARY qualifier.
GEM$XX_G_PRODUCT_ID contains the address of a varying string containing the product identification string to be used in header lines in the listing file.
GEM$XX_G_PREFIX_LEN contains an integer specifying the number of columns to be reserved for a prefix string (specified by the front end) to be attached to source lines in the listing file.
The Virtual Memory Package (GEM$VM)

The virtual memory package provides a standard interface for allocating virtual memory. It supports the zoned memory concept of the VMS LIB$VM facility; in fact, under VMS, GEM$VM is an almost transparent layer over LIB$VM. However, the GEM$VM interface is guaranteed to be supported unchanged on any host system.
The Locator Package (GEM$LO)

A locator describes a range of source text 15 (starting and ending file, line, and column number). The text input package returns locators for the source lines that it reads. Locators are also used in the symbol table 16 and intermediate language nodes to facilitate message and debugger table generation, and are used for specifying where in the listing file the listing package should perform actions. A locator is represented as a longword. The locator package maintains a locator database, and provides routines to create and interpret locators.

TABLE 4

INTERMEDIATE LANGUAGE DEFINITION FILES

| | |
|---|---|
| GEM$ND_NODES.SDL | Contains several general type definitions, and includes all the SDL files listed below. It defines the generic GEM$NODE aggregate type. |
| GEM_CONSTANTS.DAT | Contains the definitions of the node kind and node subkind enumerated types, as well as a variety of other enumerated types. |
| GEM_CONSTANTS.SDL | The SDL translation of GEM CONSTANTS.DAT. See Appendix D for a description of the CONSTANTS program which does the translation. |
| BLK_NODE.SDL | Contains the definition of block nodes (GEM$BLOCK_NODE), identified by a value of GEM$NODE_K_BLOCK in the node's kind field. |
| SYM_NODE.SDL | Contains the definition of symbol nodes (GEM$SYMBOL_NODE), identified by a value of GEM$NODE_K_SYMBOL in the node's kind field. |
| FRM NODE.SDL | Contains the definition of frame nodes (GEM$FRAME_NODE), identified by a value of GEM$NODE_K_FRAME in the node's kind field. |
| LIT_NODE.SDL | Contains the definition of literal nodes (GEM$LITERAL_NODE), identified by a value of GEM$NODE_K_LITERAL in the node's kind field. |
| PRM_NODE.SDL | Contains the definition of parameter nodes (GEM$PARAMETER_NODE), identified by a value of GEM$NODE_K_PARAMETER in the node's kind field. |
| TPL_NODE.SDL | Contains the definition of tuple nodes (GEM$TUPLE_NODE), identified by a value of GEM$NODE_K_CIL_TUPLE in the node's kind field. |
| DES_NODE.SDL | Contains the definition of destination nodes (GEM$DESTINATION_NODE), identified by a value of GEM$NODE_K_DESTINATION in the node's kind field. |
| GEM$ND.L32 | The library file which should be used by front ends coded in BLISS. It contains the BLISS translation of the files listed above. |

TABLE 5

Symbol Table and IL Routines

| Routine | Purpose |
|---|---|
| *Initialization and Termination* | |
| GEM$ST_INIT | Initialize the intermediate representation for a module. |
| GEM$ST_FINI | Release all space that has been allocated for the intermediate representation of a module. |
| *Creating and Manipulating ILGs* | |
| GEM$IL_ALLOCATE_CIL_NODE | Allocate a CIL tuple node. |
| GEM$IL_ALLOCATE_DES_NODE | Allocate a destination node. |
| GEM$IL_FREE_DES_NODE | Deallocate a destination node. |
| GEM$IL_INSERT | Insert a tuple or a list of tuples into a list of tuples. |
| GEM$IL_UNLINK | Remove a tuple from a list of tuples. |
| *Creating the Symbol Table* | |
| GEM$ST_ALLOCATE_BLOCK_NODE | Allocate a block node. |
| GEM$ST_ALLOCATE_FRAME_NODE | Allocate a storage frame node. |
| GEM$ST_ALLOCATE_MUTABLE_SYMBOL | Allocate a Symbol node whose subkind can be changed. |
| GEM$ST_ALLOCATE_PARAMETER_NODE | Allocate a parameter list node. |
| GEM$ST_ALLOCATE_SYMBOL_NODE | Allocate a symbol node whose subkind cannot be changed. |
| GEM$ST_LOOKUP_LITERAL | Get a literal node for a specified literal value. |
| GEM$ST_LOOKUP_PSECT | Get a PSECT storage frame node with a specified name. |
| GEM$ST_MUTATE_SYMBOL | Change a subkind of a mutable symbol node. |
| *Specifying Initial Values* | |
| GEM$ST_STORE_ADDRESS | Specify a symbol or PSECT address as the initial value of a variable or PSECT location. |
| GEM$ST_STORE_BUFFER | Specify an arbitrary block of bytes as the initial value of a variable or PSECT location. |
| GEM$ST_STORE_LITERAL | Specify the value of a literal node as the initial value of a variable or PSECT location. |

TABLE 6

Representational Types for Specific Target Architectures

| Type | MIPS | 64-bit RISC | VAX |
|---|---|---|---|
| *Supported Arithmetic Types* | | | |
| INT8 | Yes | Yes | Yes |
| INT16 | Yes | Yes | Yes |
| INT32 | Yes | Yes | Yes |
| INT64 | No | Yes | No |
| UINT8 | Yes | Yes | Yes |
| UINT16 | Yes | Yes | Yes |
| UINT32 | Yes | Yes | Yes |
| UINT64 | No | Yes | No |
| REALF | No | Yes | Yes |
| REALD | No | Yes | Yes |
| REALG | No | Yes | Yes |
| REAL | No | No | Yes |
| REALS | Yes | Yes | No |
| REALT | Yes | Yes | No |
| REALQ | No | Yes | No |
| REALE | No | Yes | No |
| CMPLXF | No | Yes | Yes |
| CMPLXD | No | Yes | Yes |
| CMPLXG | No | Yes | Yes |
| CMPLXS | Yes | Yes | No |
| CMPLXT | Yes | Yes | No |
| *Type Sizes* | | | |
| ADDR | 32 | 64 | 32 |
| *Type Synonyms* | | | |
| IADDR | INT32 | INT64 | INT32 |
| UADDR | UINT32 | UINT64 | UINT32 |
| IMAX | INT32 | INT64 | INT32 |
| UMAX | UINT32 | UINT64 | UINT32 |

TABLE 6a

New Tuple Fields for Induction Variable Detection

| | |
|---|---|
| IV_IS_INDUCTIVE - | a flag indicating that TUPLE is an inductive expression with respect to the loop designated by the loop top TUPLE[IV_LOOP]. At the end of the FIND_IV algorithm, this tuple is inductive only if IV_BASIC is in the BASIC_IVS set of the loop designated by IV_LOOP. |
| IV_BASIC - | the basic induction variable candidate of TUPLE. If IV_BASIC is not in the basic induction variable set of IV_LOOP after the FIND_IV algorithm has completed, then this tuple is not inductive. |
| IV_LOOP - | the loop top of the innermost loop that TUPLE is inductive within. |
| IV_NON_CONSTANT | |
| IV_COEFFICIENT - | Each inductive expression E defines a linear function on a basic induction variable I. That is, E can be recast in terms of I by a function of the form: $E = (a * I) + b$ where "a" is the "coefficient" of the linear function, and "b" is the "offset." The IV_COEFFICIENT field is an integer field containing the constant part of the coefficient. The IV_NON_CONSTANT field is a flag indicating that the coefficient has non-constant parts. |

New Flow Node Fields

| | |
|---|---|
| BASIC_IVS - | set of basic induction variable candidates for the loop represented by "this" loop top. Initially, this is the set of all variables modified in the loop. Algorithm FIND_IV eliminates the variables that don't conform to the rules for basic induction variables. Only valid for loop tops. |
| CONDITIONAL_SET - | set of variables with stores that do not get executed exactly once on each complete trip through the loop represented by "this" loop top. Presence in this set does NOT imply that the variable is an induction variable. Only valid for loop tops. |

TABLE 7

Common Tuple Fields

| Field | Meaning |
|---|---|
| Kind | The generic node kind field that occurs in every node. |
| Generic operator | The general operation performed by the tuple. This is just another name for the generic subkind field that occurs in every node. |
| Operator type | A data type which, in conjunction with the generic operator, determines the specific operation performed by the tuple. The operator type is usually, but not always, the same as the data type of one or more operands (particularly the first operand) of the tuple. Note that is is not necessarily the same as the data type of the value computed by the tuple. For example, ADD.INT16 adds two INT16 operands and produces an INT16 result, but LSS.INT16 compares two INT16 operands and produces a BOOL result, and STORE.INT16 stores an INT16 value in a memory location and doesn't have a result. |
| Result type | The type of the value computed by this tuple. For most operators the result type is determined by the opeartor type, but for some operators the result type is independent of the operator type, and the specific operation performed by the tuple depends on both types. |
| Operands | An array of pointers to the operands of this tuple. The number of operands is determined by the generic operator. Each operand pointer points to another IL tuple node or, in the CIL only, to a symbol or literal node. The individual operand pointer fields may be referred to as op1, op2, etc. |
| Next tuple | Pointers to the next and previous tuples in a doubly-linked list of tuples. The next tuple order is the implicit order of evaluation. In the CIL, all the tuples in the ILG are linked together, while in the EIL, the tuples in each basic block form a separate list. |
| Locator | The textual location in the program source of the token or tokens which were compiled into this tuple. It is used in constructing error messages, source correlation tables, etc. (Locators are described in the GEM$LO package specification.) |
| Expr count | Used only in EIL tuples, where is is set by the back end. The expr count field is discussed in CT.029, Interface for Representing Effects. |

TABLE 8

Headings in Tuple Dictionary Entries

| Heading | Description |
|---|---|
| Operator | The name of the operator appears at the top of the dictionary page. This name may be prefixed with GEM$TPL_K_ to yield the actual constant used in GEM code. |
| Overview | The tuple overview appears directly below the operator name. It explains in one or two sentences what a tuple with this operator will do. |
| Format | The tuple format follows the tuple overview. It specifies the number of operands that the operator takes and the allowable operator types, operand types, and result types. |
| Attributes | Attributes are tuple fields other than the common fields listed in Table 7. The attributes section follows the format section, and lists all the attributes that are used in the tuple. The meanings of the attributes are generally summarized in the restrictions and description sections. |
| Value | The value section follows the attributes section. It provides a detailed description of the value returned by the tuple as a function of its operands. |
| Restrictions | The restrictions section follows the value section. It describes restrictions on the use of the tuple. Restrictions generally fall into one of the following categories: (a) The tuple can be used only in the CIL or the EIL. (b) The tuple must occur in a particular context in an ILG, or must be an operand of a particular kind of tuple. (c) Certain operands of the tuple must be tuples with specific operators. (d) Certain attribute fields of the tuple must contain pointers to particular kinds of nodes. Only structural (syntactic) restrictions on the form of the ILG are documented in this section. Runtime restrictions, such as the requirement that the length operand of a substring tuple must not be negative, are given in the description section. |
| Description | The description section follows the restrictions section, and describes the effects of the tuple. it also gives miscellaneous information about the tuple such as runtime requirements on its operand values, error conditions that can occur, and particular source language constructs that the tuple is provided to support. |

TABLE 9

Data Access Operators

| Operator | Meaning |
|---|---|
| | Fetch Operators |
| FETCH | Fetches a representational value. |
| FETCHA | Fetches a signed integer with sign extension or an address or unsigned integer with zero extension from a packed array element. |
| FETCHF | Fetches a character or bit string with a specified length. |
| FETCHS | Fetches a character or bit substring, that is, a string with a string with a specified length and specified character or bit offset from a base address. |
| FETCHV | Fetches a varying length character string, that is, one whose length is in the word preceding the text of the string. |
| FETCHX | Fetches a signed integer with sign extension or an address or unsigned integer with zero extension from a bit field. |
| FETCHZ | Fetches a null-terminating character string. |
| FETCHZA | Fetches a signed integer with zero extension from a packed array element. |
| FETCHZX | Fetches a signed integer with zero extension from a bit field. |
| | Store Operators |
| STORE | Stores a representational value. |
| STOREA | Stores an integer or address value in a packed array element. |
| STOREF | Stores a character or bit string. |
| STORES | Stores a character or bit substring, that is, stores a string with a specified length at a specified character or bit offset from a base address. |
| STOREV | Stores a varying length character string, that is, stores the text of the string following a word containing the length of the string. |
| STOREX | Stores an integer or address value in a bit field. |
| STOREZ | Stores a null-terminated character string, that is, stores the text of the string followed by a null character (all zero bits). |
| VSTORE | Stores an arithmetic or address value, and yields the value that was stored. |
| VSTOREA | Stores an integer or address value in a packed array element, and |

TABLE 9-continued

Data Access Operators

| Operator | Meaning |
|---|---|
| | yields the value that was stored. |
| VSTOREX | Stores an integer or address value in a bit field, and yields the value that was stored. |

Increment Operators

| Operator | Meaning |
|---|---|
| POSTINCR<br>POSTINCRA<br>POSTINCRX | Fetches a representational value from a variable, from a packed array element, or from a bit field, adds a compile-time constant increment to it, stores the result back into memory, and yields the initial (unincremented) value. |
| PREINCR<br>PREINCRA<br>PREINCRX | Fetches a representational value from a variable, from a packed array element, or from a bit field, adds a compile-time constant increment to it, stores the result back into memory, and yields the incremented value. |

Variable Modification Operators

| Operator | Meaning |
|---|---|
| | These operators fetch a value from a variable, a packed array element, or a bit field, perform an arithmetic operation between the fetched value and another operand value, store the result of the arithmetic operation back into the original memory location, and yield the updated value. |
| ADDMOD<br>ADDMODA<br>ADDMODX | Adds some value to the arithmetic value in a memory location. |
| DIVMOD<br>DIVMODA<br>DIVMODX | Divides the arithmetic value in a memory location by some value. |
| IANDMOD<br>IANDMODA<br>IANDMODX | "And"s the integer value in a memory location with some value. |
| IORMOD<br>IORMODA<br>IORMODX | "Or"s the integer value in a memory location with some value. |
| IXORMOD<br>IXORMODA<br>IXORMODX | "Exclusive or"s the integer value in a memory location with some value. |
| MULMOD<br>MULMODA<br>MULMODX | Multiplies the arithmetic value in a memory location by some value. |
| REMMOD<br>REMMODA<br>REMMODX | Takes the remainder of the arithmetic value in a memory location with respect to some value. |
| SHLMOD<br>SHRMODA<br>SHRMODX | Shifts the integer value in a memory location right by some value. |
| SUBMOD<br>SUBMODA<br>SUBMODX | Subtracts some value from the arithmetic value in a memory location. |

TABLE 10

Attributes of Data Access Tuples

| Attribute | Meaning |
|---|---|
| Offset | A constant offset (in bytes to be added to the address operand for the fetch or store operation. |
| Effects | A longword which is reserved for use by the front end. GEM will never examine this field (except when propagating it during IL expansion). It is intended as a place for the front end to save information about the memory locations affected or accessed by the tuple. See CT.029 for more details. |
| Effects2 | Not used in FETCH and STORE tuples. For a PREINCR, POSTINCR, or opMOD tuple, effects pertains to the "read effects" (dependencies) of the tuple while effects2 pertains to its "write effects." |
| Base symbol | Base symbols are described in CT.070, Data Access Model. |
| Must read | Not used in STORE tuples. Indicates to the optimizer that the variable being fetched may have been written, through some mechanism not otherwise detectable in the IL subsequent to any prior fetches or stores, and that it therefore must not be assumed to have the same value that it had at the time of any prior fetch or store. IL expansion will automatically set the must read flag of a fetch whose base symbol has the has volatile writes attribute. |

TABLE 10-continued

Attributes of Data Access Tuples

| Attribute | Meaning |
|---|---|
| Must write | Not used in FETCH tuples. Indicates to the optimizer that the variable being written may be read, through some mechanism not otherwise detectable in the IL, prior to any subsequent fetches, and that this store must therefore be performed, even if no fetches are detectable prior to any subsequent stores. IL expansion will automatically set the must write flag of a store whose base symbol has the has volatile reads attribute. |

TABLE 11

Arithmetic Operators

| Operator | Meaning |
|---|---|
| | Fetch Operators |
| FETCH | Fetches a representational value. |
| FETCHA | Fetches a signed integer with sign extension or an address or unsigned integer with zero extension from a packed array element. |
| FETCHX | Fetches a signed integer with sign extension or an address or unsigned integer with zero extension from a bit field. |
| FETCHZA | Fetches a signed integer with zero extension from a packed array element. |
| FETCHZX | Fetches a signed integer with zero extension from a bit field. |
| | Store Operators |
| STORE | Stores a representational value. |
| STOREA | Stores an integer or address value in a packed array element. |
| STOREX | Stores an integer or address value in a bit field. |
| VSTORE | Stores an arithmetic or address value, and yields the value that was stored. |
| VSTOREA | Stores an integer or address value in a packed array element and yields the value that was stored. |
| VSTOREX | Stores an integer or address value in a bit field, and yields the value that was stored. |
| | Arithmetic Computations |
| ABS | Computes the absolute value of its operand. |
| ADD | Computes the sum of its operands. |
| CADD | Computes the sum of a complex and a real operand. |
| CDIV | Computes the quotient of a complex and a real operand. |
| CEIL | Computes the smallest integer value which is not less than the value of its real operand. |
| CMUL | Computes the product of a complex and a real operand. |
| CONJG | Computes the complex conjugate of its operand. |
| CREVSUB | Computes the difference of a complex and a real operand. |
| CSUB | Computes the difference of a complex and a real operand. |
| DIV | Computes the quotient of its two operands. |
| FLOOR | Computes the largest integer value which is not greater than the value of its real operand. |
| IPWR | Computes its first operand raised to the power of its integer second operand, signalling an error if both operands are zero. |
| IPWRO | Computes its first operand raised to the power of its integer second operand, yielding one if both operands are zero. |
| IPWRZ | Computes its first operand raised to the power of its integer second operand, yielding zero if both operands are zero. |
| MAX | Computes the maximum of its operands. |
| MIN | Computes the minimum of its operands. |
| MOD | Computes the mathematical modulus of its operands (The Ada and PL/I MOD operators). |
| MUL | Computes the product of its operands. |
| NEG | Computes the negative or twos-complement of its operand. |
| PMOD | Computes the mathematical modulus of its operands, where the divisor must be positive (the Pascal MOD operator). |
| PWR | Computes its first operand raised to the power of its second operand, signalling an error if both operands are zero. |
| PWRO | Computes its first operand raised to the power of its second operand, yielding one if both operands are zero. |
| PWRZ | Computes its first operand raised to the power of its second operand, yielding zero if both operands are zero. |
| REM | Computes the remainder of its operands (the FORTRAN MOD function, BLISS MOD operator, C % operator, and Pascal and Ada |

TABLE 11-continued

Arithmetic Operators

| Operator | Meaning |
|---|---|
| | REM operators). |
| ROUND | Rounds the fractional part of a real number to the nearest integer value. |
| SUB | Computes the difference of its operands. |
| TRUNC | Truncates the fractional part of a real number towards zero |

Shifting and Masking

| Operator | Meaning |
|---|---|
| IAND | Computes the bitwise conjunction of two integers. |
| IEQV | Computes the bitwise equivalence of two integers. |
| INOT | Computes the bitwise complement of an integer. |
| IOR | Computes the bitwise disjunction of two integers. |
| IXOR | Computes the bitwise exclusive or of two integers. |
| ROT | Rotates an integer value. |
| SHL | Shifts an integer value left by a positive shift count. |
| SHR | Shifts an integer value right by a positive shift count. |
| SH | Shifts an integer value left or right, depending on the sign of a shift count. |

Mathematical Computations

| Operator | Meaning |
|---|---|
| ACOS | Computes the arc cosine in radians of its operand. |
| ACOSD | Computes the arc cosine in degrees of its operand. |
| ASIN | Computes the arc sine in radians of its operand. |
| ASIND | Computes the arc sine in degrees of its operand. |
| ATAN | Computes the arc tangent in radians of its operand. |
| ATAND | Computes the arc tangent in degrees of its operand. |
| ATAN2 | Computes the arc tangent in radians of the ratio of its two operands. |
| ATAND | Computes the arc tangent in degrees of the ratio of its two operands. |
| COS | Computes the cosine of its operand, which is specified in radians. |
| COSD | Computes the cosine of its operand, which is specified in degrees. |
| COSH | Computes the hyperbolic cosine of its operand. |
| EXP | Computes the exponential (e to the power) of its operand. |
| LOG | Computes the base-e logarithm of its operand. |
| LOG2 | Computes the base-2 logarithm of its operand. |
| LOG10 | Computes the base-10 logarithm of its operand. |
| SIN | Computes the sine of its operand, which is specified in radians. |
| SIND | Computes the sine of its operand, which is specified in degrees. |
| SINH | Computes the hyperbolic sine of its operand. |
| SQRT | Computes the squire root of its operand. |
| TAN | Computes the tangent of its operand, which is specified in radians. |
| TAND | Computes the tangent of its operand, which is specified in degrees. |
| TANH | Computes the hyperbolic tangent of its operand. |

Conversions

| Operator | Meaning |
|---|---|
| CAST | Yields the value of an arithmetic type which has the same bit pattern as some value of some other type. |
| CMPLX | Constructs a complex number from two real operands. |
| CVT | Translates a value of one arithmetic type into a value of another arithmetic type. |
| IMAG | Takes the imaginary part of a complex number. |
| REAL | Takes the real part of an imaginary number. |
| ROUND | Converts a real number to an integer value by rounding the fractional part. |
| TRUNC | Converts a real number to an integer value by truncating the fractional part toward zero. |
| XCVT | Converts a value of one integer type to another integer type, discarding excess significant bits in the representation of the converted value. |

Comparisons

| Operator | Meaning |
|---|---|
| EQL | Tests if one arithmetic value is equal to another. |
| GEQ | Tests if one arithmetic value is greater than or equal to another. |
| GTR | Tests if one arithmetic value is greater than another. |
| LSS | Tests if one arithmetic value is less than another. |
| LEQ | Tests if one arithmetic value is less than or equal to another. |
| NEQ | Tests if one arithmetic value is different from another. |

Variable Modification Operators

| Operator | Meaning |
|---|---|
| ADDMOD ADDMODA ADDMODX | Adds some value to the arithmetic value in a memory location. |
| DIVMOD DIVMODA DIVMODX | Divides the arithmetic value in a memory location by some value. |
| IANDMOD | "And"s the integer value in a memory location with some value. |

TABLE 11-continued

Arithmetic Operators

| Operator | Meaning |
|---|---|
| IANDMODA | |
| IANDMODX | |
| IORMOD | "Or"s the integer value in a memory location with some value. |
| IORMODA | |
| IORMODX | |
| IXORMOD | "Exclusive or"s the integer value in a memory location with some value. |
| IXORMODA | |
| IXORMODX | |
| MULMOD | Multiplies the arithmetic value in a memory location by some value. |
| MULMODA | |
| MULMODX | |
| REMMOD | Takes the remainder of the arithmetic value in a memory location with respect to some value. |
| REMMODA | |
| REMMODX | |
| SHLMOD | Shifts the integer value in a memory location left by some value. |
| SHLMODA | |
| SHLMODX | |
| SHRMOD | Shifts the integer value in a memory location right by some value. |
| SHRMODA | |
| SHRMODX | |
| SUBMOD | Subtracts some value from the arithmetic value in a memory location. |
| SUBMODA | |
| SUBMODX | |

Increment Operators

| Operator | Meaning |
|---|---|
| POSTINCR | Fetches a representational value from a variable, from a packed array element, or from a bit field, adds a compile-time constant increment to it, stores the result back into memory, and yields the initial (unincremented) value. |
| POSTINCRA | |
| POSTINCRX | |
| PREINCR | Fetches a representational value from a variable, from a packed array element, or from a bit field, adds a compile-time constant increment to it, stores the result back into memory, and yields the incremented value. |
| PREINCRA | |
| PREINCRX | |

TABLE 12

Character and Bit String Operators

| Operator | Meaning |
|---|---|
| | Fetch Operators |
| FETCHF | Fetches a character or bit strip with a specified length. |
| FETCHS | Fetches a character or bit substring, that is, a string with a specified length and specified character or bit offset from a base address. |
| FETCHV | Fetches a varying length character string, that is, one whose length is in the work preceding the text of the string. |
| FETCHZ | Fetches a null-terminated character string. |
| | Store Operators |
| STOREF | Stores a character or bit string. |
| STORES | Stores a character or bit substring, that is, stores a string with a specified length at a specified character or bit offset from a base address. |
| STOREV | Stores a varying length character string, that is, stores the text if the string following a word containing the length of the string. |
| STOREZ | Stores a null-terminated character string, that is, stores the text of the string followed by a null character (all zero bits). |
| | String Manipulations |
| CONCAT | Computes a string consisting of all the elements of one string followed by all the elements of another string. |
| FILL | Creates a copy of a character string, padded to a specified length with copies of a specified character. |
| REPLICATE | Creates the string which is the concatenation of a specified number of copies of another string. |
| SUBSTR | Extracts a substring from a specified string with a specified starting position and length. |
| TRANSLATE | Creates a copy of one character string, using another character string as a translation table. |

TABLE 12-continued

Character and Bit String Operators

| Operator | Meaning |
|---|---|
| Bit String Logical Operators | |
| BAND | Computes the bitwise conjunction ("set intersection") of two bit strings. |
| BDIFF | Computes the bitwise difference ("set subtraction") of two bit strings. |
| BEQV | Computes the bitwise equivalence of two bit strings. |
| BNOT | Computes the bitwise negation ("set complement") of a bit string. |
| BOR | Computes the bitwise disjunction ("set union") of two bit strings. |
| BXOR | Computes the bitwise exclusive or ("set difference") of two bit strings. |
| Conversions | |
| ELEMENT | Extracts a single element from a character or bit string and yields it as a CHAR or as an IMAX zero or one. |
| SCAST | Yields the string with the same bit pattern as some other value. |
| USTRING | Creates a string consisting of a single character. |
| Position and Size Functions | |
| INDEX | Computes the location of the first occurrence of one character string within another. |
| LENGTH | Computes the length of a string. |
| PINDEX | Computes the location of the first occurrence of one string within another, but yields −1 if both strings are empty. |
| PSEARCH | Computes the location of the first character in one character string that is also found in another character string, but yields −1 if both strings are empty. |
| PVERIFY | Computes the location of the first character in one character string that is not also found in another character string, but yields −1 if both strings are empty. |
| SEARCH | Computes the location of the first character in one character string that is also found in another character string. |
| VERIFY | Computes the location of the first character in one character string that is not also found in another character string. |
| Unpadded Comparisons | |
| EQL | Tests if one string is equal to another. |
| GEQ | Tests if one string is greater than or equal to another. |
| GTR | Tests if one string is greater than another. |
| LEQ | Tests if one string is less than or equal to another. |
| LSS | Tests if one string is less than another. |
| NEQ | Tests if one string is different from another. |
| Padded Comparisons | |
| EQLP | Tests if one padded string is equal to another. |
| GEQP | Tests if one padded string is greater than or equal to another. |
| GTRP | Tests if one padded string is greater than or equal to another. |
| LEQP | Tests if one padded string is less than or equal to another. |
| LSSP | Tests if one padded string is less than another. |
| NEQP | Tests if one padded string is different from another. |
| Set Constructors | |
| BRANGE | Creates a new bit string by setting a contiguous sequence of bits to one in an existing bit string. |
| BSINGLE | Creates a new bit string by setting a single bit to one in an existing bit string. |
| ZEROBITS | Creates a bit string of a specified number of zero bits. |
| Set Predicates | |
| MEMBER | Tests whether a bit string has a one bit at a specified index. |
| SUPERSET | Tests whether every one bit in a bit string is also a one bit in another bit string. |
| SUBSET | Tests whether every one bit in a bit string is also a one bit in another bit string. |

TABLE 13

Boolean Operators

| Operator | Meanings |
|---|---|

Predicates

| | |
|---|---|
| LBSET | Tests whether the least significant bit of an integer value is set |
| NONZERO | Tests whether an integer value is nonzero. |

Representation

| | |
|---|---|
| ALLBITS | Yields an integer - 1 (or its unsigned equivalent) for true or 0 for false. |
| LSBIT | Yields an integer 1 for true or 0 for false. |

Relations

| | |
|---|---|
| EQL | Tests is one scalar or string value is equal to another. |
| EQLBLK | Tests if two blocks of bytes in memory are the same. |
| EQLP | Tests if one padded string is equal to another. |
| GEQ | Tests if one scalar or string value is grater than or equal to another. |
| GEQP | Tests if one padded string is greater than or equal to another. |
| GTR | Tests if one scalar or string value is greater than another. |
| GTRP | Tests if one padded string is greater than another. |
| LEQ | Tests if one scalar or string value is less than or equal to another. |
| LEQP | Tests if one padded string is less than or equal to another. |
| LSS | Tests if one scalar or string value is less than another. |
| LSSP | Tests if one padded string is less than another. |
| MEMBER | Tests whether a bit string has a one bit at a specified index. |
| NEQ | Tests if one scalar or string value is different from another. |
| NEQBLK | Tests if two blocks of bytes in memory are different from one another. |
| NEQP | Tests if one padded string is different from another. |
| SUPERSET | Tests whether every one bit in a bit string is also a one bit in another bit string. |
| SUBSET | Tests whether every one bit in a bit string is also a one bit in another bit string. |

Logical Functions

| | |
|---|---|
| LAND | Computes the logical conjunction of two Boolean values. |
| LANDC | Computes the logical conjunction of two Boolean values, "short-circuiting" evaluation of the second operand if the first is false. |
| LANDU | Computes the logical conjunction of two Boolean values, guaranteeing that both operands will be evaluated. |
| LEQV | Computes the logical equivalence of two Boolean values. |
| LNOT | Computes the logical complement of a Boolean value. |
| LOR | Computes the logical disjunction of two Boolean values. |
| LORC | Computes the logical disjunction of two Boolean values, "short-circuiting" evaluation of the second operand if the first is true. |
| LORU | Computes the logical disjunction of two Boolean values, guaranteeing that both operands will be evaluated. |
| LXOR | Computes the logical exclusive or of two Boolean values. |

Conditional Expressions

| | |
|---|---|
| SEL | Selects one of two values, depending on a Boolean selector. |
| SELC | Evaluates one of two expressions, depending on a Boolean selector. |
| SELU | Selects one of two values, depending on a Boolean selector, but guarantees that both operands will be evaluated. |

Operand Delimiter

| | |
|---|---|
| FLOWMARK | Marks the beginning of the tuple sequence for an operand of a LAND, LOR, SEL, LANDC, LORC, or SELC tuple. |

Flow Control

| | |
|---|---|
| ASSERT | Signals an exception condition if a Boolean value is false. |
| BRCOND | Branches to one of two destinations depending on a Boolean value. |

TABLE 14

Checking Operators

| Operator | Meaning |
|---|---|
| ASSERT | Signals an exception if a Boolean value is false. |
| CHKEQL | Signals an exception if two values are not equal. |
| CHKGEQ | Signals an exception if one value is less than another. |
| CHKGTR | Signals an exception if one value is less than or equal to another. |
| CHKLENEQL | Signals an exception if the length of a string is not equal to a specified integer. |
| CHKLENGTR | Signals an exception if the length of a string is less than |

TABLE 14-continued

Checking Operators

| Operator | Meaning |
|---|---|
| | or equal to a specified integer. |
| CHKLENLSS | Signals an exception if the length of a string is greater than or equal to a specified integer. |
| CHKLEQ | Signals an exception if one value is greater than another. |
| CHKLSS | Signals an exception if one value is greater than or equal to another. |
| CHKNEQ | Signals an exception if one value is equal to another. |
| CHKRANGE | Signals an exception if one value does not fall in the inclusive range bounded by two other values. |
| SIGNALS | Unconditionally signals an exception. |

TABLE 15

Flow Control Operators

| Operator | Meaning |
|---|---|
| | Branch Targets |
| BEGIN | Marks the beginning of the ILG for a routine. |
| ENTRY | Represents an entry point of a routine. |
| LABEL | Represents a branch target. |
| VLABEL | Represents a virtual basic block. |
| HANDLER | TBS. |
| | Branches |
| BRANCH | Branches unconditionally to a specified destination. |
| BRARITH | Branches to one of three destinations, depending on whether an arithmetic value is neagative, zero, or positive. |
| BRCOND | Branches to one of two destinations, depending on whether a Boolean value is true or fale. |
| BRSEL | Chooses the destination whose low test and high test constants enclose the value of an integer selector. |
| ENTRYPTR | Relates a routine's BEGIN tuple to its ENTRY tuples. |
| ESTLABEL | TBS. |
| ESTENTRY | TBS. |
| VBRANCH | Relates a VLABEL to a set of actual possible destinations in a virtual basic block. |
| | Indirect Branches |
| JUMP | Transfers control through a "bound label variable," which may involve restoring the context of an outer routine. |
| JUMPLOCAL | Transfers control to a sepcified address, which is assumed to be the address of a label in the current routine. |
| | Flow Termination |
| JUMPSYMBOL | Does a non-local goto to a specified label symbol in a routine that contains the current routine. |
| RETURN | Terminates the current routine and returns control to the return that called it, immediately following the call. |
| STOP | Terminates the current routine and returns control to the return that called it. Also informs GEM that this routine will never be called again (i.e., that this return terminates program execution. |

TABLE 16

Parameter Symbol Flags That Affect The Choice Between Copy And Bind Semantics

| Flag | Meaning |
|---|---|
| Must bind | Requires that the parameter be implemented with bind semantics. If must bind is specified, then the other flags listed below are ignored. |
| Conceal alias | Indicates that alias effects must not occur. Basically, this |

TABLE 16-continued

Parameter Symbol Flags That Affect The Choice Between Copy And Bind Semantics

| Flag | Meaning |
|---|---|
| | effects requires that the parameter be implemented with copy semantics. |
| Expose alias effects | Indicates that alias effects must be visible. Basically, this requires that the parameter be implemented with bind semantics. If neither conceal alias effects nor expose alias effects is specified, then GEM need not worry about alias effects. (It will probably use copy semantics for scalar parameters and bind semantics for aggregate parameters.) It is an error for the front end to set both of these flags. |
| Input | Indicates that the calling routine may have initialized the actual storage location prior to the call. If copy semantics are used for this routine, then the actual storage location must be copied to the local storage area at routine entry. |
| Output | If this flag is set, then the calling routine expects the actual storage location to contain the final value of the parameter upon return from the call. ff it is not set, then the calling routine expects the actual storage location to be unaffected by the call. If the output flag is false, then the parameter must have copy semantics. If it is true and copy semantics are used, then the local storage location must be copied to the actual storage location before the routine returns. |

TABLE 17

Settings of Parameter Semantic Flags For Various Source Languages

| Language Semantics | Expose/Conceal Alias Effects | Input/Output |
|---|---|---|
| BLISS parameters | Don't care | Input |
| C parameters | Don't care | Input |
| Standard FORTRAN parameters | Don't care | Input/Output |
| (Old) VAX FORTRAN parameters | Expose | Input/Output |
| Pascal value parameters | Conceal | Input |
| Pascal VAR parameters | Expose | Input/Output |
| Ada atomic parameters | Conceal | see Note |
| Ada aggregate parameters | Don't care | see Note |
| PL/I parameters | Expose | Input/Output |

Note: As specified by the IN, OUT, or IN OUT modifiers in the parameter specification in the Ada routine declaration.

TABLE 18

The GEM$MECHANISM Enumerated Type

| Constant | Meaning |
|---|---|
| Value | The caller passes the value of the argument. The actual storage location is the entry in the parameter list. |
| Reference | The caller passes the address of some storage location. The actual storage location is the storage location whose address was passed in the parameter list. Reference parameters have a length parameter field, which may be defined to point to another parameter symbol in the same routine. This other parameter, which must have data type IMAX and the value mechanism, is assumed to receive the actual length of the reference parameter, whose unknown size flag will presumably be set. (This combination of a storage location passed by reference and an associated length passed by value is sometimes referred to as an "address and length" mechanism.) |
| String | The caller passes the address of a data structure containing the address and length of a character or bit string (the maximum length, for a varying character string). The storage location associated with the parameter symbol |

TABLE 18-continued

The GEM$MECHANISM Enumerated Type

| Constant | Meaning |
|---|---|
| | is the contents of the base address field in the descriptor data structure. |
| Array | The caller passes the address of a data structure describing a character or bit string as a one-dimensional array or bit array. The storage location associated with the parameter symbol is the contents of the base address field in the descriptor data structure. |
| General | The caller passes the address of a data structure containing the address of some storage location. The storage location associated with the parameter symbol is the contents of the base address field in the descriptor data structure. The front end is responsible for generating code in the caller to fill in all fields of the descriptor data structure other than its base address field, and for generating code in the called routine to interpret those fields. The called routine gets the address of the descriptor using the DESCADDR tuple. |

TABLE 19

Dynamic String Return Mechanisms

| Mechanism | Description |
|---|---|
| Fixed Buffer | The caller allocates a fixed size buffer and passes a descriptor for it. The called routine copies as much of the aggregate as will fit into the buffer, and then returns the original length of the aggregate. The caller can compare the original length to the buffer length to determine whether the return value has been truncated. (This is equivalent to the fixed-size mechanism described above, with an extra return value for the length.) |
| Stack | The caller passes the address of a descriptor. The called routine leaves the aggregate on the stack (beyond the call frame of its caller), leaves the stack pointer pointing past the aggregate, and fills in the descriptor to specify the address and length of the aggregate. |
| Dynamic string | The caller passes a descriptor for a heap-allocated string (a dynamic string descriptor). The called routine either overwrites the string pointed to by the descriptor or deallocates that string, allocates another one, and updates the descriptor. |

TABLE 20

Attributes of Argument Tuples

| Attribute | Meaning |
|---|---|
| Pass by register | Indicates whether the argument is to be passed in a particular register or in the location determined by the system calling standard for the particular architecture. If it is true, the argument should be passed in the register whose identifier (from the GEN$TS_REG enumerated type) is in the arg location field. If it is false, then arg location is simply a 1-origin index among all the non-register arguments of this call, and GEM will determine the appropriate "standard" argument location. (GEM may override the argument location specified by arg location and pass by register if it has both the calling and called routines available to it, so that it can do the necessary analysis.) |
| Special register | May be true only if pass by register is also true, in which case it indicates that GEM must use the specified register. |
| Arg location2 | Relevant only if mechanism is reference, in which case these fields specify the argument location where the argument's length should be passed by value. The length will not be passed in arg location2 is 0. |
| Pass by register2 | |
| Parm is | A flag which, if true, indicates that GEM should assume that |
| read | the called routine might examine the contents of the actual argument location which is passed to it. (This is meaningful only if mechanism is not value.) |
| Parm is written | A flag which, if true, indicates that GEM should assume that the called routine might modify the contents of the actual argument location which is passed to it. (This is meaningful only if mechanism is not value.) |
| Desc size | Meaningful only if mechanism is general, in which case it is the size of the descriptor that will be allocated to pass the argument. |
| Offset | Used only in the various ARGADR tuples, where it specifies the offset of the actual argument address from the tuple's address operand. |
| Effects | Used only in the various ARGADR tuples, where it characterizes the "read" side effects resulting from passing the argument. |
| Effects2 | Used only in the various ARGADR tuples, where it characterizes the "write" side effects resulting from passing the argument. |
| Base Symbol | Used only in the various ARGADR tuples, where it is a pointer to the symbol node for the variable whose address is being passed, if one is known. |

TABLE 21

Routine Call, Argument Passing, and Value Return Operators

| Operator | Meaning |
|---|---|
| | Call Initialization |
| INITCALL | Marks the beginning of the IL for a routine call, and causes allocation of its argument list. |
| | Passing a Value |
| ARGVAL | Passes a representational value as an argument. |
| ARGVALA | Passes a character or bit string value with a specified length. |
| | Passing an Address |
| ARGADR | Passes the address of a storage location containing a representational value. |
| ARGADRA | Passes the address of a storage location containing a character or bit string of a specified length. |
| ARGADRS | Passes a substring of the bit or character string in the storage location at a specified address. |
| | Allocating and Passing a Temporary |
| ARGTMP | Allocates space for a scalar value and passes its address. |
| ARGTMPA | Allocates space for a character or bit string of a specified size and passes its address. |
| | Creating a Dynamic Return Value Descriptor |
| ARGBUF | Allocates space for a bit or character string of a specified size and passes a descriptor requiring that a value be returned in it with the fixed buffer dynamic return mechanism. |
| ARGDYN | Passes a descriptor requiring that a character or bit string be returned with the stack dynamic return mechanism. |
| ARGSTK | Passes a dynamic string descriptor requiring that a bit or character string be returned with the dynamic string or stack dynamic return mechanism. |
| | Passing Arguments in a Block |
| ARGBLOCK | Allocates space for a block of a specified size and passes its address. |
| BLKFIELD | Stores a scalar value into a field of a previously allocated argument block. |
| ARGDEFINES | Describes the side effects which are attributable to passing an argument through an argument block. |

TABLE 21-continued

Routine Call, Argument Passing, and Value Return Operators

| Operator | Meaning |
|---|---|
| | *Filling in a General Descriptor* |
| DSCFIELD | Stores an address or integer value into a field of a previously allocated general descriptor. |
| | *Calling a Routine* |
| CALL | Calls the routine at a specified address. |
| | *Retrieving a Return Value* |
| RESULTBUF | Retrieves a character or bit string value which has been returned in the temporary which was allocated with an ARGBUF tuple, and whose length has been returned in a specified register. |
| RESULTDYN | Yields a dynamic string descriptor for the character or bit string which has been returned in response to an ARGDYN tuple. |
| RESULTREG | Retrieves a scalar result value from a specified register. |
| RESULTSTK | Retrieves a character or bit string value which has been returned on the stack in response to an ARGSTK tuple. |
| RESULTTMP | Retrieves a result value from a temporary which was allocated with an ARGTMP or ARGTMPA tuple. |
| | *Returning a Value From a Routine* |
| RETURNDYN | Returns a character or bit string value by the whatever dynamic return mechanism was specified in the descriptor passed by the caller. |
| RETURNREG | Returns a scalar value in a specified register. |
| RETURNSTK | Returns a character or bit string value by the fixed buffer dynamic return mechanism if the caller passed a fixed buffer descriptor, or by the stack dynamic return mechanism if the caller passed a stack or dynamic string descriptor. |
| | *Miscellaneous Parameter Access* |
| DESCADDR | Yields the address of the descriptor that was allocated to pass a general mechanism parameter. |
| SIZE | Yields the actual size of an unknown size parameter. |

APPENDIX

Interpreter Control Actions

The following actions control the execution flow of the actions interpreter.

ACTIONS(<result-var-list>; <temporary-var-list) marks the beginning of the action sequence of a template. This must be the first action in the template since it allocates the operand variables. The contents of both var-lists is a comma separated sequence of identifers used to name the operand variables during rest of the template. Either of these var-lists may be empty if the template does not use either result operands or temporary operands.

The identifiers in the result-var-list are the names of the result operands. ILG nodes in void context have 0 result operands while most other expressions have 1 result operand. Exceptions include string results which require two or three operands (one to address the string body, one for the string length and one to hold the string body) and complex results which require two operands (one for the real component and another for the imaginary component).

DELAY marks the end of the undelayed actions and the beginning of the delayed actions. When the DELAY action is interpreted, processing of the current template is suspended until the corresponding ILG subtree is used as a leaf of a parent subtree. When the template of the parent subtree undelays the corresponding leaf, interpretation will continue with the actions following the DELAY action.

EXIT terminates interpretation of the action sequence. Interpreting an EXIT action causes the result operands to be returned, causes the remaining operand variables and local TNs to be released, and causes interpretation to resume with the template that UNDELAYed this action sequence.

END_ACTIONS marks the end of an action sequence. This is not truly an action since it is not interpreted. The END_ACTIONS operation must be the lexically last component of the action sequence. The operation marks the end of the scope of the operand identifiers declared in the ACTIONS operation.

UNDELAY(leaf,opr1,opr2,...) causes the delayed context actions of the specified pattern "leaf" to be processed. The result operands of the leaf are copied into operand variables "opr1", "opr2", etc. The number of copied operands must match the number of result operands in the template of the leaf.

LABEL(name) causes "name" to label the current position in the action sequence.

GOTO(name) causes the interpreter to branch and continue processing at the action following the label specified by "name".

TN Allocation And Lifetime Actions

INCREMENT_LON() increments the Linear Order Number clock variable that is used to determine the lifetimes of TNs.

USE(operand) causes the specified operand variable to be referenced. This action is used to mark the last place in a template where an operand is used and causes lifetimes to be extended appropriately.

ALLOCATE_PERMANENT(operand, size) causes a permanent class TN of "size" bytes to be created and referenced by the specified "operand" variable. If the "size" parameter is missing then the size of the TN is determined by the result data type of the current template. This action only creates a TN during the CONTEXT pass. See the SAVE_TN action for a description of how this TN is accessed during the TNBIND and CODE passes.

ALLOCATE_DELAYED(operand, size) causes a delayed class TN of "size" bytes to be created and referenced by the specified "operand" variable. If the "size" parameter is missing then the size of the TN is determined by the result data type of the current template. This action creates a TN during each of the CONTEXT, TNBIND and CODE passes. This action may not be performed while interpreting the undelayed actions. The lifetime of this TN terminates when the result using this TN is used.

ALLOCATE_LOCAL(operand, size) causes a local class TN of "size" bytes to be created and referenced by the specified "operand" variable. If the "size" parameter is missing then the size of the TN is determined by the result data type of the current template. This action creates a TN during each of the CONTEXT, TNBIND and CODE passes. The lifetime of this TN must terminate in the same template as its creation.

FORCE_REGISTER(operand) causes the TN specified in the "operand" variable to be marked as must not be in memory. This usually means allocation to a register unless no register is available in which case the TN is not allocated.

FORCE_MEMORY(operand) causes the TN specified in the "operand" variable to be marked as must not be in a register. This usually guarantees allocation to a stack location.

MUST_ALLOCATE(operand) causes the TN specified in the "operand" variable to be marked as must be allocated.

Note: It is an error to do all three of FORCE_REGISTER, FORCE_MEMORY and MUST_ALLOCATE on the same TN as these three conditions are contradictory and cannot be all fulfilled.

PREFERENCE(operand1,operand2) if "operand1" is allocated to a register then "operand2" is allocated to the same register; otherwise, "operand2" is allocated independently of "operand1". Forcing "operand2" to the same register as "operand1" occurs even if "operand1" and "operand2" have conflicting lifetimes. (See the MOVE_VALUE action for "advisory" preferencing as opposed to the "manditory" preferencing of the PREFERENCE action).

INCREMENT_COST(number,operand) inceases the cost of nonallocation of the TN specified by "operand" by the amount "number".

RESERVE_R0(number) cause "number" of consecutive registers to be reserved starting with register 0.

TEST_MEMORY(operand,label) tests the TN referenced by the specified "operand" variable. If the TN is in memory then the action interpreter branches to the specified "label" During the CONTEXT and TNBIND passes this action assumes that unallocated TNs are not in memory unless they have had a FORCE_MEMORY done on them.

TEST_REGISTER(operand,label) tests the TN referenced by the specified "operand" variable. If the TN is in a register then the action interpreter branches to the specified "label" During the CONTEXT and TNBIND passes this action assumes that unallocated TNs are in registers unless a FORCE_MEMORY has been done on the TN.

ILG Load And Save Actions

LOAD_LITERAL(node,operand) loads the literal value of the specified "node" matched by the template pattern into the specified "operand" variable. It is an error if "node" is not a LITREF.

SAVE_TN(operand,node,field) saves a reference to the permanent class TN specified by the "operand" variable. During the CONTEXT pass the TN pointer is saved in component "field" of the ILG tuple matched by the specified "node" of the template. During the TNBIND and CODE passes this information is fetched from the specified "field" of the specified "node". Every permanent class TN must be saved during the CONTEXT pass in an appropriate ILG field so that the same TN can be located during the TNBIND and CODE passes. Delayed class and local class TNs are recreated each pass so they must never be saved.

SAVE_OPERAND(operand,node,field_reg,field_base) saves the location of the specified "operand" variable. The information is saved in the ILG tuple matched by the specified "node" of the template. A register value is saved in component "field_reg". Certain register values encode that no allocation ocurred or that the operand is allocated on the stack instead of a register. If an operand is allocated to the stack, the stack offset is saved in the component of "node" specified by "field_base"

SAVE_REGISTER(operand,node,field) saves the register number of the specified "operand" in the specified "field" of the specified "node" matched by the template pattern. This set of register numbers includes an encoding that no register was allocated. An error occurs if the specified operand is allocated to a memory location.

Code Emitting Actions

MOVE_VALUE(opr_src,opr_dst) generates the code to move a value from the "opr_src" operand to the "opr_dst" operand. No code is generated if opr_src and opr_dst are identical and this action is a hint to the allocator to make them identical.

EMIT(opcode,operand1,operand2,...) outputs an object instruction consisting of the specified "opcode" and using the specified operand variables as address modes of the instruction.

MAKE_ADDRESS_MODE(opr_offset,opr_base,opr_index,opr_result) makes a new operand in variable "opr_result". This is a VAX specific action that uses "opr_offset" as the offset, "opr_base" as the base register, and "opr_index" as the index register in order to create a VAX address mode. If "opr_offset" is missing then zero is assumed. If "opr_offset" specifies a memory location then "opr_base" must be missing. If "opr_base" specifies a memory location then "opr_offset" must specify zero and "opr_index" must be missing.

LOAD_CONSTANT(number,operand) makes a new address mode in "operand" representing the specified literal "number". Note that "number" is the literal value not a node matched by the pattern. Instead use LOAD_LITERAL to create an address mode that contains the value of a LITREF ILG node.

EXAMPLES

There are several examples here including very simple addition templates and very complicated addressing templates. These should give examples of both easy and difficult to write templates.

The result value mode of a template and the set of value modes of pattern match leaves use a data type characteristic of the target architecture. These value modes are an enumeration of the different ways a value may be encoded. This enumeration names the various ways expression values may be encoded in the virtual machine.

Examples for the VAX:

```
RV (Register Value).
MV (Memory Value without indirection and without indexing).
MVIND (Memory Value with indirection but without indexing).
MV1 (Memory Value with byte context).
MV2 (Memory Value with word context).
MV4 (Memory Value with long context).
MV8 (Memory Value with quad context).
MV16 (Memory Value with octa context).
AM (Address Mode without indirection and without indexing).
AMIND (Address Mode with indirection but without indexing).
AMINX1 (Address mode with byte indexing).
AMINX2 (Address mode with word indexing).
AMINX4 (Address mode with long indexing).
AMINX8 (Address mode with quad indexing).
AMINX16 (Address mode with octa indexing).
PCFLOW (Flow bool represented by jump to false label or true label).
STRINGV (String value encoded as a length and a memory address).
VARYV (Varying string value encoded as address of length word).
VOID (There is no value--used on an operation with only side-effects).
```

Simple ADDL3 On A VAX

Result value mode: RV

Pattern tree:

```
0:      ADD,INT32       1,2
1:      LEAF {RV,MV,MVIND,MV4}
2:      LEAF {RV,MV,MVIND,MV4}
```

Pattern tests:

none

Cost: 2

Actions:

Actions(result; leaf1, leaf2);

! "result" is the result temporary
    ! "leaf1" is LEAF 1: (the left operand)
    ! "leaf2" is LEAF 2: (the right operand)

Undelay(1,leaf1);
    Undelay(2,leaf2);
    Use(leaf1);
    Use(leaf2);
    Increment_LON;
    Allocate_Permanent(result);
    Save_TN(result,0,ILG_TN);
    Emit(ADDL3,leaf1,leaf2,result);
    Delay;
    Exit;
    End_Actions;

Note: the heuristics used in the register allocator guarantee a high probability that the result operand will be allocated identically to one of operand 1 or operand 2. Such an allocation will result in an ADDL2 instruction instead of ADDL3.

Simple SUBL3 On A VAX

Result value mode: RV

Pattern tree:

```
0:      SUB,INT32       1,2
1:      LEAF  {RV,MV,MVIND,MV4}
2:      LEAF  {RV,MV,MVIND,MV4}
```

Pattern tests:

none

Cost: 2

Actions:

Actions(result; leaf1, leaf2);

! "result" is the result temporary

```
        ! "leaf1" is LEAF 1: (the left operand)
        ! "leaf2" is LEAF 2: (the right operand)

Undelay(1,leaf1);
        Undelay(2,leaf2);
        Use(leaf2);
        Increment_LON;
        Use(leaf1);
        Allocate_Permanent(result);
        Save_TN(result,0,ILG_TN);
        Emit(SUBL3,leaf2,leaf1,result);
        Delay;
        Exit;
        End_Actions;
```

Note: Incrementing the LON after using operand 2 but before using operand 1 increases the probability that the heuristics of the register allocator will give operand 1 and the result operand the same allocation which will lead to a SUBL2 instruction instead of SUBL3.

Byte Indexed Address Mode On A VAX

This template generates the k(base_reg)[index_reg] address mode to do addition. The template follows the VAX FORTRAN conventions in that choosing this template guarantees that registers will be used to hold the two operands.

Result value mode: AMINX1

Pattern tree:

```
0:      ADD,INT32       1,2
1:      LITREF,INT32
2:      ADD,INT32       3,4
3:      LEAF {RV}
4:      LEAF {RV}
```

Pattern tests:

```
        NO_OVERFLOW(0);
        NO_OVERFLOW(2);
```

Cost: 1

Actions:

```
        Action(result; index_reg, base_reg, leaf4, leaf3, lit);

! "result" is result address mode lit(base_reg)[index_reg]
```

```
! "index_reg" is the index scratch register
! "base_reg" is the base scratch register
! "leaf4" is LEAF 4: (index leaf)
! "leaf3" is LEAF 3: (base leaf)
! "lit" is LITREF 1:

Delay;

! Force LEAF 4: into a register
!
Undelay(4,leaf4);
Allocate_Delayed(index_reg);
Force_Register(index_reg);
Must_Allocate(index_reg);
Preference(leaf4,index_reg);
Save_Register(index_reg,0,ILG_Index_Reg);
Move_Value(leaf4,index_reg);
Use(leaf4);

! Force LEAF 3: into a register
!
Undelay(3,leaf3);
Allocate_Delayed(base_reg);
Force_Register(base_reg);
Must_Allocate(base_reg);
Preference(leaf3,base_reg);
Save_Register(base_reg,0,ILG_Base_Reg);
Move_Value(leaf3,base_reg);
Use(leaf3);

! Generate address mode  "lit(leaf3)[leaf4]"
!
Load_Literal(1,lit);
Make_Address_Mode(lit,base_reg,index_reg,result);
Increment_LON;
EXIT;
End_Actions;
```

Note that the 7 actions forcing a LEAF into a register will probably be a common operation on a VAX. As a result there will be a "macro" action that has the effect of combining these 7 actions.

Using MOVA For Addition On PRISM Revision 0.0

Result value mode: RV

Pattern tree:

```
0:      ADD,INT64      1,2
1:      LITREF,INT64
2:      LEAF {RV}
```

Pattern tests:

Lit_14_Bit(1);   ! Succeeds if the literal fits in 14 bits

Cost: 1

Actions:

Actions(result; leaf2, reg2, reg_result, lit);

! "result" is result temporary
       ! "leaf2" describes Leaf 2:
       ! "reg2" is a scratch register for holding Leaf 2:
       ! "reg_result" is a scratch register for computing result
       ! "lit" is Literal 1:

```
Undelay(2,leaf2);
Allocate_Local(reg2);
Force_Register(reg2);
Must_Allocate(reg2);
Save_Register(reg2,0,ILG_reg_0);
Move_Value(leaf2,reg2);
Use(leaf2);
Use(reg2);
Allocate_Local(reg_result);
Force_Register(reg_result);
Must_Allocate(reg_result);
Save_Register(reg_result,0,ILG_reg_temp);
Use(reg_result);
Increment_LON;
Allocate_Local(result);
Save_TN(result,0,ILG_TN);
Load_literal(1,lit);
Emit(MOVA_Move_Format,lit,reg2,reg_result);
Move_Value(reg_result,result);
Delay;
Exit;
End_Actions;
```

Note: the heurestics of the register allocator guarantee that leaf2 and reg2 have a high probability of getting the same register. Also, result and reg_result will most likely get the same register.

9

Long Context Indexing On VAX

This template generates the k(leaf3)[leaf6] address mode to do multiplication by 4 followed by addition. The template follows the VAX PASCAL conventions in that choosing this template does not guarantee that registers will be avilable to hold the two operands. If registers are not available then the address mode is simulated using memory temporaries.

Result value mode: AMINX4

Pattern tree:

```
0:      ADD,INT32       1,2
1:      LITREF,INT32
2:      ADD,INT32       3,4
3:      LEAF {RV}
4:      MUL,INT32       5,6
5:      LIT,INT32
6:      LEAF {RV}
```

Pattern tests:

```
        NO_OVERFLOW(0);
        NO_OVERFLOW(2);
        NO_OVERFLOW(4);
        LITERAL_4(5);      ! Succeeds if literal value is 4
```

Cost: 1

Actions:

```
    Actions(result; index_reg, base_reg, leaf6, leaf3, lit, temp);

! "result" is the result address mode
    ! "index_reg" is the index scratch register
    ! "base_reg" is the base scratch register
    ! "Leaf6" is LEAF 6: (index leaf)
    ! "leaf3" is LEAF 3: (base leaf)
    ! "lit" is LITREF 1:
    ! "temp" is literal #2 (No_Index case)
    !        or is (leaf3)[index_reg]
    !                       (Index_Has_Reg_Temp case)

Delay;
    Load_Literal(1,lit);
    Undelay(6,leaf6);
    Undelay(3,leaf3);
    Allocate_Delayed(index_reg);
    Increment_Cost(3,index_reg);
    Preference(leaf6,index_reg);
```

```
        Allocate_Delayed(base_reg);
        Preference(leaf3,base_reg);
        Increment_LON;
        Test_Memory(index_reg,No_Index);
        Move_Value(leaf6,index_reg);        ! Make sure Index in register
        Test_Memory(base_reg,No_Base);
        Move_Value(leaf3,base_reg);         ! Make sure Base in register
        Make_Address_Mode(lit,base_reg,index_reg,result);
                                        ! lit5(base2)[index1]
    Exit;

Label(No_Index);                    ! No register index temp
        Load_Constant(2,temp);
        Emit(ASHL,temp,leaf6,index_reg); ! ASHL #2,leaf6,index_mem
        Emit(ADDL2,leaf3,index_reg);     ! ADDL2 leaf3,index_mem
        Emit(ADDL2,lit,index_reg);       ! ADDL2 #lit,index_mem
        Make_Address_Mode(,index_reg,,
                          result);       ! @index_mem
    Exit;

Label(No_Base);                              ! No register base temp
        Test_Memory(leaf3,Index_Has_Reg_Temp);   ! Index is not in temp
        Emit(ADDL3,lit,leaf3,base_reg);          ! ADDL2 #lit,leaf3,base_mem
        Make_Address_Mode(,base_reg,index_reg,
                          result);               ! @base_mem[index_reg]
    Exit;

Label(Index_Has_Reg_Temp);          ! No base reg but index in temp
        Make_Address_Mode(,leaf3,index_reg,temp);
        Emit(MOVAL,temp,index_reg);      ! MOVAL @leaf3[index_reg],index_reg
        Emit(ADDL2,lit,index_reg);       ! ADDL2 #lit,index_reg
        Make_Address_Mode(,index_reg,,
                          result);       ! (index_reg)
    Exit;
End_Actions;
```

APPENDIX

Definition Of Basic Types

The following routines define basic types that correspond to the representational types defined by the GEM IL. GEM_TD_DEF_BASIC_TYPE defines the types nil, address, signed and unsigned integer, float and complex. GEM_TD_DEF_CHAR_TYPE allows the definition of characters defined over a number of base types.

Note that boolean is not considered a basic type. It is suggested that compilers for languages such as Pascal define boolean as an enumeration containing the elements true and false.

```
TYPE_NODE =
        GEM_TD_DEF_BASIC_TYPE(
                DECL_BLK   : in out GEM_BLOCK_NODE,
                LOCATOR    : value,
                TYPE_NAME  : in VS_STR,
                BASIC_TYPE : value)
```

Defines a basic type such as integer or real. DECL_BLK is the block node in which the type is defined. LOCATOR is a GEM or foreign locator. LOCATOR may be the null locator. TYPE_NAME is a varying string describing the type and may be null. BASIC_TYPE is the type being defined and must be an element of the GEM_TYP enumeration. Specifically excluded are the BOOL, BITS, STR8, and STR16 GEM_TYP elements.

```
TYPE_NODE =
        GEM_TD_DEF_CHAR_TYPE(
                DECL_BLK   : in out GEM_BLOCK_NODE,
                LOCATOR    : value,
                TYPE_NAME  : in VS_STR,
                BASIC_TYPE : value)
```

Defines a character as a basic type. For example, a character may be UINT8, INT8, UINT16, UINT32, etc. DECL_BLK is the block node in which the type is defined. LOCATOR is a GEM or foreign locator. LOCATOR may be the null locator. TYPE_NAME is a varying string describing the type and may be null. BASIC_TYPE is the type being defined and determines the size and representation of the character set. It must be an element of the GEM_TYP enumeration and is restricted to the signed and unsigned integers of size 8, 16, and 32 bits.

Definition Of Character And String Aggregates

GEM_TD_DEF_STRING and GEM_TD_DEF_BITSTRING define character and bit aggregates of a given base type.

```
TYPE_NODE =
     GEM_TD_DEF_STRING(
          DECL_BLK       : in_out GEM_BLOCK_NODE,
          LOCATOR        : value,
          TYPE_NAME      : in VS_STR,
          STRING_TYPE    : value,
          CHAR_TYPE      : value,
          STRING_LB      : in GEM_NODE,
          STRING_UB      : in GEM_NODE)
```

Defines a character string of STRING_TYPE. The elements of the string are characters of the ty_  'efined by CHAR_TYPE and the string has a lower and upper  .nds STRING_LB and STRING_UB. The string size (number of elements) is STRING_UB - STRING_LB + 1. A character string of unknown size is indicated by a STRING_UB value less than the STRING_LB value.

DECL_BLK is the block node in which the type is defined. LOCATOR is a GEM or foreign locator. LOCATOR may be the null locator. TYPE_NAME is a varying string describing the type and may be null. STRING_TYPE is the string representation and is defined as being a member of the enumeration GEM_STRING_REPR. CHAR_TYPE is a handle to the type node created for the string's character type returned by a call to GEM_TD_DEF_CHAR_TYPE. null. STRING_UB and STRING_LB are the upper and lower bounds of the string.

```
TYPE_NODE =
     GEM_TD_DEF_BITSTRING(
          DECL_BLK       : in_out GEM_BLOCK_NODE,
          LOCATOR        : value,
          TYPE_NAME      : in VS_STR,
          BITSTRING_LB   : in GEM_LITERAL_NODE,
          BITSTRING_UB   : in GEM_LITERAL_NODE)
```

Defines a bitstring consisting of BITSTRING_UB - BITSTRING_LB + 1 elements. A bitstring of unknown size is indicated by a BITSTRING_UB value less than the BITSTRING_LB value.

DECL_BLK is the block node in which the type is defined. LOCATOR is a GEM or foreign locator. LOCATOR may be the null locator. TYPE_NAME is a varying string describing the type and may be null. BITSTRING_UB and BITSTRING_LB are the upper and lower bounds of the bitstring.

Definition Of Typedefs And Pointers.

GEM_TD_DEF_TYPEDEF supports the definition of a new name or symonym for an existing type. GEM_TD_DEF_POINTER allows the definition of a typed or untyped pointer. GEM_TD_SET_POINTER_TYPE sets the type of a previously specified pointer after the type associated with a pointer has its type information specified to the GEM type definition service.

```
TYPE_NODE =
     GEM_TD_DEF_TYPEDEF(
          DECL_BLK    : in_out GEM_BLOCK_NODE,
          LOCATOR     : value,
          TYPE_NAME   : in VS_STR,
          DEF_TYPE    : value)
```

Define a new type name and associate it with the type represented by the type node DEF_TYPE. DECL_BLK is the block node in which the type is defined. LOCATOR is a GEM or foreign locator. LOCATOR may be the null locator. TYPE_NAME is a varying string describing the type and may be null. DEF_TYPE is a type node created for an existing type definition.

```
TYPE_NODE =
     GEM_TD_DEF_POINTER(
          DECL_BLK      : in_out GEM_BLOCK_NODE,
          LOCATOR       : value,
          TYPE_NAME     : in VS_STR,
          POINTER_TYPE  : value)
```

Define a pointer type. POINTER_TYPE may be a type node for an existing type definition or null indicating an untyped pointer. TYPE_NAME is a varying string describing the type and may be null. LOCATOR is a GEM or foreign locator. LOCATOR may be the null locator. DECL_BLK is the block node in which the type is defined.

```
     GEM_TD_SET_POINTER_TYPE(
          POINTER_TYPE : value,
          NEW_TYPE     : value)
```

For the existing pointer definition created by a call to

GEM_TD_DEF_POINTER, redefine the type associated with the pointer. POINTER_TYPE is a handle to the existing type node defined for a pointer. NEW_TYPE is the handle to a type node created for an existing type definition.

Definition Of Ranges, Enumerations, And Sets

The GEM_TD_DEF_RANGE, GEM_TD_DEF_ENUM, GEM_TD_SET_ENUM_ELEMENT and GEM_TD_DEF_SET define ranges, enumerations, enumeration elements and sets over defined types.

```
TYPE_NODE =
    GEM_TD_DEF_RANGE(
        DECL_BLK        : in out GEM_BLOCK_NODE,
        LOCATOR         : value,
        TYPE_NAME       : in VS_STR,
        RANGE_TYPE      : value,
        RANGE_LOW_VAL   : in GEM_LITERAL_NODE,
        RANGE_HIGH_VAL  : in GEM_LITERAL_NODE)
```

Define a range type. The range is defined by its underlying type, RANGE_TYPE, and the low and high values of the range, as indicated by the literal nodes RANGE_LOW_VAL and RANGE_HIGH_VAL. DECL_BLK is the block node in which the type is defined. LOCATOR is a GEM or foreign locator. LOCATOR may be the null locator. TYPE_NAME is a varying string describing the type and may be null. RANGE_TYPE is a handle to a type node of an existing basic type definition. RANGE_LOW_VAL and RANGE_HIGH_VAL are pointers to literal nodes indicating the low and high values in a range.

```
TYPE_NODE =
    GEM_TD_DEF_ENUM(
        DECL_BLK  : in out GEM_BLOCK_NODE,
        LOCATOR   : value,
        TYPE_NAME : in VS_STR,
        ENUM_TYPE : value)
```

Define an enumeration. The enumeration's elements are defined by calls to the routine GEM_TD_SET_ENUM_ELEMENT. DECL_BLK is the block node in which the type is defined. LOCATOR is a GEM or foreign locator. LOCATOR may be the null locator. ENUM_TYPE is a handle to a type node created for an existing basic type definition.

A front end must apply enumeration elements to the enumeration definition in first to last order.

```
        GEM_TD_SET_ENUM_ELEMENT(
                ENUM_TYPE           : value,'
                LOCATOR             : value,
                ENUM_ELEMENT_NAME   : in VS_STR,
                ENUM_ELEMENT_VALUE  : in GEM_LITERAL_NODE)
```

Define for an enumeration indicated by the type node handle ENUM_TYPE, an element named ENUM_ELEMENT_NAME with a value ENUM_ELEMENT_VALUE. ENUM_TYPE is a handle to an existing type node for an enumeration. LOCATOR is a GEM or foreign locator. LOCATOR may be the null locator. ENUM_ELEMENT_NAME is a varying string defining the enumeration element. ENUM_ELEMENT_VALUE is a literal node defining the element's value.

```
TYPE_NODE =
    GEM_TD_DEF_SET(
            DECL_BLK  : in_out GEM_BLOCK_NODE,
            LOCATOR   : value,
            TYPE_NAME : in VS_STR,
            SET_TYPE  : value)
```

Defines a set of the type defined by the type node handle SET_TYPE. DECL_BLK is the block node in which the type is defined. LOCATOR is a GEM or foreign locator. LOCATOR may be the null locator. TYPE_NAME is a varying string describing the type and may be null. SET_TYPE may be a handle returned by:

o  GEM_TD_DEF_BASIC_TYPE o  GEM_TD_DEF_CHAR_TYPE o  GEM_TD_DEF_ENUM o  GEM_TD_DEF_RANGE o  GEM_TD_TYPEDEF

Definition Of Arrays

The routines GEM_TD_DEF_ARRAY and GEM_TD_SET_ARRAY_BOUNDS may be used to define arrays and the bounds of array dimensions. The bounds of array dimensions may be defined as being fixed, adjustable, or assumed.

```
TYPE_NODE =
    GEM_TD_DEF_ARRAY(
        DECL_BLK             : in out GEM_BLOCK_NODE,
        LOCATOR              : value,
        TYPE_NAME            : in VS_STR,
        ARRAY_ELEMENT_TYPE   : value,
        ARRAY_DIM_COUNT      : value)
```

Define an array of type ARRAY_ELEMENT_TYPE. DECL_BLK is the block node in which the type is declared. LOCATOR is a GEM or foreign locator. LOCATOR may be the null locator. TYPE_NAME is a varying string describing the type and may be null. ARRAY_ELEMENT_TYPE is a handle to the type node defining the type of the array elements. ARRAY_DIM_COUNT in the number of dimensions for the array.

Note that the dimension count is transmitted as a value rather than a literal node.

The bounds of an array's dimensions are specified by means of the GEM_TD_SET_ARRAY_BOUNDS routine.

```
GEM_TD_SET_ARRAY_BOUNDS(
    ARRAY_TYPE       : value,
    LOCATOR          : value,
    ARRAY_DIM        : value,
    DIM_LOW_BOUND    : in GEM_NODE,
    DIM_HIGH_BOUND   : in GEM_NODE,
    DIM_INDEX_TYPE   : value,
    DIM_STRIDE       : in GEM_LITERAL_NODE)
```

For the array type definition, specified by the handle ARRAY_TYPE, set the bounds of the dimension indicated by ARRAY_DIM. LOCATOR is a GEM or foreign locator. LOCATOR may be the null locator. DIM_INDEX_LOW and DIM_INDEX_HIGH define the lower and upper bounds of the dimension. DIM_INDEX_TYPE is a handle to the type node defining the type used to index the array dimension. DIM_STRIDE defines the size, in bytes between succeeding elements of the dimension being defined. ,blank A constant upper or lower bound is specified by a literal node. Nonconstant bounds are indicated by symbol nodes that define the location of bounds values.

Definition Of Structures, Variants And Unions

The following routines are used to define structures, including variants, and unions. A structure, which may have variant components, is defined by calls to the following routines:

o   GEM_TD_DEF_STRUCT o   GEM_TD_SET_STRUCT_ELEMENT o   GEM_TD_DEF_STRUCT_SELECTOR o   GEM_TD_DEF_STRUCT_VARIANT o   GEM_TD_SET_SELECTOR_RANGE o   GEM_TD_SET_SELECTOR_DEFAULT o   GEM_TD_DEF_UNION o   GEM_TD_SET_UNION_MEMBER

```
TYPE_NODE =
      GEM_TD_DEF_STRUCT(
            DECL_BLK        : in_out GEM_BLOCK_NODE,
            LOCATOR         : value,
            TYPE_NAME       : in VS_STR,
            STRUCTURE_SIZE  : in GEM_NODE)
```

Define a structure or record. DECL_BLK is the block node in which the structure is declared. LOCATOR is a GEM or foreign locator. LOCATOR may be the null locator. TYPE_NAME is a varying string describing the type and may be null. STRUCTURE_SIZE is the size of the structure in bytes.

```
      GEM_TD_SET_STRUCT_ELEMENT(
            STRUCT_TYPE       : value,
            VARIANT_PARENT    : value,
            LOCATOR           : value,
            ELEMENT_NAME      : in VS_STR,
            ELEMENT_TYPE      : value,
            ELEMENT_LOC_BYTE  : in GEM_LITERAL_NODE,
            ELEMENT_LOC_BIT   : in GEM_LITERAL_NODE,
            ELEMENT_SIZE      : in GEM_LITERAL_NODE)
```

Define an element of the structure defined by the structure definition handle STRUCT_TYPE. The element is named ELEMENT_NAME and has a type defined by the type node handle ELEMENT_TYPE. VARIANT_PARENT is the immediate parent variant of the element or null if the element does not a member of a variant. LOCATOR is a GEM or foreign locator. LOCATOR may be the null locator. Its location is relative to the root of the structure being defined and is specified by ELEMENT_LOC_BYTE and ELEMENT_LOC_BIT.

The size of the structure element is specified, in bits, by

ELEMENT_SIZE. ELEMENT_SIZE is specified to support definition of the struct elements c1 and c2 in the following C program fragment.

```
typedef struct m1 {
        char c1 : 4;
        char c2 : 4;
};
```

```
TYPE_NODE =
    GEM_TD_DEF_STRUCT_SELECTOR(
            STRUCT_TYPE      : value,
            VARIANT_PARENT   : value,
            LOCATOR          : value,
            ELEMENT_NAME     : in VS_STR,
            ELEMENT_TYPE     : value,
            ELEMENT_LOC_BYTE : in GEM_LITERAL_NODE,
            ELEMENT_LOC_BIT  : in GEM_LITERAL_NODE,
            ELEMENT_SIZE     : in GEM_LITERAL_NODE)
```

Define a selector for variant components of a record. A selector is a structure element which determines the variant of a structure. The selector element is named ELEMENT_NAME and has a type defined by the type node ELEMENT_TYPE. VARIANT_PARENT is the immediate parent variant of the selector element or null if the element does is not a member of a variant. LOCATOR is a GEM or foreign locator. LOCATOR may be the null locator. Its location is relative to the root of the structure being defined and is specified by ELEMENT_LOC_BYTE and ELEMENT_LOC_BIT. The size of the structure element is specified, in bits, by ELEMENT_SIZE.

```
TYPE_NODE =
    GEM_TD_DEF_STRUCT_VARIANT(
            SELECTOR_TYPE : value,
            LOCATOR       : value)
```

Define a variant of a structure. SELECTOR_TYPE is the type node that selects the variant. LOCATOR is a GEM or foreign locator. LOCATOR may be the null locator. The values of the selector that select the variant are specified by the GEM_TD_SET_SELECTOR_RANGE and GEM_TD_SET_SELECTOR_DEFAULT routines.

```
    GEM_TD_SET_SELECTOR_RANGE(
            VARIANT_TYPE : value,
            LOCATOR      : value,
```

```
            RANGE_LOWER_BOUND : in GEM_LITERAL_NODE,
            RANGE_UPPER_BOUND : in GEM_LITERAL_NODE)
```

Define a selector range for the variant VARIANT_TYPE. LOCATOR is a GEM or foreign locator. LOCATOR may be the null locator. When defining a single selector value RANGE_UPPER_BOUND should have the same value as RANGE_LOWER_BOUND. Combinations of selector single and range selectors may be applied to a variant.

```
    GEM_TD_SET_SELECTOR_DEFAULT(
            VARIANT_TYPE : value,
            LOCATOR      : value)
```

Define a variant type VARIANT_TYPE as being the default variant when all of the values of its selector have not been enmerated. LOCATOR is a GEM or foreign locator. LOCATOR may be the null locator. When defining a scalar selector value RANGE_UPPER_BOUND should have the same value as RANGE_LOWER_BOUND. Combinations of selector scalars and ranges may be applied to a variant.

TYPE_NODE =
```
    GEM_TD_DEF_UNION(
            DECL_BLK   : in out GEM_BLOCK_NODE,
            LOCATOR    : value,
            TYPE_NAME  : in VS_STR,
            UNION_SIZE : in GEM_LITERAL_NODE)
```

Define a union. DECL_BLK is the block node in which the structure is declared. TYPE_NAME is a varying string describing the type and may be null. LOCATOR is a GEM or foreign locator. LOCATOR may be the null locator. UNION_SIZE is the size of the structure in bytes. The members of a union are defined by calls to the routine GEM_TD_SET_UNION_MEMBER.

```
    GEM_TD_SET_UNION_MEMBER(
            UNION_TYPE  : value)
            LOCATOR     : value,
            MEMBER_NAME : in VS_STR,
            MEMBER_TYPE : value)
```

Define a member of the union indicated by the type node UNION_TYPE. UNION_TYPE is the type node of the union that contains the member. LOCATOR is a GEM or foreign locator. LOCATOR may be the null locator. MEMBER_NAME is a varying string defining the name of the member. MEMBER_TYPE is the type node of the member being defined.

Definition Of Function And Routine Parameters

TYPE_NODE =
```
    GEM_TD_DEF_FUNCTION_TYPE(
        DECL_BLK       : in out GEM_BLOCK_NODE,
        LOCATOR        : value,
        TYPE_NAME      : in VS_STR,
        FUNCTION_TYPE  : value)
```

Define the type of a procedure parameter as being of the type specified by the type node FUNCTION_TYPE. Note that this in not used to define the type of an entry symbol, rather it describes parameters to routines. DECL_BLK is the block node in which the type is defined. LOCATOR is a GEM or foreign locator. LOCATOR may be the null locator. TYPE_NAME is a varying string describing the type and may be null.

EXAMPLES

The following examples describe a number of types and symbols and the mechanisms that would be used to describe them to GEM. Note that the Pascal type boolean is defined as an enumeration over the GEM type uint32

Examples Of Basic Types

```
main() { int a;
unsigned int ua;
float x;
double xx;
char str[]="Hello, world\n";
    .
    .

TYPINT32   = GEM_TD_DEF_BASIC_TYPE(main_block, locator, 'int',
                                   GEM_TYP_K_INT32);
TYPUINT32  = GEM_TD_DEF_BASIC_TYPE(main_block, locator, 'unsigned int',
                                   GEM_TYP_K_UINT32);
TYPREALF   = GEM_TD_DEF_BASIC_TYPE(main_block, locator, 'float',
                                   GEM_TYP_K_REALF);
TYPREALG   = GEM_TD_DEF_BASIC_TYPE(main_block, locator, 'double',
                                   GEM_TYP_K_REALG);
```

```
TYPCHAR8  = GEM_TD_DEF_CHAR_TYPE(main_block, locator, 'char',
                                 GEM_TYP_K_INT8);
TYPSTRING = GEM_TD_DEF_STRING(
                 main_block, locator,
                 'string',
                 GEM_STRREP_K_ASCIZ,
                 TYPCHAR8,
                 litnode(len(str)) );
```

Example Definition Of Type Boolean

```
procedure bt;

boolean myflag;
    .
    .
TYPUINT32 = GEM_TD_DEF_BASIC_TYPE(bt_block, locator, 'unsigned int',
                                 GEM_TYP_K_UINT32);
TYPBOOL  = GEM_TD_DEF_ENUM(bt_block, locator, 'boolean', TYPEUINT32);

GEM_TD_SET_ENUM_ELEMENT(TYPBOOL, locator, 'false', litnode(val=0) );
    GEM_TD_SET_ENUM_ELEMENT(TYPBOOL, locator, 'true',  litnode(val=1) );
```

Examples Of Character And Bit Aggregates

```
routine testit(parm1, ...) = begin own status   : bitvector[15],
    flagbits : bitvector[8];

bind dbits = .parm1 : bitvector[];
    .
    .
end;

TYPBITS1 = GEM_TD_DEF_BITSTRING(testit_block, locator, 'bitvector',
                               litnode(val=0), litnode(val=14) );

TYPBITS2 = GEM_TD_DEF_BITSTRING(testit_block, locator, 'bitvector',
                               litnode(val=0), litnode(val=7) );

TYPBITS3 = GEM_TD_DEF_BITSTRING(testit_block, locator, 'bitvector',
``` litnode(val=0), litnode(val=-1) );

Examples Of Pointers And Typedefs

```
int echo() { struct  tnode {
    .
    .
}
typedef struct tnode ssval;
tnode *tp;
znode *zp;

struct znodse {
    .
    .
}
```

TYPSTRUCT1 = definition of structure tnode

! Define ssval as alias for tnode.

TYPALIAS   = GEM_TD_DEF_TYPEDEF(echo_block, locator, 'ssval', TYPSTRUCT1)

TYPPTR1 = GEM_TD_DEF_POINTER(echo_block, locator, null, TYPSTRUCT1);

! Define an "anonymous" pointer, then structure znode. Finaly modify
! the pointer type.

TYPPTR2    = GEM_TD_DEF_POINTER(echo_block, locator, 'pointer', null);
TYPSTRUCT2 = definition of structure znode
GEM_TD_SET_POINTER_TYPE(TYPPTR2, TYPSTRUCT2);

Examples Of Ranges Enumerations And Sets

```
void myproc() {
    .
    .
type
    dn1    = 0..6;
    dn2    = 100..105;
```

```
        dn3      = 66000..66001;
        weekday  = (mon,tue,wed,thu,fri);
        t_typ    = (int,re,boo);
    var
        s1   : set of dn1;
        s2   : set of weekday;
        s3   : set of t_typ;

! Define range dn1

TYPUINT8  = GEM_TD_DEF_BASIC_TYPE(myproc_block, locator, null,
                                  GEM_TYP_K_UINT8);
TYPRANGE1 = GEM_TD_DEF_RANGE(myproc_block, locator, 'dn1', TYPUINT8,
                             litnode(val=0), litnode(val=6));

! Define range dn2.

TYPRANGE2 = GEM_TD_DEF_RANGE(myproc_block, locator, 'dn2', TYPUINT8,
                             litnode(val=100), litnode(val=105));

! Define range dn3.

TYPINT32 = GEM_TD_DEF_BASIC_TYPE(myproc_block, locator, null,
                                 GEM_TYP_K_UINT32);
TYPRANGE = GEM_TD_DEF_RANGE(myproc_block, TYPINT32, 'dn3',
                            litnode(val=66000), litnode(val=66001) );

TYPENUM1 = GEM_TD_DEF_ENUM(myproc_block, locator, 'weekday', TYPUINT8);
    GEM_TD_SET_ENUM_ELEMENT(TYPENUM1, locator, 'mon', litnode(val=0) );
    GEM_TD_SET_ENUM_ELEMENT(TYPENUM1, locator, 'tue', litnode(val=1) );
    GEM_TD_SET_ENUM_ELEMENT(TYPENUM1, locator, 'wed', litnode(val=2) );
    GEM_TD_SET_ENUM_ELEMENT(TYPENUM1, locator, 'thu', litnode(val=3) );
    GEM_TD_SET_ENUM_ELEMENT(TYPENUM1, locator, 'fri', litnode(val=4) );

TYPENUM2 = GEM_TD_DEF_ENUM(myproc_block, locator, 't_typ', TYPEUINT32);
    GEM_TD_SET_ENUM_ELEMENT(TYPENUM2, locator, 'int', litnode(val=0) );
    GEM_TD_SET_ENUM_ELEMENT(TYPENUM2, locator, 're',  litnode(val=1) );
    GEM_TD_SET_ENUM_ELEMENT(TYPENUM2, locator, 'boo', litnode(val=2) );

! Define the sets for vars s1, s2 AND s3.

TYPSET1 = GEM_TD_DEF_SET(myproc_block, locator, 'set', TYPRANGE1);
TYPSET2 = GEM_TD_DEF_SET(myproc_block, locator, 'set', TYPENUM1);
TYPSET3 = GEM_TD_DEF_SET(myproc_block, locator, 'set', TYPENUM2);
```

Examples Of Arrays

```
procedure dimmer;

type
    nd   = record ......

var
    ary1 : array[1..10] of integer;
    ary2 : array[1..10,100..110] of integer;
    ary3 : array[900..1700] of nd;
    ary4 : array['a'..'z'] of nd;

TYPSTRUCT1 = Definition of record type nd.

! Define array 'ary1'.

TYPINT32 = GEM_TD_DEF_BASIC_TYPE(dimmer_block, locator, null,
                                 GEM_TYP_K_INT32);
TYPARRAY = GEM_TD_DEF_ARRAY(dimmer_block, locator, null, TYPINT32, 1);
GEM_TD_SET_ARRAY_BOUNDS(TYPARRAY, locator, 1,
                 litnode(val=1), litnode(val=10),
                 TYPINT32, litnode(value=4) );

! Define array 'ary2'.

TYPARRAY = GEM_TD_DEF_ARRAY(dimmer_block, locator, null, TYPINT32, 2);
GEM_TD_SET_ARRAY_BOUNDS(TYPARRAY, locator, 1,
                 litnode(val=1), litnode(val=10),
                 TYPINT32, litnode(val=4) );
GEM_TD_SET_ARRAY_BOUNDS(TYPARRAY, locator, 2,
                 litnode(val=100), litnode(val=110),
                 TYPINT32, litnode(val=40) );

! Alternatively, the array specification for ary2 may defined as:

TYPARRAY1 = GEM_TD_DEF_ARRAY(dimmer_block, locator, null, TYPINT32, 1);
GEM_TD_SET_ARRAY_BOUNDS(TYPARRAY1, locator, 1,
                 litnode(val=100), litnode(val=110),
                 TYPINT32, litnode(value(4) );
TYPARRAY2 = GEM_TD_DEF_ARRAY(dimmer_block, locator, null, TYPARRA1, 1);
GEM_TD_SET_ARRAY_BOUNDS(TYPARRAY2, locator, 1,
                 litnode(val=1), litnode(val=10),
                 TYPINT32, litnode(value(40) );

! Define array 'ary3'.

TYPARY = GEM_TD_DEF_ARRAY(dimmer_block, locator, null, TYPSTRUCT1, 1);
GEM_TD_SET_ARRAY_BOUNDS(TYPARY, locator, 1,
                 litnode(val=900), litnode(val=1700),
```

```
                              TYPINT32, sizeof(nd) );
```

! Define array 'ary4'.

```
TYPCHAR   = GEM_TD_DEF_CHAR_TYPE(dimmer_block, locator, null,
                              GEM_TYP_K_UINT8);
TYPARRAY = GEM_TD_DEF_ARRAY(dimmer_block, locator, TYPSTRUCT1, 1);
GEM_TD_SET_ARRAY_BOUNDS(TYPARRAY, locator, 1,
                        litnode(val=97), litnode(val=122));
                        TYPCHAR, sizeof(nd) );
```

Examples Of Adjustable Array Definition

```
subroutine x(cv,ary1,ary2,a,b)

character*(*) cv
dimension ary1(1:10,1:b)
dimension ary2(a:b,1:*)

TYPINT32 = GEM_TD_DEF_BASIC_TYPE(x_block, locator, null, GEM_TYP_K_INT32)
TYPCHAR  = GEM_TD_DEF_CHAR_TYPE(x_block, locator, null, GEM_TYP_K_INT8);
```

! Define array 'cv'.

```
TYPARRAY  = GEM_TD_DEF_ARRAY(x_block, locator, null, TYPCHAR, 1);
GEM_TD_SET_ARRAY_BOUNDS(TYPEARRAY, locator, 1,
                        litnode(val=1), litnode(val=1),
                        TYPINT32, litnode(val=1) );
```

! Define array 'ary1'.

```
TYPREALF = GEM_TD_DEF_BASIC_TYPE(x_block, locator, null, GEM_TYP_K_REALF)
TYPARRAY = GEM_TD_DEF_ARRAY(x_block, locator, TYPREALF, 2);
                        2, litnode(val=4) );
GEM_TD_SET_ARRAY_BOUNDS(TYPARRAY, 1, locator,
                        litnode(val=1), litnode(val=10),
                        TYPINT32, litnode(val=4) );
GEM_TD_SET_ARRAY_BOUNDS(TYPARRAY, 2, locator,
                        litnode(val=1), b_symbol,
                        TYPINT32, litnode(val=4) );   **********
```

! Define array 'ary2'.

```
TYPARRAY = GEM_TD_DEF_ARRAY(x_block, locator, null, TYPREALF, TYPINT32,
                        2, litnode(val=4) )
GEM_TD_SET_ARRAY_BOUNDS(TYPARRAY, locator, 1,
                        a_symbol, b_symbol,
```

```
                                  TYPINT32, litnode(val=4) );
   GEM_TD_SET_ARRAY_BOUNDS(TYPARRAY, locator, 2,
                                  litnode(val=1), litnode(val=1),
                                  TYPINT32, litnode(val=4) );
```

Examples Of Structures And Variants.

```
type
   t_typ   = (it, re, ptr, v1, v2, v3);
   ndp     = @nd;
   nd = record
       nxt  : ndp;
       case tt  : t_typ of
           it           : (iv : integer);
           re           : (rv : real);
           ptr          : (pv : ndp;      sum : integer);
           otherwise    : (i1 : integer; i2   : real);
   end;

! Define basic types used in example.

TYPINT32 = GEM_TD_DEF_BASIC_TYPE(typeit_block, locator,
                                 'integer',
                                 GEM_TYP_K_INT32);
TYPREALF = GEM_TD_DEF_BASIC_TYPE(typeit_block, locator,
                                 'real',
                                 GEM_TYP_K_REALF);
TYPNIL   = GEM_TD_DEF_BASIC_TYPE(typeit_block, locator, null,
                                 GEM_TYP_K_NIL);

! Define ndp pointer to nd.

TYPPTR   = GEM_TD_DEF_POINTER(typeit_block, locator, 'ndp', TYPNIL);

! Define the t_typ enumeration.

TYPENUM = GEM_TD_DEF_ENUM(myproc_node, locator, 't_typ', TYPINT32);
    GEM_TD_SET_ENUM_ELEMENT(TYPENUM, locator, 'it',  litnode(val=0) );
    GEM_TD_SET_ENUM_ELEMENT(TYPENUM, locator, 're',  litnode(val=1) );
    GEM_TD_SET_ENUM_ELEMENT(TYPENUM, locator, 'boo', litnode(val=2) );
    GEM_TD_SET_ENUM_ELEMENT(TYPENUM, locator, 'v1',  litnode(val=3) );
    GEM_TD_SET_ENUM_ELEMENT(TYPENUM, locator, 'v2',  litnode(val=4) );
    GEM_TD_SET_ENUM_ELEMENT(TYPENUM, locator, 'v3',  litnode(val=5) );

! Define the structure definition nd.

TYPSTRUCT = GEM_TD_DEF_STRUCT(typeit_block, locator, 'nd',
```

```
                                        litnode(nd_size));
GEM_TD_SET_STRUCT_ELEMENT(TYPSTRUCT, null, locator, 'nxt', TYPPTR,
    litnode(l_byte(nxt)), litnode(l_bit(nxt)), litnode(bit_size(nxt)) );

! Define the selector for variant parts.

TYPSEL = GEM_TD_DEF_STRUCT_SELECTOR(TYPSTRUCT, null, 'tt', TYPENUM,
    litnode(l_byte(tt)), litnode(l_bit(tt)), litnode(bit_size(tt)) );

! Define the variants of the structure including a default.

V1 = GEM_TD_DEF_STRUCT_VARIANT(TYPSEL, locator);
    GEM_TD_SET_SELECTOR_RANGE(V1, locator, litnode(val=0), litnode(val=0
    GEM_TD_SET_STRUCT_ELEMENT(TYPSTRUCT, V1, locator, 'iv', TYPINT,
        litnode(l_byte(iv)), litnode(l_bit(iv)), litnode(bit_size(iv))

V2 = GEM_TD_DEF_STRUCT_VARIANT(TYPSEL, locator);
    GEM_TD_SET_SELECTOR_RANGE(V2, locator, litnode(val=1), litnode(val=1
    GEM_TD_SET_STRUCT_ELEMENT(TYPSTRUCT, V2, locator, 'rv', TYPREALF,
        litnode(l_byte(rv)), litnode(l_bit(   )), litnode(bit_size(rv))

V3 = GEM_TD_DEF_STRUCT_VARIANT(TYPSEL, locator);
    GEM_TD_SET_SELECTOR_RANGE(V3, locator, litnode(val=2), litnode(val=2
    GEM_TD_SET_STRUCT_ELEMENT(TYPSTRUCT, V3, locator, 'pv', TYPPTR,
        litnode(l_byte(pv)), litnode(l_bit(pv)), litnode(bit_size(pv))
    GEM_TD_SET_STRUCT_ELEMENT(TYPSTRUCT, V3, locator, 'sum', TYPPTR,
        litnode(l_byte(sum)), litnode(l_bit(sum)), litnode(bit_size(sum)

V4 = GEM_TD_DEF_STRUCT_VARIANT(TYPSEL, locator);
    GEM_TD_SET_SELECTOR_DEFAULT(V4, locator);
    GEM_TD_SET_STRUCT_ELEMENT(TYPSTRUCT, V4, locator, 'i1', TYPINT,
        litnode(l_byte(i1)), litnode(l_bit(i1)), litnode(bit_size(i1))
    GEM_TD_SET_STRUCT_ELEMENT(TYPSTRUCT, V4, locator, 'i2', TYPINT,
        litnode(l_byte(i2)), litnode(l_bit(i2)), litnode(bit_size(i2))

GEM_TD_SET_POINTER_TYPE(TYPPTR, TYPSTRUCT);
```

Examples Of Structures And Union Definition
------------------------------------------

```
main() { struct dim3 {
    int x;
    int y;
    int z;
```

```
};

union anon {
    int ival;
    float fval;
    char *pval;
    struct dim3 loc;
};

struct nl {
    union anon a;
    union anon b;
    union anon c;
};

struct nl nl1,nl2,nl3;

TYPINT32 = GEM_TD_DEF_BASIC_TYPE(main_block, locator, 'int',
                                GEM_TYP_K_INT32);
TYPREALF = GEM_TD_DEF_BASIC_TYPE(main_block, locator, null,
                                GEM_TYP_K_?--?);
TYPCHAR  = GEM_TD_DEF_CHAR_TYPE(main_block, locator, null,
                                GEM_TYP_K_UINT8);
TYPPTR   = GEM_TD_DEF_POINTER(main_block, locator, null, TYPCHAR);

! Define structure 'dim3'.

TYPSTRUCT = GEM_TD_DEF_STRUCT(main_block, locator, 'dim3',
                              litnode(dim3_size) );
    GEM_TD_SET_STRUCT_ELEMENT(TYPSTRUCT, null, locator, 'x', TYPINT32,
                              loc_byte(x), loc_bit(x), litnode(x_size));
    GEM_TD_SET_STRUCT_ELEMENT(TYPSTRUCT, null, locator, 'y', TYPINT32,
                              loc_byte(y), loc_bit(y), litnode(y_size));
    GEM_TD_SET_STRUCT_ELEMENT(TYPSTRUCT, null, locator, 'z', TYPINT32,
                              loc_byte(z), loc_bit(z), litnode(z_size));

! Define the union 'anon'.

TYPUNION = GEM_TD_DEF_UNION(main_block, locator, 'anon',
                            litnode(anon_size) );
    GEM_TD_SET_UNION_MEMBER(TYPUNION, locator, 'ival', TYPINT32);
    GEM_TD_SET_UNION_MEMBER(TYPUNION, locator, 'fval', TYPREALF);
    GEM_TD_SET_UNION_MEMBER(TYPUNION, locator, 'pval', TYPPTR);
    GEM_TD_SET_UNION_MEMBER(TYPUNION, locator, 'loc',  TYPSTRUCT);

! Define the structure 'nl'.

TYPSTRUCT = GEM_TD_DEF_STRUCT(main_block, locator, 'nl',
                              litnode(nl_size));
    GEM_TD_SET_STRUCT_ELEMENT(TYPSTRUCT, null, locator, 'a', TYPUNION,
                              loc_byte(a), loc_bit(a),
```

```
                                litnode(anon_size) );
    GEM_TD_SET_STRUCT_ELEMENT(TYPSTRUCT, null, locator, 'b', TYPUNION,
                                loc_byte(b), loc_bit(b),
                                litnode(anon_size) );
    GEM_TD_SET_STRUCT_ELEMENT(TYPSTRUCT, null, locator, 'c', TYPUNION,
                                loc_byte(b), loc_bit(b),
                                litnode(anon_size) );
```

Examples Of Function Parameter Definion

```
function x (function grin : real;
            procedure bearit) : integer;
    .
    .

TYPREALF = GEM_TD_DEF_BASIC_TYPE(x_block, locator, 'real',
                                GEM_TYP_K_REALF);
TYPNIL   = GEM_TD_DEF_BASIC_TYPE(x_block, locator, null,
                                GEM_TYP_K_NIL);

! Define type for function parameter 'grin'.

TYPPROC = GEM_TD_DEF_FUNCTION_TYPE(x_block, locator, null, TYPREALF);

! Define type for procedure parameter 'bearit'.

TYPFUNCT = GEM_TD_DEF_FUNCTION_TYPE(x_block, locator, null, TYPNIL);
```

What is claimed is:

1. A method, executed in a computer system, for providing type information about a source program, the method comprising the steps of:

producing a type node by a compiler front end calling a service routine that creates and stores the type node at a first address in a memory, said compiler front end performing syntactic and semantic processing of a programming language, said type node describing a data type that belongs to said programming language and is used in a source program that is stored in the memory and includes one or more source statements written in said programming language, said service routine being a routine in a compiler back end and being called by a plurality of different compiler front ends, each of said different compiler front ends performing syntactic and semantic processing of a different programming language;

generating, using the source program and the compiler front end, a symbol table that includes said type node; and generating, using said symbol table and said compiler back end, type information that is described by said type node and an object module for use in a target computer system, said object module and said type information being used in producing a machine executable program for said target computer system, said type information and said object module corresponding to said source program.

2. The method of claim 1, wherein said compiler back end produces code for one of a plurality of different target computer systems and includes an object module emitter that produces said object module, and wherein said object module includes said type information, and the method further comprises the step of:

linking, using a linker, said object module and producing a machine-executable program that comprises said type information.

3. The method of claim 1 wherein said type node is a first type node, said compiler front end is a first compiler front end, said address is a first address, said programming language is a first programming language, said source program is a first source program, said symbol table is a first symbol table, said data type is a first data type, said target computer system is a first target computer system, and the method further comprising the steps of:

producing a second type node by a second compiler front end, said second compiler front end calling said service routine that creates and stores said second type node at a second address in said memory, said second compiler front end performing syntactic and semantic processing of said second programming language, said second type node describing a second data type which belongs to said second programming language and which is used in a second source program;

generating, using said second source program and said second compiler front end, a second symbol table that includes said second type node; and generating, using said second symbol table and said compiler back end, other type information that is described by said second type node and another object module for a second target computer system, said other type information and said other object module being used to produce another machine executable program for said second target computer system, said other type information and said other object module corresponding to said second source program.

4. The method of claim 1, further comprising the step of generating an intermediate language graph that represents said source program in an intermediate language, and wherein said step of generating type information and an object module uses said intermediate language graph to generate said object module.

5. The method of claim 1, wherein said symbol table further includes a symbol node that represents a program symbol in said source program and a block node that corresponds to a portion of the source program in which said program symbol is used, said program symbol being of said data type, said type node being associated with said symbol node identifying said program symbol as said data type, said block node including type list information denoting a first list that includes said type node and that represents data types used within said portion of said source program, a second list comprising one or more symbol nodes is associated with said block node, said second list representing program symbols declared within said portion of said source program and said second list including said first symbol node, and said type information includes information that represents said program symbol being of said data type.

6. The method of claim 5, wherein said address is a first address and said service routine creates said type node as a data structure stored at said address and said service routine returns to said compiler front end an address handle corresponding to said address in said memory, said service routine constructing and managing said first list of type nodes at a second address in said memory, said type list information of said block node denoting said second address, and said first symbol node including said address handle.

7. The method of claim 5, wherein said program symbol is a user-defined programming variable, and said portion of said source program comprises a source language statement assigning a value to said program symbol.

8. The method of claim 5, wherein said symbol node comprises said address of said type node being associated with said symbol node.

9. The method of claim 1, wherein said step of generating said type information and said object module further comprises generating, using said symbol table, a debug symbol table that comprises debug type information as described in said symbol table, said debug type information used for debugging said source program.

10. The method of claim 1, wherein said data type is one of a basic type describing a type of said programing language common to other programming languages, an abstract type describing a type specific to said programming language, or a user-defined type as defined in said source program.

11. The method of claim 10, wherein said basic type is one of an integer data type, a floating-point data type or a character data type.

12. A memory comprising:

a compiler front end that performs syntactic and semantic processing of a programming language;

producing means, coupled to said compiler front end, for producing a type node which describes a data type that belongs to said programming language and that is used in a source program including one or more source statements written in said programming language, said producing means including a service routine that is included in a compiler back end and that is called by said compiler front end to create said type node;

means for generating, using said source program and said compiler front end, a symbol table that includes said type node; and means for generating, using said symbol table and said compiler back end, type information that is described by said type node and an object module used in a target computer system, said object module and said type information being used to produce a machine executable program for said target computer system, said type information and said object module corresponding to said source program.

13. The memory of claim 12, wherein said means for generating said symbol table generates an intermediate language graph that represents said source program in an intermediate language, and wherein said means for generating said type information and said object module use said intermediate language graph to generate said object module.

14. The memory of claim 12 wherein said compiler front end is a first compiler front end, said programming language is a first programming language, said source program is a first source program, said type node is a first type node, said data type is a first data type, and the memory further comprising:

a second compiler front end that performs syntactic and semantic processing of a second programming language, and wherein said producing means for producing a type node, coupled to said second compiler front end, produces a second type node that represents a second data type in said second programming language, and the memory further includes:

means for generating, using a second source program written in said second programming language and said second compiler front end, another symbol table that comprises said second type node.

15. The apparatus of claim 14, wherein said service routine is called by said first and second compiler front ends and creates said first and said second type nodes which represent, respectively, said first and second data types.

16. The memory of claim 15, wherein said compiler back end includes an object module emitter that generates an object module for one of a plurality of different target computer systems, and wherein said object module comprises said type information.

17. A method, executed in a computer system, of producing debug type information, the method comprising the steps of:

producing, using a compiler front end that performs syntactic and semantic processing of a first programming language, a type node describing a data type of said programming language, said compiler front end calling a service routine that creates said type node as a first data structure in a memory at a first memory location and returns to said compiler front end an address handle corresponding to said first memory location, said service routine constructing and managing a list of type nodes that it has created in response to calls from said compiler front end, said list being stored in said memory at a second memory location;

generating, using said source program and said compiler front end, a symbol table that includes a symbol node that is a second data structure and represents a program symbol in said source program, said symbol table includes a block node that is a third data structure and corresponds to a portion of said source program in which said program symbol is used, said program symbol being of said data type described by said the node and said symbol node including said first address handle, said type node is associated with said symbol node identifying said program symbol as being said data type, said block node comprising a list address handle denoting said second memory location; and generating, using said symbol table, a debug symbol table that includes debug type information about said source program, said debug type information being described by said type node and representing said program symbol being of said data type.

18. The method of claim 17, wherein said list comprises a first marker element denoting the front of the list and a second marker element denoting the end of the list.

19. The method of claim 17, wherein said step of generating a debug symbol table generates, using an object module emitter and said symbol table, an object module that includes said debug symbol table.

20. The method of claim 19 further comprising the step of:

linking said object module and producing a machine executable program that uses said debug type information comprising said debug symbol table for debugging first source program.

21. The method of claim 17, wherein said compiler front end is a first compiler front end, said source program is a first source program, said programming language is a first programming language, said type node is a first type node, said data type is a first data type, said address handle is a first address handle, and the method further comprising the step of:

producing, using a second compiler front end that performs syntactic and semantic processing of a second programming language different from said first programming language, a second type node describing a second data type of said second programming language, said second front end calling said service routine that creates said second type node as a fourth data structure in said memory at a third memory location and returns to said second compiler front end a second address handle corresponding to said third memory location, said service routine constructing and managing another list of type nodes it has created in response to calls made by said second compiler front end, said second data type being a data type of another program symbol in a second source program that includes statements written in said second programming language.

* * * * *